(12) United States Patent
Lim et al.

(10) Patent No.: US 12,284,631 B2
(45) Date of Patent: Apr. 22, 2025

(54) TECHNIQUE FOR ALLOCATING RESOURCE UNIT IN WIRELESS COMMUNICATION SYSTEM

(71) Applicant: LG ELECTRONICS INC., Seoul (KR)

(72) Inventors: Dongguk Lim, Seoul (KR); Jinyoung Chun, Seoul (KR); Jinsoo Choi, Seoul (KR); Eunsung Park, Seoul (KR); Jinmin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 365 days.

(21) Appl. No.: 17/756,759

(22) PCT Filed: Dec. 4, 2020

(86) PCT No.: PCT/KR2020/017632
§ 371 (c)(1),
(2) Date: Jun. 1, 2022

(87) PCT Pub. No.: WO2021/112616
PCT Pub. Date: Jun. 10, 2021

(65) Prior Publication Data
US 2023/0023486 A1    Jan. 26, 2023

(30) Foreign Application Priority Data

Dec. 5, 2019 (KR) .................. 10-2019-0161043
Dec. 16, 2019 (KR) .................. 10-2019-0168228
(Continued)

(51) Int. Cl.
*H04W 72/04* (2023.01)
*H04L 5/00* (2006.01)
*H04W 84/12* (2009.01)

(52) U.S. Cl.
CPC .......... *H04W 72/04* (2013.01); *H04L 5/0044* (2013.01); *H04W 84/12* (2013.01)

(58) Field of Classification Search
CPC ... H04L 1/0025; H04L 1/0031; H04L 1/0675; H04L 5/0044; H04L 5/0053;
(Continued)

(56) References Cited

U.S. PATENT DOCUMENTS

2016/0029397 A1 * 1/2016 Chen .................. H04W 72/541
370/329
2017/0048823 A1   2/2017 Bharadwaj et al.
(Continued)

FOREIGN PATENT DOCUMENTS

KR   10-2017-0140364   12/2017
KR   10-2018-0086414    7/2018

OTHER PUBLICATIONS

PCT International Application No. PCT/KR2020/017632, International Search Report dated Mar. 9, 2021, 6 pages.
(Continued)

*Primary Examiner* — Stephen J Clawson
(74) *Attorney, Agent, or Firm* — LEE, HONG, DEGERMAN, KANG & WAIMEY

(57) ABSTRACT

According to various embodiments, a reception STA may receive a physical layer protocol data unit (PPDU) including a first field and a second field from a transmission STA. The first field may include information about a configuration of a plurality of resource units (RUs). The second field may include a plurality of user fields for allocating the plurality of RUs to a plurality of users. The reception STA may identify a multiple RU (M-RU) allocated to itself and decode the received PPDU.

12 Claims, 41 Drawing Sheets

(30) Foreign Application Priority Data

| Jan. 28, 2020 | (KR) | 10-2020-0010097 |
| Jan. 29, 2020 | (KR) | 10-2020-0010687 |
| Feb. 25, 2020 | (KR) | 10-2020-0023190 |
| Mar. 11, 2020 | (KR) | 10-2020-0030396 |

(58) Field of Classification Search
CPC ........... H04L 5/0094; H04W 72/04; H04W 72/1273; H04W 72/11; H04W 72/114; H04W 72/40; H04W 84/12; H04W 72/115

See application file for complete search history.

(56) References Cited

U.S. PATENT DOCUMENTS

| 2018/0227917 | A1  | 8/2018  | Li et al. |
| 2019/0238288 | A1* | 8/2019  | Liu ............... H04L 1/0059 |
| 2020/0221516 | A1* | 7/2020  | Ouchi ............ H04W 8/26 |
| 2020/0288450 | A1* | 9/2020  | Luo ............... H04L 5/0007 |
| 2020/0305024 | A1* | 9/2020  | Chen ............. H04W 76/10 |
| 2022/0278771 | A1* | 9/2022  | Park ............... H04L 1/0058 |
| 2022/0345276 | A1* | 10/2022 | Redlich .......... H04L 5/0053 |
| 2023/0246738 | A1* | 8/2023  | Park ............... H04L 1/0041 370/338 |
| 2024/0089158 | A1* | 3/2024  | Park ............... H04L 1/00 |

OTHER PUBLICATIONS

Huawei et al., "NR numerology and frame structure for unlicensed bands," R1-1813903, 3GPP TSG RAN WG1 Meeting #95, Nov. 2018, 16 pages.

* cited by examiner (a)

(b)

PPDU Format (IEEE 802.11a/g)

HT PPDU Format (IEEE 802.11n)

VHT PPDU Format (IEEE 802.11ac)

| Version independent field (2210) | Version dependent field (2220) |

| 242(1) | 242(2) | 242(3) | 242(4) | 242(1) | 242(2) | 242(3) | 242(4) |
|---|---|---|---|---|---|---|---|
| 484(1) | | 484(2) | | 484(1) | | 484(2) | |
| 996 | | | | 996 | | | |

FIG. 31

| 242(1) | 242(2) | 242(3) | 242(4) | 242(1) | 242(2) | 242(3) | 242(4) |
|---|---|---|---|---|---|---|---|
| 484(1) | | 484(2) | | 484(1) | | 484(2) | |
| 996 | | | | 996 | | | |

FIG. 32

| 242(1) | 242(2) | 242(3) | 242(4) | 242(1) | 242(2) | 242(3) | 242(4) |
|---|---|---|---|---|---|---|---|
| 484(1) | | 484(2) | | 484(1) | | 484(2) | |
| 996 | | | | 996 | | | |

FIG. 33

| index | 1 | 2 | 3 | 4 | 5 | 6 | 7 | 8 | 9 |
|---|---|---|---|---|---|---|---|---|---|
| 1 | 26 | 26 | 26 | 26 | 26 | 26 | 26 | 26 | 26 |
| 2 | 26 | 26 | 52 | 52 | 26 | 26 | 26 | 26 | 26 |
| 3 | 26 | 26 | 52 | 52 | 26 | 26 | 26 | 26 | 26 |
| 4 | 26 | 26 | 52 | 52 | 26 | 26 | 26 | 26 | 26 |
| 5 | 26 | 26 | 52 | 52 | 26 | 26 | 26 | 26 | |
| 6 | 26 | 26 | 26 | 26 | 26 | 26 | 26 | 26 | 26 |
| 7 | 26 | 26 | 26 | 26 | 26 | 52 | 26 | 26 | 26 |
| 8 | | 52 | 26 | 26 | 26 | 52 | | 26 | 52 |
| 9 | 52 | 26 | 26 | 26 | 26 | | 106 | 26 | 26 |
| 10 | 52 | 106 | 26 | 52 | 26 | | | 52 | 26 |
| 11 | 26 | 26 | 52 | 52 | 26 | 26 | 52 | 26 | 26 |

FIG. 34

| index | 1 | 2 | 3 | 4 | 5 | 6 | 7 | 8 | 9 |
|---|---|---|---|---|---|---|---|---|---|
| 1 | 26 | 26 | 26 | 26 | 26 | 106 | 106 | 106 | 106 |
| 2 | 26 | 26 | 26 | 26 | 26 | 106 | 106 | 106 | 106 |
| 3 | 52 | 52 | 52 | 52 | 26 | 26 | 26 | 26 | 26 |
| 4 | 52 | 52 | 52 | 52 | 26 | 26 | 52 | 26 | 52 |
| 5 | 106 | 106 | 106 | 106 | 26 | 26 | 52 | 26 | 52 |
| 6 | 106 | 106 | 106 | 106 | 26 | 26 | 26 | 26 | 26 |
| 7 | 106 | 106 | 106 | 106 | 26 | 52 | 106 | 52 | 106 |
| 8 | 106 | 106 | 106 | 106 | 26 | 26 | 26 | 26 | 26 |
| 9 | 106 | 106 | 106 | 106 | 26 | 26 | 26 | 26 | 26 |
| 10 | 106 | 106 | 106 | 106 | 26 | 26 | 26 | 26 | 26 |

FIG. 36

| index | 1 | 2 | 3 | 4 |
|---|---|---|---|---|
| 1 | 242 | 242 | 484 | |
| 2 | 242 | 242 | 484 | |
| 3 | 484 | | 242 | 242 |
| 4 | 484 | | 242 | 242 |

TECHNIQUE FOR ALLOCATING RESOURCE UNIT IN WIRELESS COMMUNICATION SYSTEM

CROSS-REFERENCE TO RELATED APPLICATIONS

This application is the National Stage filing under 35 U.S.C. 371 of International Application No. PCT/KR2020/017632, filed on Dec. 4, 2020, which claims the benefit of earlier filing date and right of priority to Korean Application Nos. 10-2019-0161043, filed on Dec. 5, 2019, 10-2019-0168228, filed on Dec. 16, 2019, 10-2020-0010097, filed on Jan. 28, 2020, 10-2020-0010687, filed on Jan. 29, 2020, 10-2020-0023190, filed on Feb. 25, 2020, and 10-2020-0030396, filed on Mar. 11, 2020, the contents of which are all hereby incorporated by reference herein in their entireties.

BACKGROUND

Field of the Disclosure

The present specification relates to a technique for allocating a resource unit (RU) in a WLAN system, and more particularly, to a method for allocating multiple RUs in a WLAN system and an apparatus supporting the same.

Related Art

A wireless local area network (WLAN) has been improved in various ways. For example, the IEEE 802.11ax standard proposed an improved communication environment using orthogonal frequency division multiple access (OFDMA) and downlink multi-user multiple input multiple output (DL MU MIMO) techniques.

The present specification proposes a technical feature that can be utilized in a new communication standard. For example, the new communication standard may be an extreme high throughput (EHT) standard which is currently being discussed. The EHT standard may use an increased bandwidth, an enhanced PHY layer protocol data unit (PPDU) structure, an enhanced sequence, a hybrid automatic repeat request (HARQ) scheme, or the like, which is newly proposed. The EHT standard may be called the IEEE 802.11be standard.

SUMMARY

Technical Problem

In the EHT standard, in order to support high throughput and high data rate, a wide bandwidth (for example, 160/320 MHz), 16 streams, and/or multi-link (or multi-band) operation may be used.

In the EHT standard (that is, Beyond 11 ax), multiple RU allocation for allocating multiple resource units to one terminal (or STA) to improve throughput during OFDMA transmission has been proposed. When a signal is transmitted to one STA by using a plurality of RUs, a technical feature for efficiently transmitting information on multiple RUs allocated to the terminal may be required.

Therefore, in the present specification, when transmitting a signal to an STA (or a plurality of STAs) by allocating multiple resource units in OFDMA transmission, a technical feature for reducing overhead for the control field and efficiently transmitting RU allocation information may be proposed.

Technical Solutions

According to various embodiments, a receiving station (STA) may receive, from a transmitting STA, a physical layer protocol data unit (PPDU) including a first field and a second field, wherein the first field includes information about a configuration of a plurality of resource units (RUs), and wherein the second field includes a plurality of user fields for allocating the plurality of RUs to a plurality of users; identify at least one user field, among the plurality of user fields, including a STA identifier (ID) information on the receiving STA; identify a multiple RU (M-RU) allocated to the receiving STA, based on the at least one user field; and decode the PPDU, based on the M-RU.

Technical Effects

According to various embodiments, there is an effect that the RUs can be used efficiently, by using multiple RUs in which a plurality of RUs are combined. In addition, since the RU allocation is newly configured, there is an effect that a flexible combination of multiple RUs can be indicated.

According to various embodiments, the receiving STA may confirm that multiple RUs have been allocated to itself based on the STA-ID. The receiving STA may identify at least one user field including STA-ID information of the receiving STA. The receiving STA may identify the Multiple RUs allocated to itself based on the at least one user field.

Accordingly, without an additional signaling process, the receiving STA has the effect of confirming/identifying information about the multiple RUs allocated to itself.

BRIEF DESCRIPTION OF THE DRAWINGS

FIG. 22 shows an example of the U-SIG.

FIG. 24 shows an example of a multiple RU combinations within 40 MHz.

FIGS. 30 to 32 show examples of combinations of RU484 and RU996.

FIG. 33 shows an example of a 26+52 RU combination.

FIG. 34 shows an example of a 26+106 RU combination.

FIG. 36 shows an example of a Large RU combination at 80 MHz.

DETAILED DESCRIPTION

Figure 1:
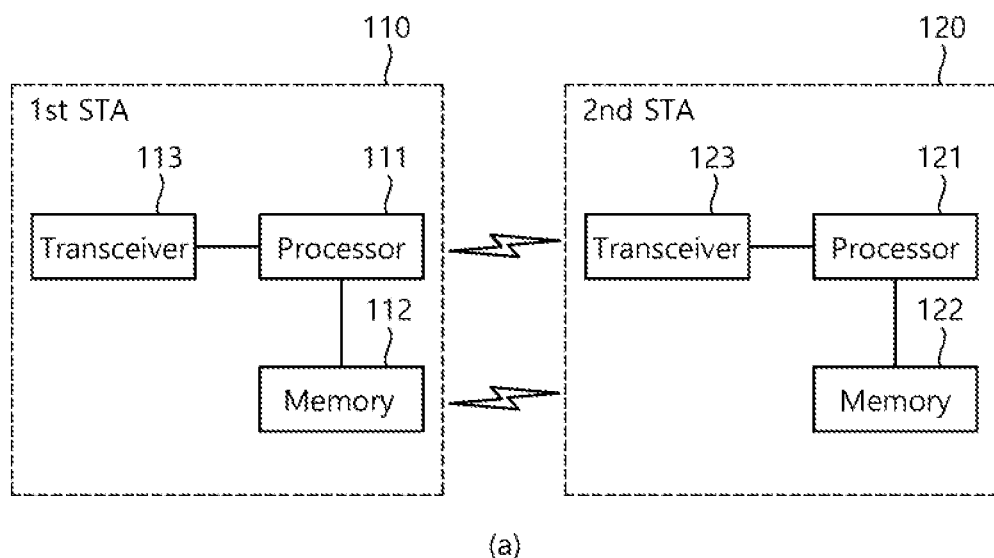
FIG. 1 shows an example of a transmitting apparatus and/or receiving apparatus of the present specification.
Figure 1:
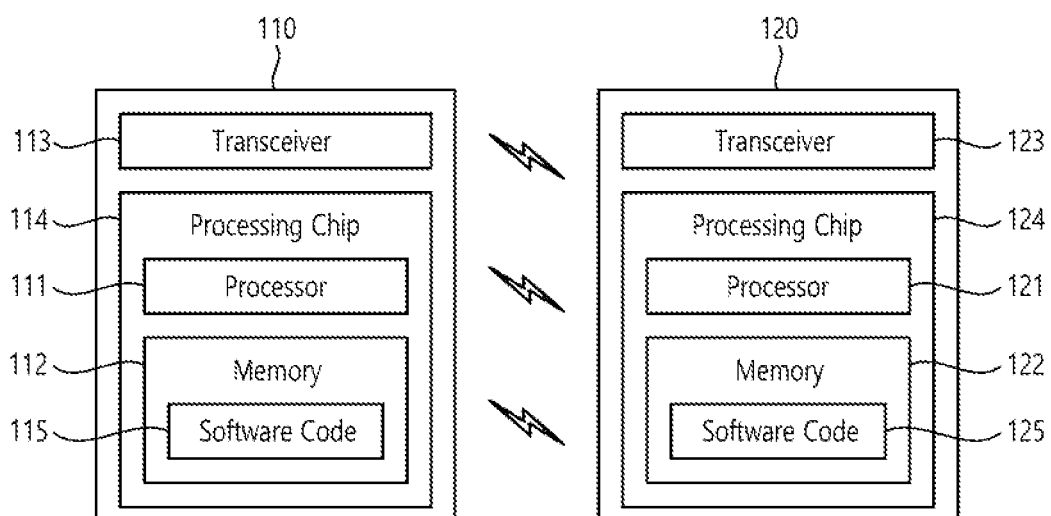

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (EHT-signal)", it may denote that "EHT-signal" is proposed as an example of the "control information". In other words, the "control information" of the present specification is not limited to "EHT-signal", and "EHT-signal" may be proposed as an example of the "control information". In addition, when indicated as "control information (i.e., EHT-signal)", it may also mean that "EHT-signal" is proposed as an example of the "control information".

Technical features described individually in one figure in the present specification may be individually implemented, or may be simultaneously implemented.

The following example of the present specification may be applied to various wireless communication systems. For example, the following example of the present specification may be applied to a wireless local area network (WLAN) system. For example, the present specification may be applied to the IEEE 802.11a/g/n/ac standard or the IEEE 802.11ax standard. In addition, the present specification may also be applied to the newly proposed EHT standard or IEEE 802.11be standard. In addition, the example of the present specification may also be applied to a new WLAN standard enhanced from the EHT standard or the IEEE 802.11be standard. In addition, the example of the present specification may be applied to a mobile communication system. For example, it may be applied to a mobile communication system based on long term evolution (LTE) depending on a $3^{rd}$ generation partnership project (3GPP) standard and based on evolution of the LTE. In addition, the example of the present specification may be applied to a communication system of a 5G NR standard based on the 3GPP standard.

Hereinafter, in order to describe a technical feature of the present specification, a technical feature applicable to the present specification will be described.

FIG. 1 shows an example of a transmitting apparatus and/or receiving apparatus of the present specification.

In the example of FIG. 1, various technical features described below may be performed. FIG. 1 relates to at least one station (STA). For example, STAs 110 and 120 of the present specification may also be called in various terms such as a mobile terminal, a wireless device, a wireless transmit/receive unit (WTRU), a user equipment (UE), a mobile station (MS), a mobile subscriber unit, or simply a user. The STAs 110 and 120 of the present specification may also be called in various terms such as a network, a base station, a node-B, an access point (AP), a repeater, a router, a relay, or the like. The STAs 110 and 120 of the present specification may also be referred to as various names such as a receiving apparatus, a transmitting apparatus, a receiving STA, a transmitting STA, a receiving device, a transmitting device, or the like.

For example, the STAs 110 and 120 may serve as an AP or a non-AP. That is, the STAs 110 and 120 of the present specification may serve as the AP and/or the non-AP.

The STAs 110 and 120 of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like. In addition, the STA of the present specification may support communication for various communication services such as voice calls, video calls, data communication, and self-driving (autonomous-driving), or the like.

The STAs 110 and 120 of the present specification may include a medium access control (MAC) conforming to the IEEE 802.11 standard and a physical layer interface for a radio medium.

The STAs 110 and 120 will be described below with reference to a sub-figure (a) of FIG. 1.

The first STA 110 may include a processor 111, a memory 112, and a transceiver 113. The illustrated process, memory, and transceiver may be implemented individually as separate chips, or at least two blocks/functions may be implemented through a single chip.

The transceiver 113 of the first STA performs a signal transmission/reception operation. Specifically, an IEEE 802.11 packet (e.g., IEEE 802.11a/b/g/n/ac/ax/be, etc.) may be transmitted/received.

For example, the first STA 110 may perform an operation intended by an AP. For example, the processor 111 of the AP may receive a signal through the transceiver 113, process a reception (RX) signal, generate a transmission (TX) signal, and provide control for signal transmission. The memory 112 of the AP may store a signal (e.g., RX signal) received through the transceiver 113, and may store a signal (e.g., TX signal) to be transmitted through the transceiver.

For example, the second STA 120 may perform an operation intended by a non-AP STA. For example, a transceiver 123 of a non-AP performs a signal transmission/reception operation. Specifically, an IEEE 802.11 packet (e.g., IEEE 802.11a/b/g/n/ac/ax/be packet, etc.) may be transmitted/received.

For example, a processor 121 of the non-AP STA may receive a signal through the transceiver 123, process an RX signal, generate a TX signal, and provide control for signal transmission. A memory 122 of the non-AP STA may store a signal (e.g., RX signal) received through the transceiver 123, and may store a signal (e.g., TX signal) to be transmitted through the transceiver.

For example, an operation of a device indicated as an AP in the specification described below may be performed in the first STA 110 or the second STA 120. For example, if the first STA 110 is the AP, the operation of the device indicated as the AP may be controlled by the processor 111 of the first STA 110, and a related signal may be transmitted or received through the transceiver 113 controlled by the processor 111 of the first STA 110. In addition, control information related to the operation of the AP or a TX/RX signal of the AP may be stored in the memory 112 of the first STA 110. In addition, if the second STA 120 is the AP, the operation of the device indicated as the AP may be controlled by the processor 121 of the second STA 120, and a related signal may be transmitted or received through the transceiver 123 controlled by the processor 121 of the second STA 120. In addition, control information related to the operation of the AP or a TX/RX signal of the AP may be stored in the memory 122 of the second STA 120.

For example, in the specification described below, an operation of a device indicated as a non-AP (or user-STA) may be performed in the first STA 110 or the second STA 120. For example, if the second STA 120 is the non-AP, the operation of the device indicated as the non-AP may be controlled by the processor 121 of the second STA 120, and a related signal may be transmitted or received through the transceiver 123 controlled by the processor 121 of the second STA 120. In addition, control information related to the operation of the non-AP or a TX/RX signal of the non-AP may be stored in the memory 122 of the second STA 120. For example, if the first STA 110 is the non-AP, the operation of the device indicated as the non-AP may be controlled by the processor 111 of the first STA 110, and a related signal may be transmitted or received through the transceiver 113 controlled by the processor 111 of the first STA 110. In addition, control information related to the operation of the non-AP or a TX/RX signal of the non-AP may be stored in the memory 112 of the first STA 110.

In the specification described below, a device called a (transmitting/receiving) STA, a first STA, a second STA, a STA1, a STA2, an AP, a first AP, a second AP, an AP', an AP2, a (transmitting/receiving) terminal, a (transmitting/receiving) device, a (transmitting/receiving) apparatus, a network, or the like may imply the STAs 110 and 120 of FIG. 1. For example, a device indicated as, without a specific reference numeral, the (transmitting/receiving) STA, the first STA, the second STA, the STA1, the STA2, the AP, the first AP, the second AP, the AP', the AP2, the (transmitting/receiving) terminal, the (transmitting/receiving) device, the (transmitting/receiving) apparatus, the network, or the like may imply the STAs 110 and 120 of FIG. 1. For example, in the following example, an operation in which various STAs transmit/receive a signal (e.g., a PPDU) may be performed in the transceivers 113 and 123 of FIG. 1. In addition, in the following example, an operation in which various STAs generate a TX/RX signal or perform data processing and computation in advance for the TX/RX signal may be performed in the processors 111 and 121 of FIG. 1. For example, an example of an operation for generating the TX/RX signal or performing the data processing and computation in advance may include: 1) an operation of determining/obtaining/configuring/computing/decoding/encoding bit information of a sub-field (SIG, STF, LTF, Data) included in a PPDU; 2) an operation of determining/configuring/obtaining a time resource or frequency resource (e.g., a subcarrier resource) or the like used for the sub-field (SIG, STF, LTF, Data) included the PPDU; 3) an operation of determining/configuring/obtaining a specific sequence (e.g., a pilot sequence, an STF/LTF sequence, an extra sequence applied to SIG) or the like used for the sub-field (SIG, STF, LTF, Data) field included in the PPDU; 4) a power control operation and/or power saving operation applied for the STA; and 5) an operation related to determining/obtaining/configuring/decoding/encoding or the like of an ACK signal. In addition, in the following example, a variety of information used by various STAs for determining/obtaining/configuring/computing/decoding/decoding a TX/RX signal (e.g., information related to a field/subfield/control field/parameter/power or the like) may be stored in the memories 112 and 122 of FIG. 1.

The aforementioned device/STA of the sub-figure (a) of FIG. 1 may be modified as shown in the sub-figure (b) of FIG. 1. Hereinafter, the STAs 110 and 120 of the present specification will be described based on the sub-figure (b) of FIG. 1.

For example, the transceivers 113 and 123 illustrated in the sub-figure (b) of FIG. 1 may perform the same function as the aforementioned transceiver illustrated in the sub-figure (a) of FIG. 1. For example, processing chips 114 and 124 illustrated in the sub-figure (b) of FIG. 1 may include the processors 111 and 121 and the memories 112 and 122. The processors 111 and 121 and memories 112 and 122 illustrated in the sub-figure (b) of FIG. 1 may perform the same function as the aforementioned processors 111 and 121 and memories 112 and 122 illustrated in the sub-figure (a) of FIG. 1.

A mobile terminal, a wireless device, a wireless transmit/receive unit (WTRU), a user equipment (UE), a mobile station (MS), a mobile subscriber unit, a user, a user STA, a network, a base station, a Node-B, an access point (AP), a repeater, a router, a relay, a receiving unit, a transmitting unit, a receiving STA, a transmitting STA, a receiving device, a transmitting device, a receiving apparatus, and/or a transmitting apparatus, which are described below, may imply the STAs 110 and 120 illustrated in the sub-figure (a)/(b) of FIG. 1, or may imply the processing chips 114 and 124 illustrated in the sub-figure (b) of FIG. 1. That is, a technical feature of the present specification may be performed in the STAs 110 and 120 illustrated in the sub-figure (a)/(b) of FIG. 1, or may be performed only in the processing chips 114 and 124 illustrated in the sub-figure (b) of FIG. 1. For example, a technical feature in which the transmitting STA transmits a control signal may be understood as a technical feature in which a control signal generated in the processors 111 and 121 illustrated in the sub-figure (a)/(b) of FIG. 1 is transmitted through the transceivers 113 and 123 illustrated in the sub-figure (a)/(b) of FIG. 1. Alternatively, the technical feature in which the transmitting STA transmits the control signal may be understood as a technical feature in which the control signal to be transferred to the transceivers 113 and 123 is generated in the processing chips 114 and 124 illustrated in the sub-figure (b) of FIG. 1.

For example, a technical feature in which the receiving STA receives the control signal may be understood as a technical feature in which the control signal is received by means of the transceivers 113 and 123 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (a) of FIG. 1 is obtained by the processors 111 and 121 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (b) of FIG. 1 is obtained by the processing chips 114 and 124 illustrated in the sub-figure (b) of FIG. 1.

Referring to the sub-figure (b) of FIG. 1, software codes 115 and 125 may be included in the memories 112 and 122. The software codes 115 and 126 may include instructions for controlling an operation of the processors 111 and 121. The software codes 115 and 125 may be included as various programming languages.

The processors 111 and 121 or processing chips 114 and 124 of FIG. 1 may include an application-specific integrated circuit (ASIC), other chipsets, a logic circuit and/or a data processing device. The processor may be an application processor (AP). For example, the processors 111 and 121 or processing chips 114 and 124 of FIG. 1 may include at least one of a digital signal processor (DSP), a central processing unit (CPU), a graphics processing unit (GPU), and a modulator and demodulator (modem). For example, the processors 111 and 121 or processing chips 114 and 124 of FIG. 1 may be SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or processors enhanced from these processors.

In the present specification, an uplink may imply a link for communication from a non-AP STA to an SP STA, and an uplink PPDU/packet/signal or the like may be transmitted through the uplink. In addition, in the present specification, a downlink may imply a link for communication from the AP STA to the non-AP STA, and a downlink PPDU/packet/signal or the like may be transmitted through the downlink.

Figure 2:
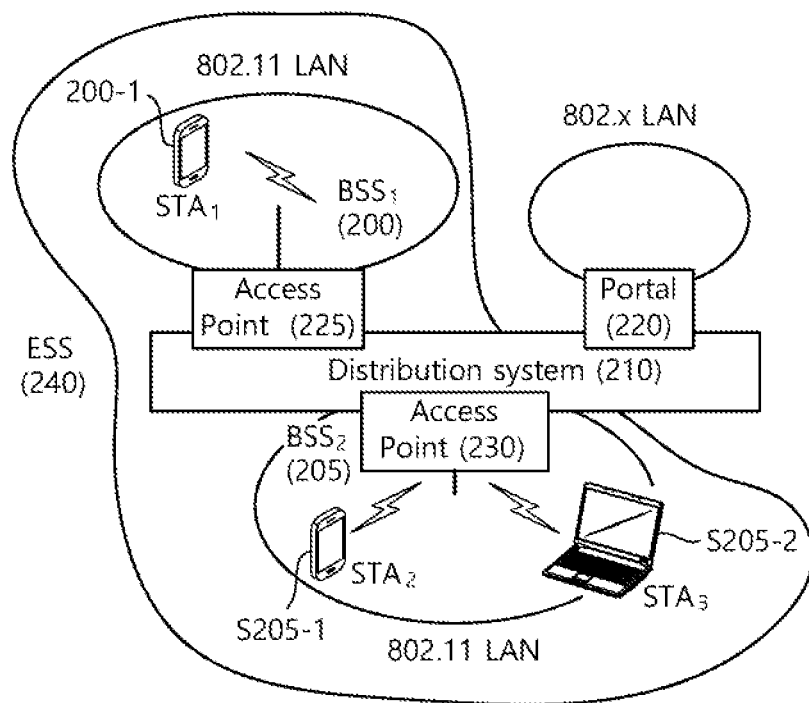
FIG. 2 is a conceptual view illustrating the structure of a wireless local area network (WLAN).
Figure 2:
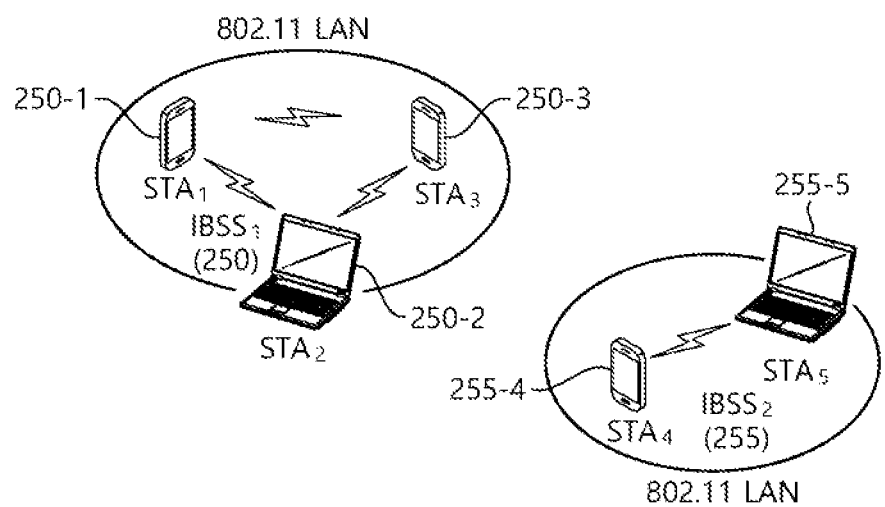

FIG. 2 is a conceptual view illustrating the structure of a wireless local area network (WLAN).

An upper part of FIG. 2 illustrates the structure of an infrastructure basic service set (BSS) of institute of electrical and electronic engineers (IEEE) 802.11.

Referring the upper part of FIG. 2, the wireless LAN system may include one or more infrastructure BS Ss 200 and 205 (hereinafter, referred to as BSS). The BSSs 200 and 205 as a set of an AP and a STA such as an access point (AP) 225 and a station (STA1) 200-1 which are successfully synchronized to communicate with each other are not concepts indicating a specific region. The BSS 205 may include one or more STAs 205-1 and 205-2 which may be joined to one AP 230.

The BSS may include at least one STA, APs providing a distribution service, and a distribution system (DS) 210 connecting multiple APs.

The distribution system 210 may implement an extended service set (ESS) 240 extended by connecting the multiple BSSs 200 and 205. The ESS 240 may be used as a term indicating one network configured by connecting one or more APs 225 or 230 through the distribution system 210. The AP included in one ESS 240 may have the same service set identification (SSID).

A portal 220 may serve as a bridge which connects the wireless LAN network (IEEE 802.11) and another network (e.g., 802.X).

In the BSS illustrated in the upper part of FIG. 2, a network between the APs 225 and 230 and a network between the APs 225 and 230 and the STAs 200-1, 205-1, and 205-2 may be implemented. However, the network is configured even between the STAs without the APs 225 and 230 to perform communication. A network in which the communication is performed by configuring the network even between the STAs without the APs 225 and 230 is defined as an Ad-Hoc network or an independent basic service set (IBSS).

A lower part of FIG. 2 illustrates a conceptual view illustrating the IBSS.

Referring to the lower part of FIG. 2, the IBSS is a BSS that operates in an Ad-Hoc mode. Since the IBSS does not include the access point (AP), a centralized management entity that performs a management function at the center does not exist. That is, in the IBSS, STAs 250-1, 250-2, 250-3, 255-4, and 255-5 are managed by a distributed manner. In the IBSS, all STAs 250-1, 250-2, 250-3, 255-4, and 255-5 may be constituted by movable STAs and are not permitted to access the DS to constitute a self-contained network.

Figure 3:
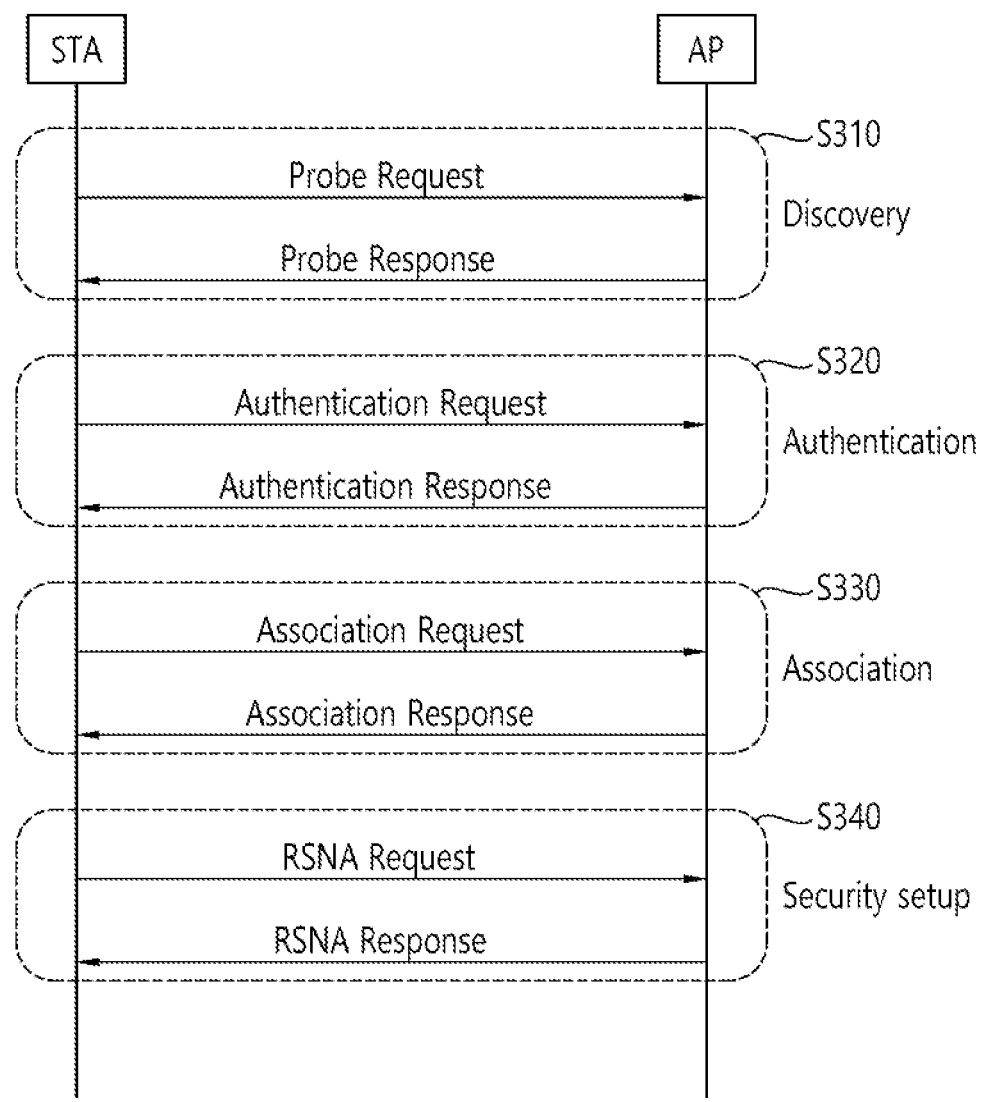
FIG. 3 illustrates a general link setup process.

FIG. 3 illustrates a general link setup process.

In S310, a STA may perform a network discovery operation. The network discovery operation may include a scanning operation of the STA. That is, to access a network, the STA needs to discover a participating network. The STA needs to identify a compatible network before participating in a wireless network, and a process of identifying a network present in a particular area is referred to as scanning. Scanning methods include active scanning and passive scanning.

FIG. 3 illustrates a network discovery operation including an active scanning process. In active scanning, a STA performing scanning transmits a probe request frame and waits for a response to the probe request frame in order to identify which AP is present around while moving to channels. A responder transmits a probe response frame as a response to the probe request frame to the STA having transmitted the probe request frame. Here, the responder may be a STA that transmits the last beacon frame in a BSS of a channel being scanned. In the BSS, since an AP transmits a beacon frame, the AP is the responder. In an IBSS, since STAs in the IBSS transmit a beacon frame in turns, the responder is not fixed. For example, when the STA transmits a probe request frame via channel 1 and receives a probe response frame via channel 1, the STA may store BSS-related information included in the received probe response frame, may move to the next channel (e.g., channel 2), and may perform scanning (e.g., transmits a probe request and receives a probe response via channel 2) by the same method.

Although not shown in FIG. 3, scanning may be performed by a passive scanning method. In passive scanning, a STA performing scanning may wait for a beacon frame while moving to channels. A beacon frame is one of management frames in IEEE 802.11 and is periodically transmitted to indicate the presence of a wireless network and to enable the STA performing scanning to find the wireless network and to participate in the wireless network. In a BSS, an AP serves to periodically transmit a beacon frame. In an IBSS, STAs in the IBSS transmit a beacon frame in turns. Upon receiving the beacon frame, the STA performing scanning stores information related to a BSS included in the beacon frame and records beacon frame information in each channel while moving to another channel. The STA having received the beacon frame may store BSS-related information included in the received beacon frame, may move to the next channel, and may perform scanning in the next channel by the same method.

After discovering the network, the STA may perform an authentication process in S320. The authentication process may be referred to as a first authentication process to be clearly distinguished from the following security setup operation in S340. The authentication process in S320 may include a process in which the STA transmits an authentication request frame to the AP and the AP transmits an authentication response frame to the STA in response. The authentication frames used for an authentication request/response are management frames.

The authentication frames may include information related to an authentication algorithm number, an authentication transaction sequence number, a status code, a challenge text, a robust security network (RSN), and a finite cyclic group.

The STA may transmit the authentication request frame to the AP. The AP may determine whether to allow the authentication of the STA based on the information included in the received authentication request frame. The AP may provide the authentication processing result to the STA via the authentication response frame.

When the STA is successfully authenticated, the STA may perform an association process in S330. The association process includes a process in which the STA transmits an association request frame to the AP and the AP transmits an association response frame to the STA in response. The association request frame may include, for example, information related to various capabilities, a beacon listen interval, a service set identifier (SSID), a supported rate, a supported channel, RSN, a mobility domain, a supported operating class, a traffic indication map (TIM) broadcast request, and an interworking service capability. The association response frame may include, for example, information related to various capabilities, a status code, an association ID (AID), a supported rate, an enhanced distributed channel access (EDCA) parameter set, a received channel power indicator (RCPI), a received signal-to-noise indicator (RSNI), a mobility domain, a timeout interval (association comeback time), an overlapping BSS scanning parameter, a TIM broadcast response, and a QoS map.

In S340, the STA may perform a security setup process. The security setup process in S340 may include a process of setting up a private key through four-way handshaking, for example, through an extensible authentication protocol over LAN (EAPOL) frame.

Figure 4:
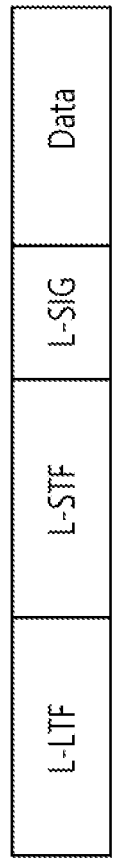
FIG. 4 illustrates an example of a PPDU used in an IEEE standard.
Figure 4:
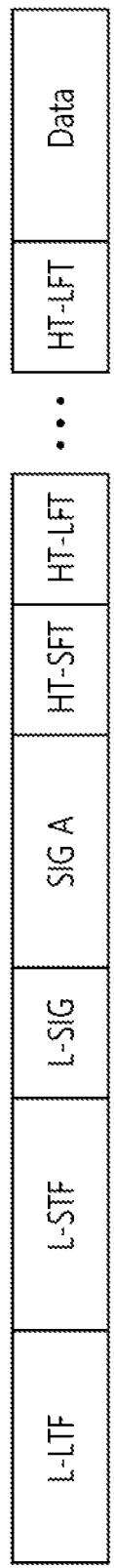
Figure 4:
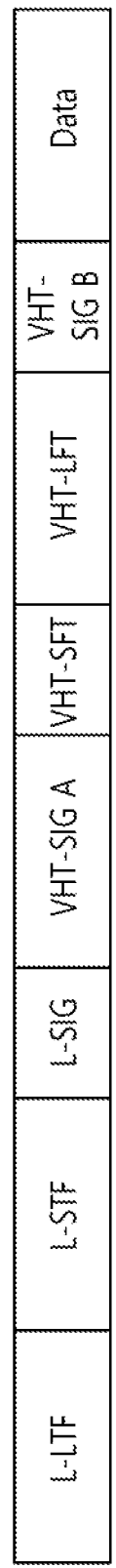
Figure 4:
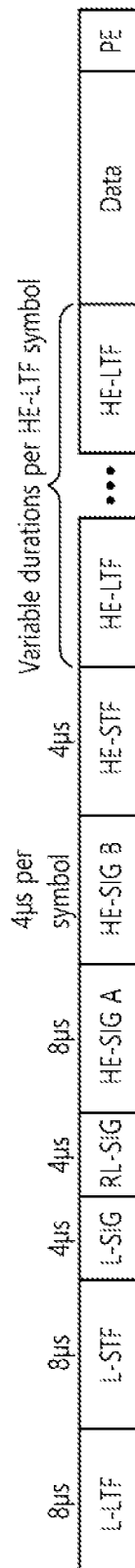

FIG. 4 illustrates an example of a PPDU used in an IEEE standard.

As illustrated, various types of PHY protocol data units (PPDUs) are used in IEEE a/g/n/ac standards. Specifically, an LTF and a STF include a training signal, a SIG-A and a SIG-B include control information for a receiving STA, and a data field includes user data corresponding to a PSDU (MAC PDU/aggregated MAC PDU).

FIG. 4 also includes an example of an HE PPDU according to IEEE 802.11ax. The HE PPDU according to FIG. 4 is an illustrative PPDU for multiple users. An HE-SIG-B may be included only in a PPDU for multiple users, and an HE-SIG-B may be omitted in a PPDU for a single user.

As illustrated in FIG. 4, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted for illustrated time periods (i.e., 4 or 8 μs).

Hereinafter, a resource unit (RU) used for a PPDU is described. An RU may include a plurality of subcarriers (or tones). An RU may be used to transmit a signal to a plurality of STAs according to OFDMA. Further, an RU may also be defined to transmit a signal to one STA. An RU may be used for an STF, an LTF, a data field, or the like.

Figure 5:
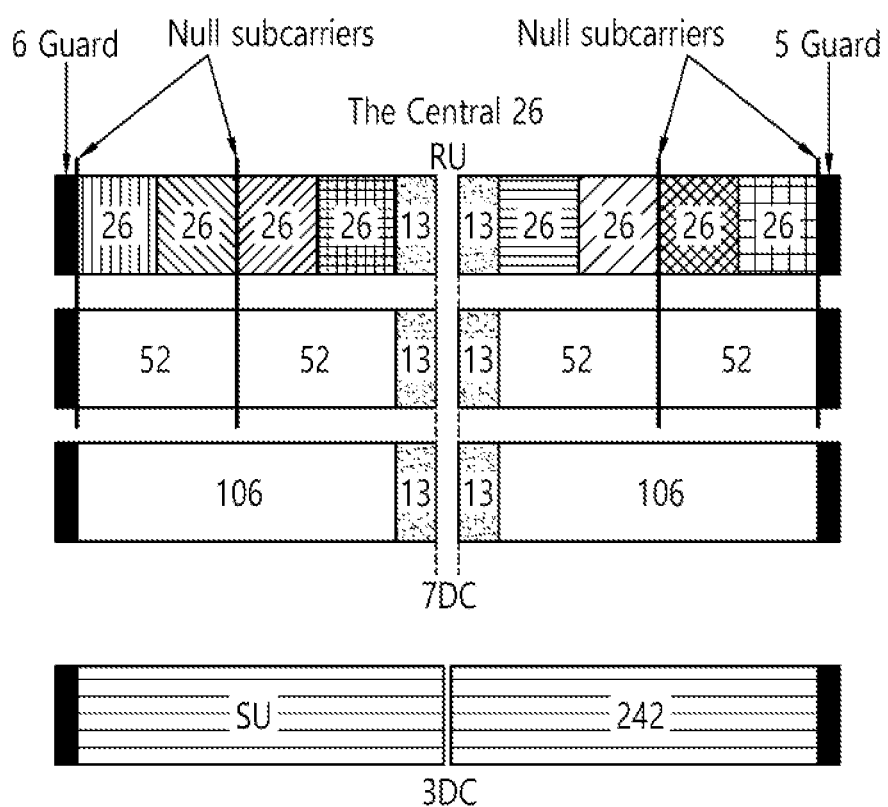
FIG. 5 illustrates a layout of resource units (RUs) used in a band of 20 MHz.

FIG. 5 illustrates a layout of resource units (RUs) used in a band of 20 MHz.

As illustrated in FIG. 5, resource units (RUs) corresponding to different numbers of tones (i.e., subcarriers) may be used to form some fields of an HE-PPDU. For example, resources may be allocated in illustrated RUs for an HE-STF, an HE-LTF, and a data field.

As illustrated in the uppermost part of FIG. 5, a 26-unit (i.e., a unit corresponding to 26 tones) may be disposed. Six tones may be used for a guard band in the leftmost band of the 20 MHz band, and five tones may be used for a guard band in the rightmost band of the 20 MHz band. Further, seven DC tones may be inserted in a center band, that is, a DC band, and a 26-unit corresponding to 13 tones on each of the left and right sides of the DC band may be disposed. A 26-unit, a 52-unit, and a 106-unit may be allocated to other bands. Each unit may be allocated for a receiving STA, that is, a user.

The layout of the RUs in FIG. 5 may be used not only for a multiple users (MUs) but also for a single user (SU), in which case one 242-unit may be used and three DC tones may be inserted as illustrated in the lowermost part of FIG. 5.

Although FIG. 5 proposes RUs having various sizes, that is, a 26-RU, a 52-RU, a 106-RU, and a 242-RU, specific sizes of RUs may be extended or increased. Therefore, the present embodiment is not limited to the specific size of each RU (i.e., the number of corresponding tones).

Figure 6:
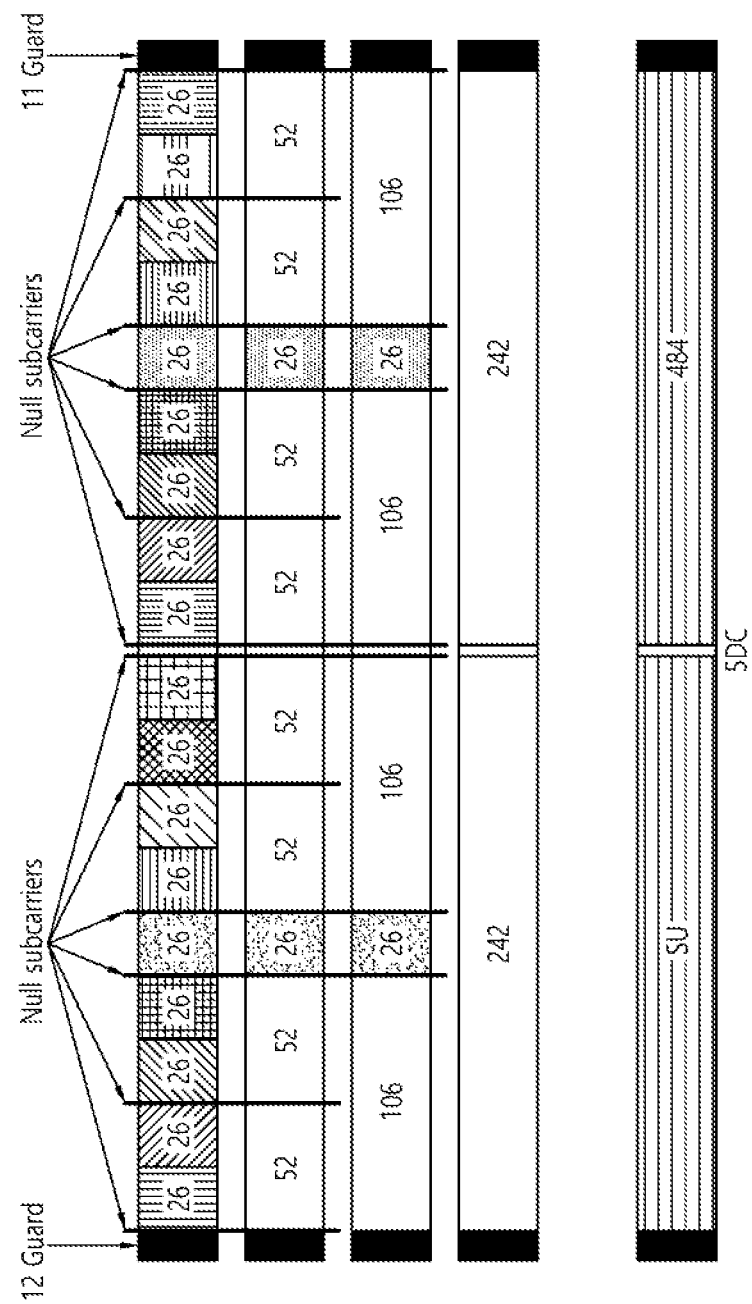
FIG. 6 illustrates a layout of RUs used in a band of 40 MHz.

FIG. 6 illustrates a layout of RUs used in a band of 40 MHz.

Similarly to FIG. 5 in which RUs having various sizes are used, a 26-RU, a 52-RU, a 106-RU, a 242-RU, a 484-RU, and the like may be used in an example of FIG. 6. Further, five DC tones may be inserted in a center frequency, 12 tones may be used for a guard band in the leftmost band of the 40

MHz band, and 11 tones may be used for a guard band in the rightmost band of the 40 MHz band.

As illustrated in FIG. 6, when the layout of the RUs is used for a single user, a 484-RU may be used. The specific number of RUs may be changed similarly to FIG. 5.

Figure 7:
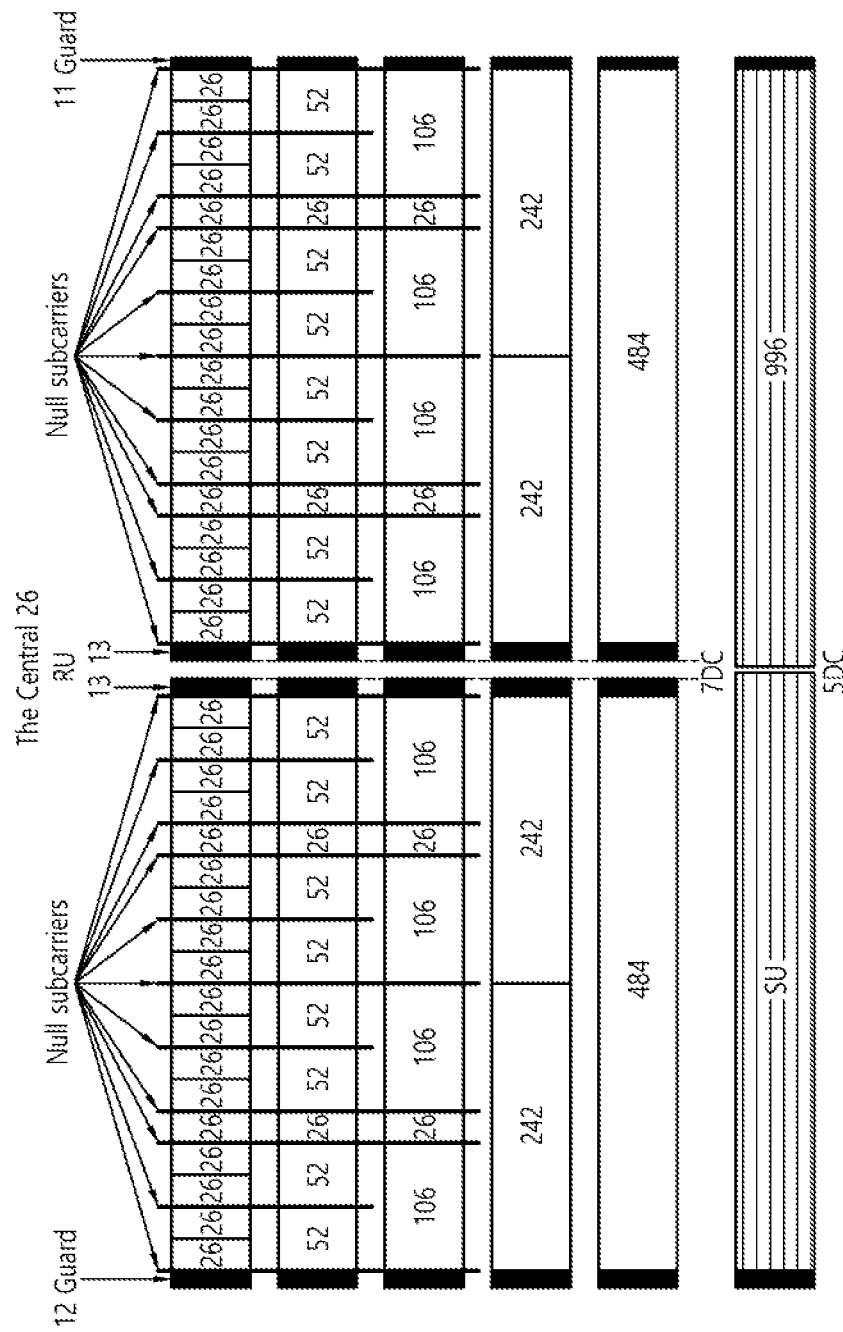
FIG. 7 illustrates a layout of RUs used in a band of 80 MHz.

FIG. 7 illustrates a layout of RUs used in a band of 80 MHz.

Similarly to FIG. 5 and FIG. 6 in which RUs having various sizes are used, a 26-RU, a 52-RU, a 106-RU, a 242-RU, a 484-RU, a 996-RU, and the like may be used in an example of FIG. 7. Further, seven DC tones may be inserted in the center frequency, 12 tones may be used for a guard band in the leftmost band of the 80 MHz band, and 11 tones may be used for a guard band in the rightmost band of the 80 MHz band. In addition, a 26-RU corresponding to 13 tones on each of the left and right sides of the DC band may be used.

As illustrated in FIG. 7, when the layout of the RUs is used for a single user, a 996-RU may be used, in which case five DC tones may be inserted.

The RU described in the present specification may be used in uplink (UL) communication and downlink (DL) communication. For example, when UL-MU communication which is solicited by a trigger frame is performed, a transmitting STA (e.g., an AP) may allocate a first RU (e.g., 26/52/106/242-RU, etc.) to a first STA through the trigger frame, and may allocate a second RU (e.g., 26/52/106/242-RU, etc.) to a second STA. Thereafter, the first STA may transmit a first trigger-based PPDU based on the first RU, and the second STA may transmit a second trigger-based PPDU based on the second RU. The first/second trigger-based PPDU is transmitted to the AP at the same (or overlapped) time period.

For example, when a DL MU PPDU is configured, the transmitting STA (e.g., AP) may allocate the first RU (e.g., 26/52/106/242-RU. etc.) to the first STA, and may allocate the second RU (e.g., 26/52/106/242-RU, etc.) to the second STA. That is, the transmitting STA (e.g., AP) may transmit HE-STF, HE-LTF, and Data fields for the first STA through the first RU in one MU PPDU, and may transmit HE-STF, HE-LTF, and Data fields for the second STA through the second RU.

Information related to a layout of the RU may be signaled through HE-SIG-B.

Figure 8:
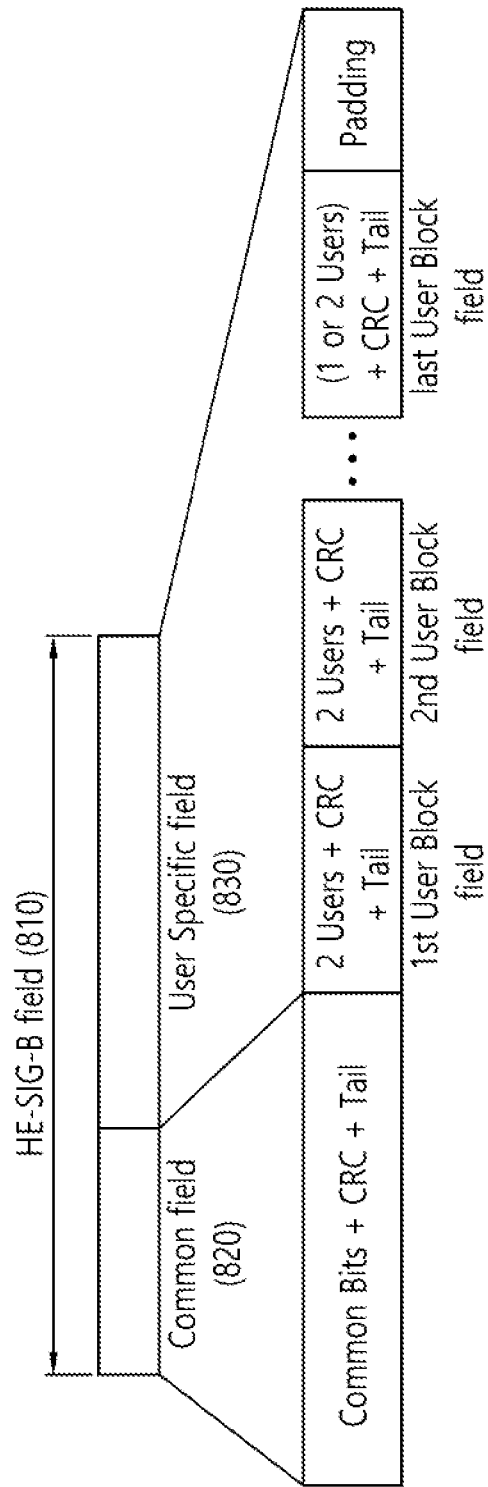
FIG. 8 illustrates a structure of an HE-SIG-B field.

FIG. 8 illustrates a structure of an HE-SIG-B field.

As illustrated, an HE-SIG-B field 810 includes a common field 820 and a user-specific field 830. The common field 820 may include information commonly applied to all users (i.e., user STAs) which receive SIG-B. The user-specific field 830 may be called a user-specific control field. When the SIG-B is transferred to a plurality of users, the user-specific field 830 may be applied only any one of the plurality of users.

As illustrated in FIG. 8, the common field 820 and the user-specific field 830 may be separately encoded.

The common field 820 may include RU allocation information of N*8 bits. For example, the RU allocation information may include information related to a location of an RU. For example, when a 20 MHz channel is used as shown in FIG. 5, the RU allocation information may include information related to a specific frequency band to which a specific RU (26-RU/52-RU/106-RU) is arranged.

An example of a case in which the RU allocation information consists of 8 bits is as follows.

TABLE 1

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 00000000 | 26 | 26 | 26 | 26 | 26 | 26 | 26 | 26 | 26 | 1 |
| 00000001 | 26 | 26 | 26 | 26 | 26 | 26 | 26 | 52 |  | 1 |
| 00000010 | 26 | 26 | 26 | 26 | 26 | 52 | 26 | 26 |  | 1 |
| 00000011 | 26 | 26 | 26 | 26 | 26 | 52 | 52 |  |  | 1 |
| 00000100 | 26 | 26 | 52 | 26 | 26 | 26 | 26 |  |  | 1 |
| 00000101 | 26 | 26 | 52 | 26 | 26 | 26 | 52 |  |  | 1 |
| 00000110 | 26 | 26 | 52 | 26 | 52 | 26 | 26 |  |  | 1 |
| 00000111 | 26 | 26 | 52 | 26 | 52 | 52 |  |  |  | 1 |
| 00001000 | 52 | 26 | 26 | 26 | 26 | 26 | 26 |  |  | 1 |

As shown the example of FIG. 5, up to nine 26-RUs may be allocated to the 20 MHz channel. When the RU allocation information of the common field 820 is set to "00000000" as shown in Table 1, the nine 26-RUs may be allocated to a corresponding channel (i.e., 20 MHz). In addition, when the RU allocation information of the common field 820 is set to "00000001" as shown in Table 1, seven 26-RUs and one 52-RU are arranged in a corresponding channel. That is, in the example of FIG. 5, the 52-RU may be allocated to the rightmost side, and the seven 26-RUs may be allocated to the left thereof.

The example of Table 1 shows only some of RU locations capable of displaying the RU allocation information.

For example, the RU allocation information may include an example of Table 2 below.

TABLE 2

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 01000$y_2y_1y_0$ |  |  | 106 |  | 26 | 26 | 26 | 26 | 26 | 8 |
| 01001$y_2y_1y_0$ |  |  | 106 |  | 26 | 26 | 26 | 52 |  | 8 |

"01000$y_2y_1y_0$" relates to an example in which a 106-RU is allocated to the leftmost side of the 20 MHz channel, and five 26-RUs are allocated to the right side thereof. In this case, a plurality of STAs (e.g., user-STAs) may be allocated to the 106-RU, based on a MU-MIMO scheme. Specifically, up to 8 STAs (e.g., user-STAs) may be allocated to the 106-RU, and the number of STAs (e.g., user-STAs) allocated to the 106-RU is determined based on 3-bit information ($y_2y_1y_0$). For example, when the 3-bit information ($y_2y_1y_0$) is set to N, the number of STAs (e.g., user-STAs) allocated to the 106-RU based on the MU-MIMO scheme may be N+1.

In general, a plurality of STAs (e.g., user STAs) different from each other may be allocated to a plurality of RUs. However, the plurality of STAs (e.g., user STAs) may be allocated to one or more RUs having at least a specific size (e.g., 106 subcarriers), based on the MU-MIMO scheme.

As shown in FIG. 8, the user-specific field 830 may include a plurality of user fields. As described above, the number of STAs (e.g., user STAs) allocated to a specific channel may be determined based on the RU allocation information of the common field 820. For example, when the RU allocation information of the common field 820 is "00000000", one user STA may be allocated to each of nine 26-RUs (e.g., nine user STAs may be allocated). That is, up to 9 user STAs may be allocated to a specific channel through an OFDMA scheme. In other words, up to 9 user STAs may be allocated to a specific channel through a non-MU-MIMO scheme.

For example, when RU allocation is set to "01000y2y1y0", a plurality of STAs may be allocated to the 106-RU arranged at the leftmost side through the MU-MIMO scheme, and five user STAs may be allocated to five 26-RUs arranged to the right side thereof through the non-MU MIMO scheme. This case is specified through an example of FIG. 9.

Figure 9:
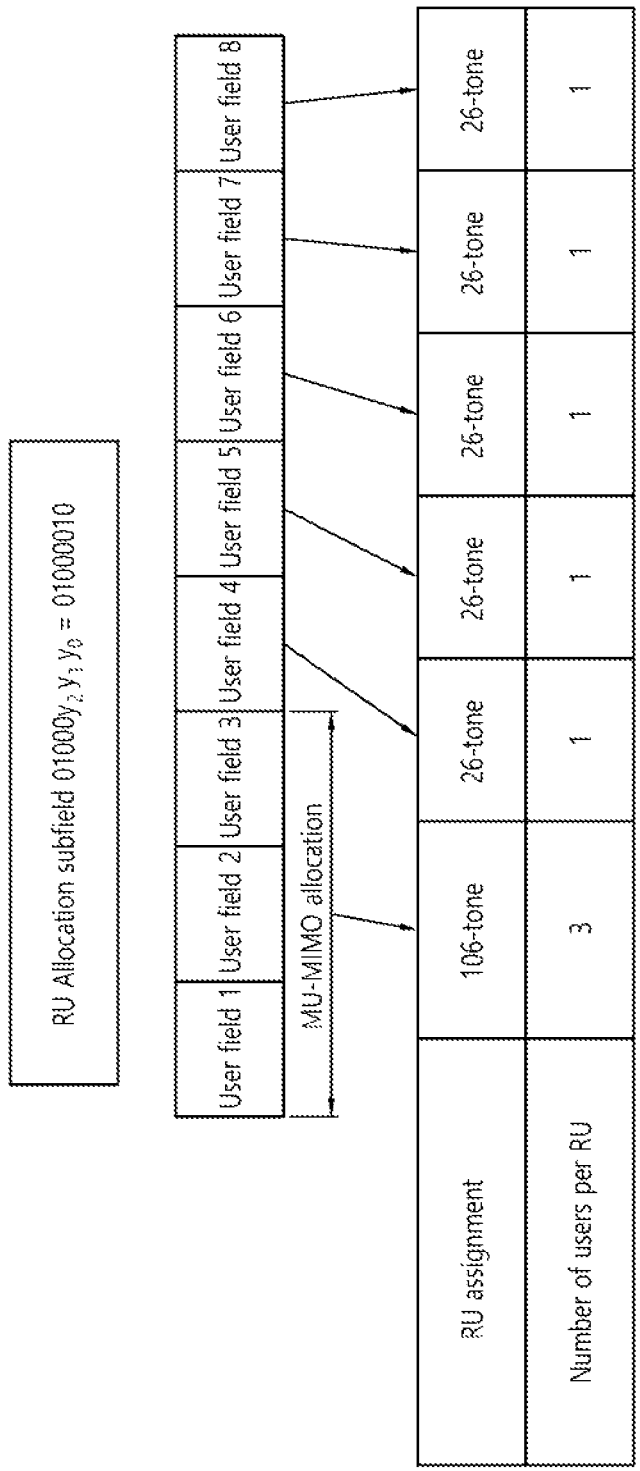
FIG. 9 illustrates an example in which a plurality of user STAs are allocated to the same RU through a MU-MIMO scheme.

FIG. 9 illustrates an example in which a plurality of user STAs are allocated to the same RU through a MU-MIMO scheme.

For example, when RU allocation is set to "01000010" as shown in FIG. 9, a 106-RU may be allocated to the leftmost side of a specific channel, and five 26-RUs may be allocated to the right side thereof. In addition, three user STAs may be allocated to the 106-RU through the MU-MIMO scheme. As a result, since eight user STAs are allocated, the user-specific field 830 of HE-SIG-B may include eight user fields.

The eight user fields may be expressed in the order shown in FIG. 9. In addition, as shown in FIG. 8, two user fields may be implemented with one user block field.

The user fields shown in FIG. 8 and FIG. 9 may be configured based on two formats.

That is, a user field related to a MU-MIMO scheme may be configured in a first format, and a user field related to a non-MIMO scheme may be configured in a second format. Referring to the example of FIG. 9, a user field 1 to a user field 3 may be based on the first format, and a user field 4 to a user field 8 may be based on the second format. The first format or the second format may include bit information of the same length (e.g., 21-bits).

Each user field may have the same size (e.g., 21-bits). For example, the user field of the first format (the first of the MU-MIMO scheme) may be configured as follows.

For example, a first bit (i.e., B0-B10) in the user field (i.e., 21-bits) may include identification information (e.g., STA-ID, partial AID, etc.) of a user STA to which a corresponding user field is allocated. In addition, a second bit (i.e., B11-B14) in the user field (i.e., 21-bits) may include information related to a spatial configuration. Specifically, an example of the second bit (i.e., B11-B14) may be as shown in Table 3 and Table 4 below.

TABLE 3

| $N_{user}$ | B3…B0 | $N_{STS}$ [1] | $N_{STS}$ [2] | $N_{STS}$ [3] | $N_{STS}$ [4] | $N_{STS}$ [5] | $N_{STS}$ [6] | $N_{STS}$ [7] | $N_{STS}$ [8] | Total $N_{STS}$ | Number of entries |
|---|---|---|---|---|---|---|---|---|---|---|---|
| 2 | 0000-0011 | 1-4 | 1 | | | | | | | 2-5 | 10 |
| | 0100-0110 | 2-4 | 2 | | | | | | | 4-6 | |
| | 0111-1000 | 3-4 | 3 | | | | | | | 6-7 | |
| | 1001 | 4 | 4 | | | | | | | 8 | |
| 3 | 0000-0011 | 1-4 | 1 | 1 | | | | | | 3-6 | 13 |
| | 0100-0110 | 2-4 | 2 | 1 | | | | | | 5-7 | |
| | 0111-1000 | 3-4 | 3 | 1 | | | | | | 7-8 | |
| | 1001-1011 | 2-4 | 2 | 2 | | | | | | 6-8 | |
| | 1100 | 3 | 3 | 2 | | | | | | 8 | |
| 4 | 0000-0011 | 1-4 | 1 | 1 | 1 | | | | | 4-7 | 11 |
| | 0100-0110 | 2-4 | 2 | 1 | 1 | | | | | 6-8 | |
| | 0111 | 3 | 3 | 1 | 1 | | | | | 8 | |
| | 1000-1001 | 2-3 | 2 | 2 | 1 | | | | | 7-8 | |
| | 1010 | 2 | 2 | 2 | 2 | | | | | 8 | |

TABLE 4

| $N_{user}$ | B3…B0 | $N_{STS}$ [1] | $N_{STS}$ [2] | $N_{STS}$ [3] | $N_{STS}$ [4] | $N_{STS}$ [5] | $N_{STS}$ [6] | $N_{STS}$ [7] | $N_{STS}$ [8] | Total $N_{STS}$ | Number of entries |
|---|---|---|---|---|---|---|---|---|---|---|---|
| 5 | 0000-0011 | 1-4 | 1 | 1 | 1 | 1 | | | | 5-8 | 7 |
| | 0100-0101 | 2-3 | 2 | 1 | 1 | 1 | | | | 7-8 | |
| | 0110 | 2 | 2 | 2 | 1 | 1 | | | | 8 | |
| 6 | 0000-0010 | 1-3 | 1 | 1 | 1 | 1 | 1 | | | 6-8 | 4 |
| | 0011 | 2 | 2 | 1 | 1 | 1 | 1 | | | 8 | |
| 7 | 0000-0001 | 1-2 | 1 | 1 | 1 | 1 | 1 | 1 | | 7-8 | 2 |
| 8 | 0000 | 1 | 1 | 1 | 1 | 1 | 1 | 1 | 1 | 8 | 1 |

As shown in Table 3 and/or Table 4, the second bit (e.g., B11-B14) may include information related to the number of spatial streams allocated to the plurality of user STAs which are allocated based on the MU-MIMO scheme. For example, when three user STAs are allocated to the 106-RU based on the MU-MIMO scheme as shown in FIG. 9, N user is set to "3". Therefore, values of N_STS[1], N_STS[2], and N_STS [3] may be determined as shown in Table 3. For example, when a value of the second bit (B11-B14) is "0011", it may be set to N_STS[1]=4, N_STS [2]=1, N_STS[3]=1. That is, in the example of FIG. 9, four spatial streams may be allocated to the user field 1, one spatial stream may be allocated to the user field 1, and one spatial stream may be allocated to the user field 3.

As shown in the example of Table 3 and/or Table 4, information (i.e., the second bit, B11-B14) related to the number of spatial streams for the user STA may consist of 4 bits. In addition, the information (i.e., the second bit, B11-B14) on the number of spatial streams for the user STA may support up to eight spatial streams. In addition, the information (i.e., the second bit, B11-B14) on the number of spatial streams for the user STA may support up to four spatial streams for one user STA.

In addition, a third bit (i.e., B15-18) in the user field (i.e., 21-bits) may include modulation and coding scheme (MCS) information. The MCS information may be applied to a data field in a PPDU including corresponding SIG-B.

An MCS, MCS information, an MCS index, an MCS field, or the like used in the present specification may be indicated by an index value. For example, the MCS information may be indicated by an index 0 to an index 11. The MCS information may include information related to a constellation modulation type (e.g., BPSK, QPSK, 16-QAM, 64-QAM, 256-QAM, 1024-QAM, etc.) and information related to a coding rate (e.g., ½, ⅔, ¾, ⅚e, etc.). Information related to a channel coding type (e.g., LCC or LDPC) may be excluded in the MCS information.

In addition, a fourth bit (i.e., B19) in the user field (i.e., 21-bits) may be a reserved field.

In addition, a fifth bit (i.e., B20) in the user field (i.e., 21-bits) may include information related to a coding type (e.g., BCC or LDPC). That is, the fifth bit (i.e., B20) may include information related to a type (e.g., BCC or LDPC) of channel coding applied to the data field in the PPDU including the corresponding SIG-B.

The aforementioned example relates to the user field of the first format (the format of the MU-MIMO scheme). An example of the user field of the second format (the format of the non-MU-MIMO scheme) is as follows.

A first bit (e.g., B0-B10) in the user field of the second format may include identification information of a user STA. In addition, a second bit (e.g., B11-B13) in the user field of the second format may include information related to the number of spatial streams applied to a corresponding RU. In addition, a third bit (e.g., B14) in the user field of the second format may include information related to whether a beamforming steering matrix is applied. A fourth bit (e.g., B15-B18) in the user field of the second format may include modulation and coding scheme (MCS) information. In addition, a fifth bit (e.g., B19) in the user field of the second format may include information related to whether dual carrier modulation (DCM) is applied. In addition, a sixth bit (i.e., B20) in the user field of the second format may include information related to a coding type (e.g., BCC or LDPC).

Figure 10:
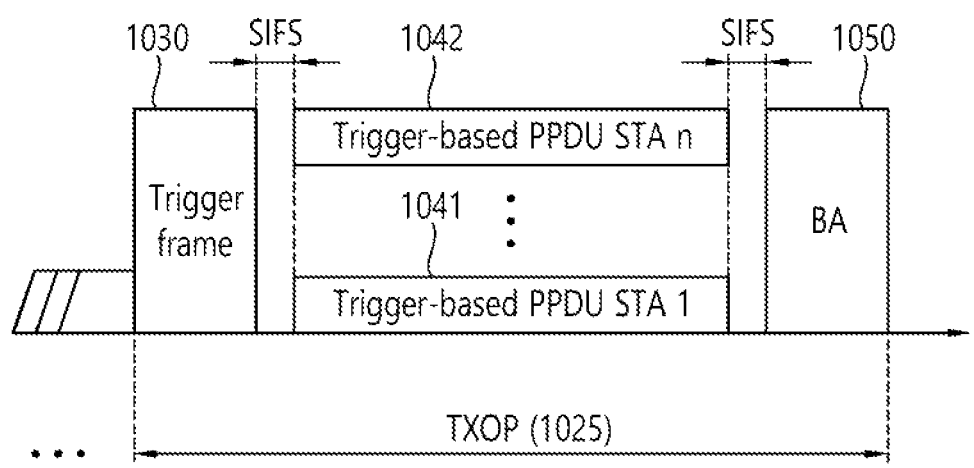
FIG. 10 illustrates an operation based on UL-MU.

FIG. 10 illustrates an operation based on UL-MU. As illustrated, a transmitting STA (e.g., an AP) may perform channel access through contending (e.g., a backoff operation), and may transmit a trigger frame 1030. That is, the transmitting STA may transmit a PPDU including the trigger frame 1030. Upon receiving the PPDU including the trigger frame, a trigger-based (TB) PPDU is transmitted after a delay corresponding to SIFS.

TB PPDUs 1041 and 1042 may be transmitted at the same time period, and may be transmitted from a plurality of STAs (e.g., user STAs) having AIDs indicated in the trigger frame 1030. An ACK frame 1050 for the TB PPDU may be implemented in various forms.

A specific feature of the trigger frame is described with reference to FIG. 11 to FIG. 13. Even if UL-MU communication is used, an orthogonal frequency division multiple access (OFDMA) scheme or a MU MIMO scheme may be used, and the OFDMA and MU-MIMO schemes may be simultaneously used.

Figure 11:
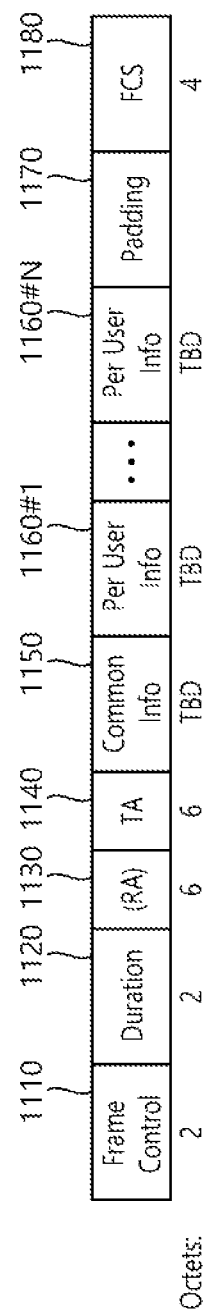
FIG. 11 illustrates an example of a trigger frame.

FIG. 11 illustrates an example of a trigger frame. The trigger frame of FIG. 11 allocates a resource for uplink multiple-user (MU) transmission, and may be transmitted, for example, from an AP. The trigger frame may be configured of a MAC frame, and may be included in a PPDU.

Each field shown in FIG. 11 may be partially omitted, and another field may be added. In addition, a length of each field may be changed to be different from that shown in the figure.

A frame control field 1110 of FIG. 11 may include information related to a MAC protocol version and extra additional control information. A duration field 1120 may include time information for NAV configuration or information related to an identifier (e.g., AID) of a STA.

In addition, an RA field 1130 may include address information of a receiving STA of a corresponding trigger frame, and may be optionally omitted. A TA field 1140 may include address information of a STA (e.g., an AP) which transmits the corresponding trigger frame. A common information field 1150 includes common control information applied to the receiving STA which receives the corresponding trigger frame. For example, a field indicating a length of an L-SIG field of an uplink PPDU transmitted in response to the corresponding trigger frame or information for controlling content of a SIG-A field (i.e., HE-SIG-A field) of the uplink PPDU transmitted in response to the corresponding trigger frame may be included. In addition, as common control information, information related to a length of a CP of the uplink PPDU transmitted in response to the corresponding trigger frame or information related to a length of an LTF field may be included.

In addition, per user information fields 1160 #1 to 1160 #N corresponding to the number of receiving STAs which receive the trigger frame of FIG. 11 are preferably included. The per user information field may also be called an "allocation field".

In addition, the trigger frame of FIG. 11 may include a padding field 1170 and a frame check sequence field 1180.

Each of the per user information fields 1160 #1 to 1160 #N shown in FIG. 11 may include a plurality of subfields.

Figure 12:
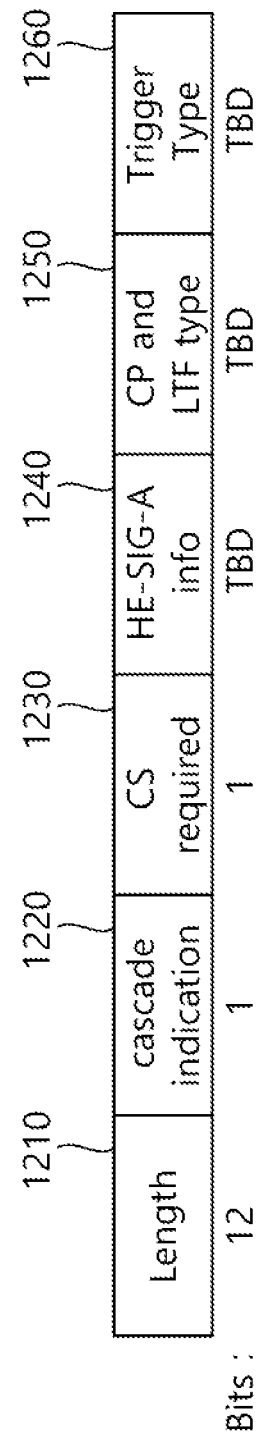
FIG. 12 illustrates an example of a common information field of a trigger frame.

FIG. 12 illustrates an example of a common information field of a trigger frame. A subfield of FIG. 12 may be partially omitted, and an extra subfield may be added. In addition, a length of each subfield illustrated may be changed.

A length field 1210 illustrated has the same value as a length field of an L-SIG field of an uplink PPDU transmitted in response to a corresponding trigger frame, and a length field of the L-SIG field of the uplink PPDU indicates a length of the uplink PPDU. As a result, the length field 1210 of the trigger frame may be used to indicate the length of the corresponding uplink PPDU.

In addition, a cascade identifier field 1220 indicates whether a cascade operation is performed. The cascade operation implies that downlink MU transmission and uplink MU transmission are performed together in the same TXOP. That is, it implies that downlink MU transmission is performed and thereafter uplink MU transmission is performed after a pre-set time (e.g., SIFS). During the cascade operation, only one transmitting device (e.g., AP) may perform downlink communication, and a plurality of transmitting devices (e.g., non-APs) may perform uplink communication.

A CS request field 1230 indicates whether a wireless medium state or a NAV or the like is necessarily considered in a situation where a receiving device which has received a corresponding trigger frame transmits a corresponding uplink PPDU.

An HE-SIG-A information field 1240 may include information for controlling content of a SIG-A field (i.e., HE-SIG-A field) of the uplink PPDU in response to the corresponding trigger frame.

A CP and LTF type field 1250 may include information related to a CP length and LTF length of the uplink PPDU transmitted in response to the corresponding trigger frame. A trigger type field 1260 may indicate a purpose of using the corresponding trigger frame, for example, typical triggering, triggering for beamforming, a request for block ACK/NACK, or the like.

It may be assumed that the trigger type field 1260 of the trigger frame in the present specification indicates a trigger frame of a basic type for typical triggering. For example, the trigger frame of the basic type may be referred to as a basic trigger frame.

Figure 13:
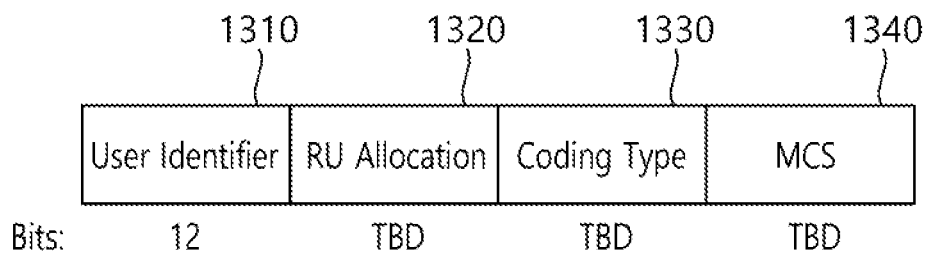
FIG. 13 illustrates an example of a subfield included in a per user information field.

FIG. 13 illustrates an example of a subfield included in a per user information field. A user information field 1300 of FIG. 13 may be understood as any one of the per user information fields 1160 #1 to 1160 #N mentioned above with reference to FIG. 11. A subfield included in the user information field 1300 of FIG. 13 may be partially omitted, and an extra subfield may be added. In addition, a length of each subfield illustrated may be changed.

A user identifier field 1310 of FIG. 13 indicates an identifier of a STA (i.e., receiving STA) corresponding to per user information. An example of the identifier may be the entirety or part of an association identifier (AID) value of the receiving STA.

In addition, an RU allocation field 1320 may be included. That is, when the receiving STA identified through the user identifier field 1310 transmits a TB PPDU in response to the trigger frame, the TB PPDU is transmitted through an RU indicated by the RU allocation field 1320. In this case, the RU indicated by the RU allocation field 1320 may be an RU shown in FIG. 5, FIG. 6, and FIG. 7.

The subfield of FIG. 13 may include a coding type field 1330. The coding type field 1330 may indicate a coding type of the TB PPDU. For example, when BCC coding is applied to the TB PPDU, the coding type field 1330 may be set to '1', and when LDPC coding is applied, the coding type field 1330 may be set to '0'.

In addition, the subfield of FIG. 13 may include an MCS field 1340. The MCS field 1340 may indicate an MCS scheme applied to the TB PPDU. For example, when BCC coding is applied to the TB PPDU, the coding type field 1330 may be set to '1', and when LDPC coding is applied, the coding type field 1330 may be set to '0'.

Hereinafter, a UL OFDMA-based random access (UORA) scheme will be described.

Figure 14:
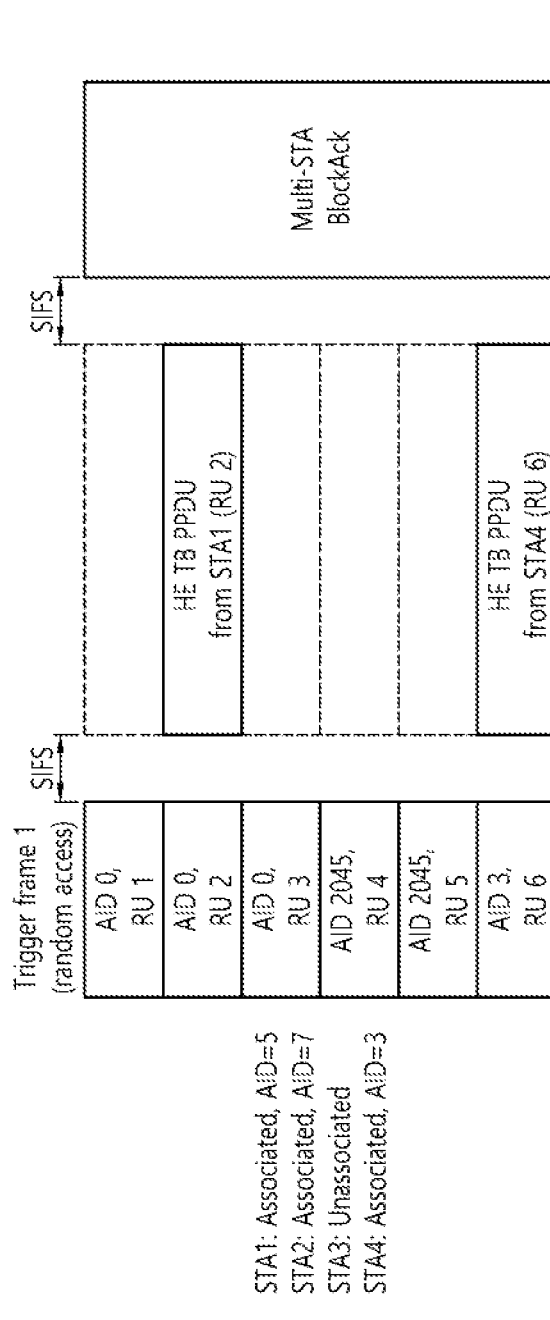
FIG. 14 describes a technical feature of the UORA scheme.

FIG. 14 describes a technical feature of the UORA scheme.

A transmitting STA (e.g., an AP) may allocate six RU resources through a trigger frame as shown in FIG. 14. Specifically, the AP may allocate a 1st RU resource (AID 0, RU 1), a 2nd RU resource (AID 0, RU 2), a 3rd RU resource (AID 0, RU 3), a 4th RU resource (AID 2045, RU 4), a 5th RU resource (AID 2045, RU 5), and a 6th RU resource (AID 3, RU 6). Information related to the AID 0, AID 3, or AID 2045 may be included, for example, in the user identifier field 1310 of FIG. 13. Information related to the RU 1 to RU 6 may be included, for example, in the RU allocation field 1320 of FIG. 13. AID=0 may imply a UORA resource for an associated STA, and AID=2045 may imply a UORA resource for an un-associated STA. Accordingly, the 1st to 3rd RU resources of FIG. 14 may be used as a UORA resource for the associated STA, the 4th and 5th RU resources of FIG. 14 may be used as a UORA resource for the un-associated STA, and the 6th RU resource of FIG. 14 may be used as a typical resource for UL MU.

In the example of FIG. 14, an OFDMA random access backoff (OBO) of a STA1 is decreased to 0, and the STA1 randomly selects the 2nd RU resource (AID 0, RU 2). In addition, since an OBO counter of a STA2/3 is greater than 0, an uplink resource is not allocated to the STA2/3. In addition, regarding a STA4 in FIG. 14, since an AID (e.g., AID=3) of the STA4 is included in a trigger frame, a resource of the RU 6 is allocated without backoff.

Specifically, since the STA1 of FIG. 14 is an associated STA, the total number of eligible RA RUs for the STA1 is 3 (RU 1, RU 2, and RU 3), and thus the STA1 decreases an OBO counter by 3 so that the OBO counter becomes 0. In addition, since the STA2 of FIG. 14 is an associated STA, the total number of eligible RA RUs for the STA2 is 3 (RU 1, RU 2, and RU 3), and thus the STA2 decreases the OBO counter by 3 but the OBO counter is greater than 0. In addition, since the STA3 of FIG. 14 is an un-associated STA, the total number of eligible RA RUs for the STA3 is 2 (RU 4, RU 5), and thus the STA3 decreases the OBO counter by 2 but the OBO counter is greater than 0.

Figure 15:
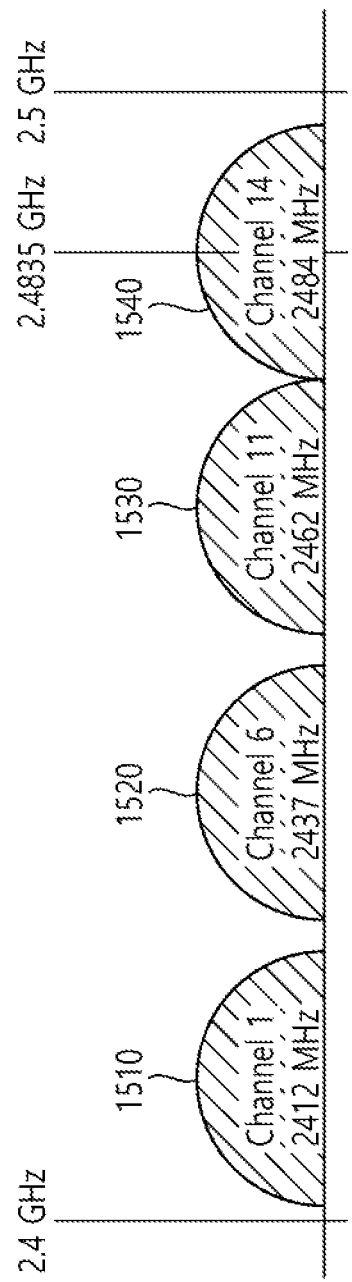
FIG. 15 illustrates an example of a channel used/supported/defined within a 2.4 GHz band.

FIG. 15 illustrates an example of a channel used/supported/defined within a 2.4 GHz band.

The 2.4 GHz band may be called in other terms such as a first band. In addition, the 2.4 GHz band may imply a frequency domain in which channels of which a center frequency is close to 2.4 GHz (e.g., channels of which a center frequency is located within 2.4 to 2.5 GHz) are used/supported/defined.

A plurality of 20 MHz channels may be included in the 2.4 GHz band. 20 MHz within the 2.4 GHz may have a plurality of channel indices (e.g., an index 1 to an index 14). For example, a center frequency of a 20 MHz channel to which a channel index 1 is allocated may be 2.412 GHz, a center frequency of a 20 MHz channel to which a channel index 2 is allocated may be 2.417 GHz, and a center frequency of a 20 MHz channel to which a channel index N is allocated may be (2.407+0.005*N) GHz. The channel index may be called in various terms such as a channel number or the like. Specific numerical values of the channel index and center frequency may be changed.

FIG. 15 exemplifies 4 channels within a 2.4 GHz band. Each of 1st to 4th frequency domains 1510 to 1540 shown herein may include one channel. For example, the 1st frequency domain 1510 may include a channel 1 (a 20 MHz channel having an index 1). In this case, a center frequency of the channel 1 may be set to 2412 MHz. The 2nd frequency domain 1520 may include a channel 6. In this case, a center frequency of the channel 6 may be set to 2437 MHz. The 3rd frequency domain 1530 may include a channel 11. In this case, a center frequency of the channel 11 may be set to 2462 MHz. The 4th frequency domain 1540 may include a channel 14. In this case, a center frequency of the channel 14 may be set to 2484 MHz.

Figure 16:
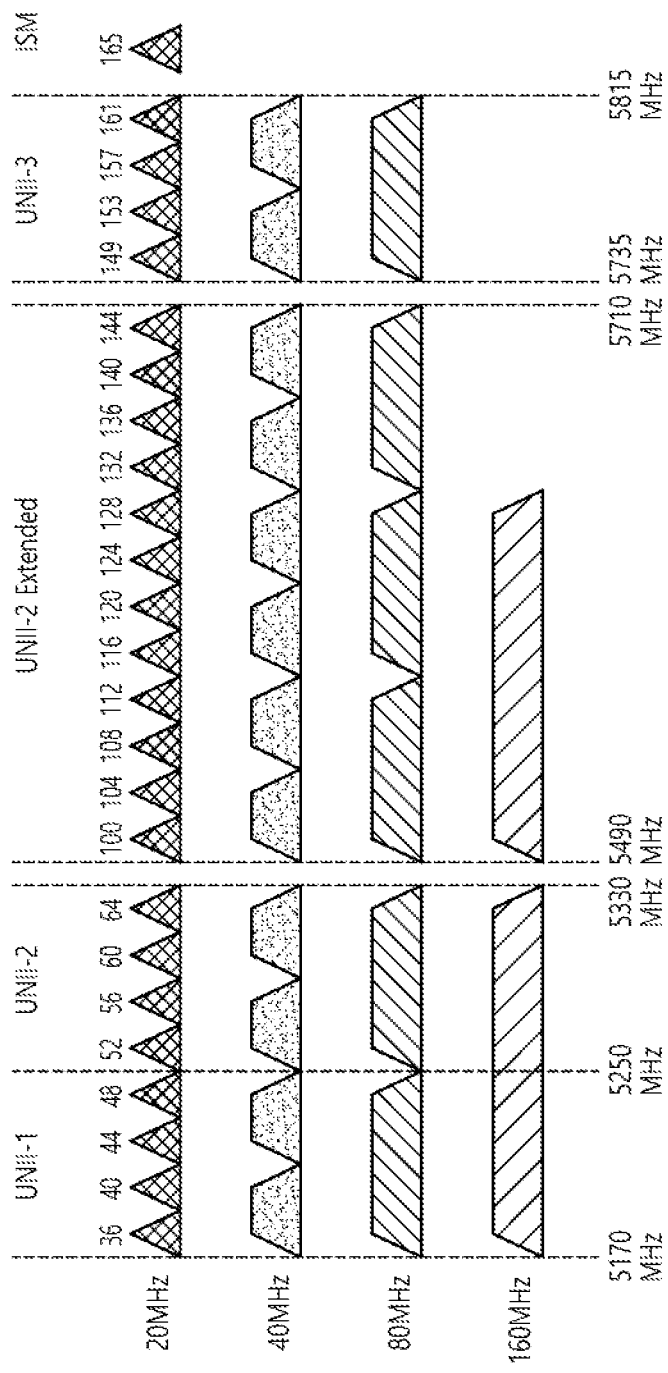
FIG. 16 illustrates an example of a channel used/supported/defined within a 5 GHz band.

FIG. 16 illustrates an example of a channel used/supported/defined within a 5 GHz band.

The 5 GHz band may be called in other terms such as a second band or the like. The 5 GHz band may imply a frequency domain in which channels of which a center frequency is greater than or equal to 5 GHz and less than 6 GHz (or less than 5.9 GHz) are used/supported/defined. Alternatively, the 5 GHz band may include a plurality of channels between 4.5 GHz and 5.5 GHz. A specific numerical value shown in FIG. 16 may be changed.

A plurality of channels within the 5 GHz band include an unlicensed national information infrastructure (UNII)-1, a UNII-2, a UNII-3, and an ISM. The INII-1 may be called UNII Low. The UNII-2 may include a frequency domain called UNII Mid and UNII-2Extended.

The UNII-3 may be called UNII-Upper.

A plurality of channels may be configured within the 5 GHz band, and a bandwidth of each channel may be variously set to, for example, 20 MHz, 40 MHz, 80 MHz, 160 MHz, or the like. For example, 5170 MHz to 5330 MHz frequency domains/ranges within the UNII-1 and UNII-2 may be divided into eight 20 MHz channels. The 5170 MHz to 5330 MHz frequency domains/ranges may be divided into four channels through a 40 MHz frequency domain. The 5170 MHz to 5330 MHz frequency domains/ranges may be divided into two channels through an 80 MHz frequency domain. Alternatively, the 5170 MHz to 5330 MHz frequency domains/ranges may be divided into one channel through a 160 MHz frequency domain.

Figure 17:
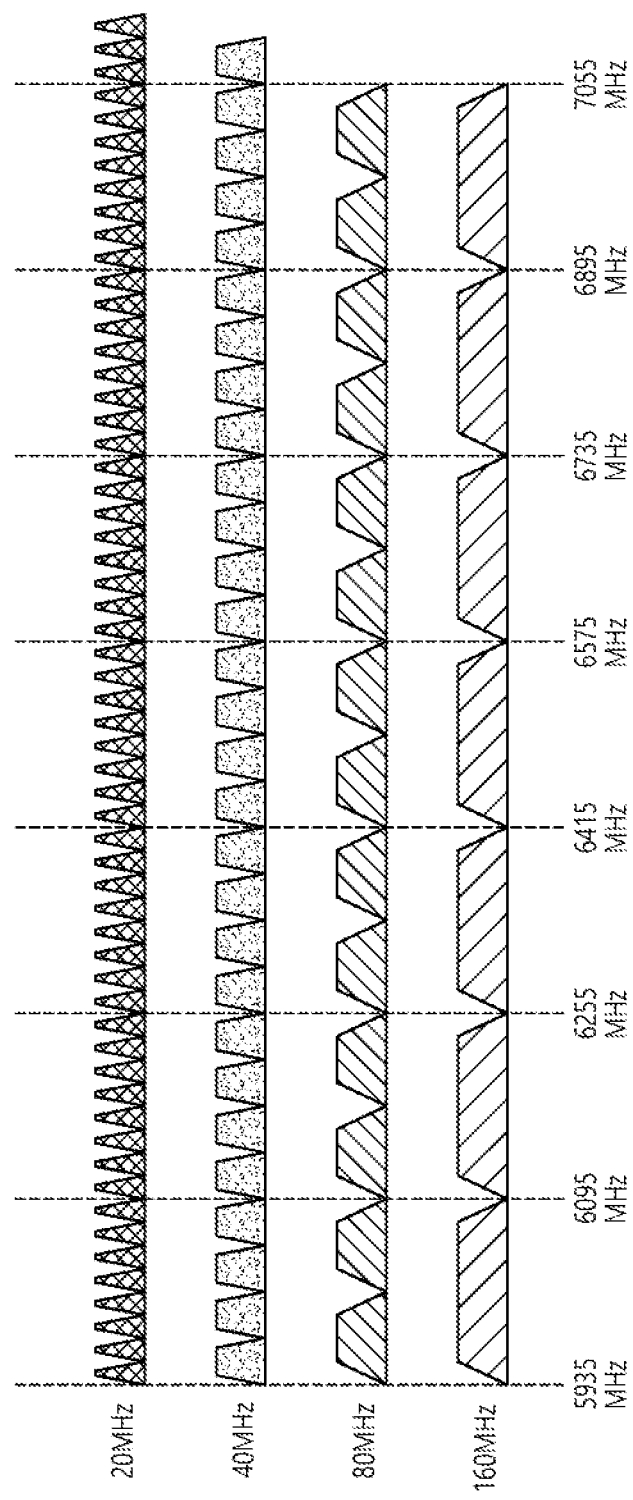
FIG. 17 illustrates an example of a channel used/supported/defined within a 6 GHz band.

FIG. 17 illustrates an example of a channel used/supported/defined within a 6 GHz band.

The 6 GHz band may be called in other terms such as a third band or the like. The 6 GHz band may imply a frequency domain in which channels of which a center frequency is greater than or equal to 5.9 GHz are used/supported/defined. A specific numerical value shown in FIG. 17 may be changed.

For example, the 20 MHz channel of FIG. 17 may be defined starting from 5.940 GHz. Specifically, among 20 MHz channels of FIG. 17, the leftmost channel may have an index 1 (or a channel index, a channel number, etc.), and 5.945 GHz may be assigned as a center frequency. That is, a center frequency of a channel of an index N may be determined as (5.940+0.005*N) GHz.

Accordingly, an index (or channel number) of the 2 MHz channel of FIG. 17 may be 1, 5, 9, 13, 17, 21, 25, 29, 33, 37, 41, 45, 49, 53, 57, 61, 65, 69, 73, 77, 81, 85, 89, 93, 97, 101, 105, 109, 113, 117, 121, 125, 129, 133, 137, 141, 145, 149, 153, 157, 161, 165, 169, 173, 177, 181, 185, 189, 193, 197, 201, 205, 209, 213, 217, 221, 225, 229, 233. In addition, according to the aforementioned (5.940+0.005*N)GHz rule, an index of the 40 MHz channel of FIG. 17 may be 3, 11, 19, 27, 35, 43, 51, 59, 67, 75, 83, 91, 99, 107, 115, 123, 131, 139, 147, 155, 163, 171, 179, 187, 195, 203, 211, 219, 227.

Although 20, 40, 80, and 160 MHz channels are illustrated in the example of FIG. 17, a 240 MHz channel or a 320 MHz channel may be additionally added.

Hereinafter, a PPDU transmitted/received in a STA of the present specification will be described.

Figure 18:
FIG. 18 illustrates an example of a PPDU used in the present specification.

FIG. 18 illustrates an example of a PPDU used in the present specification.

The PPDU of FIG. 18 may be called in various terms such as an EHT PPDU, a TX PPDU, an RX PPDU, a first type or N-th type PPDU, or the like. For example, in the present specification, the PPDU or the EHT PPDU may be called in various terms such as a TX PPDU, a RX PPDU, a first type or N-th type PPDU, or the like. In addition, the EHT PPDU may be used in an EHT system and/or a new WLAN system enhanced from the EHT system.

The PPDU of FIG. 18 may indicate the entirety or part of a PPDU type used in the EHT system. For example, the example of FIG. 18 may be used for both of a single-user (SU) mode and a multi-user (MU) mode. In other words, the PPDU of FIG. 18 may be a PPDU for one receiving STA or a plurality of receiving STAs. When the PPDU of FIG. 18 is used for a trigger-based (TB) mode, the EHT-SIG of FIG. 18 may be omitted. In other words, a STA which has received a trigger frame for uplink-MU (UL-MU) may transmit the PPDU in which the EHT-SIG is omitted in the example of FIG. 18.

In FIG. 18, an L-STF to an EHT-LTF may be called a preamble or a physical preamble, and may be generated/transmitted/received/obtained/decoded in a physical layer.

A subcarrier spacing of the L-STF, L-LTF, L-SIG, RL-SIG, U-SIG, and EHT-SIG fields of FIG. 18 may be determined as 312.5 kHz, and a subcarrier spacing of the EHT-STF, EHT-LTF, and Data fields may be determined as 78.125 kHz. That is, a tone index (or subcarrier index) of the L-STF, L-LTF, L-SIG, RL-SIG, U-SIG, and EHT-SIG fields may be expressed in unit of 312.5 kHz, and a tone index (or subcarrier index) of the EHT-STF, EHT-LTF, and Data fields may be expressed in unit of 78.125 kHz.

In the PPDU of FIG. 18, the L-LTE and the L-STF may be the same as those in the conventional fields.

The L-SIG field of FIG. 18 may include, for example, bit information of 24 bits. For example, the 24-bit information may include a rate field of 4 bits, a reserved bit of 1-bit, a length field of 12 bits, a parity bit of 1-bit, and a tail bit of 6 bits. For example, the length field of 12 bits may include information related to a length or time duration of a PPDU. For example, the length field of 12 bits may be determined based on a type of the PPDU. For example, when the PPDU is a non-HT, HT, VHT PPDU or an EHT PPDU, a value of the length field may be determined as a multiple of 3. For example, when the PPDU is an HE PPDU, the value of the length field may be determined as "a multiple of 3"+1 or "a multiple of 3"+2. In other words, for the non-HT, HT, VHT PPDI or the EHT PPDU, the value of the length field may be determined as a multiple of 3, and for the HE PPDU, the value of the length field may be determined as "a multiple of 3"+1 or "a multiple of 3"+2.

For example, the transmitting STA may apply BCC encoding based on a ½ coding rate to the 24-bit information of the L-SIG field. Thereafter, the transmitting STA may obtain a BCC coding bit of 48 bits. BPSK modulation may be applied to the 48-bit coding bit, thereby generating 48 BPSK symbols. The transmitting STA may map the 48 BPSK symbols to positions except for a pilot subcarrier{subcarrier index −21, −7, +7, +21} and a DC subcarrier {subcarrier index 0}. As a result, the 48 BPSK symbols may be mapped to subcarrier indices −26 to −22, −20 to −8, −6 to −1, +1 to +6, +8 to +20, and +22 to +26. The transmitting STA may additionally map a signal of {−1, −1, −1, 1} to a subcarrier index{−28, −27, +27, +28}. The aforementioned signal may be used for channel estimation on a frequency domain corresponding to {−28, −27, +27, +28}.

The transmitting STA may generate an RL-SIG generated in the same manner as the L-SIG. BPSK modulation may be applied to the RL-SIG. The receiving STA may know that the RX PPDU is the HE PPDU or the EHT PPDU, based on the presence of the RL-SIG.

A universal SIG (U-SIG) may be inserted after the RL-SIG of FIG. 18. The U-SIB may be called in various terms such as a first SIG field, a first SIG, a first type SIG, a control signal, a control signal field, a first (type) control signal, or the like.

The U-SIG may include information of N bits, and may include information for identifying a type of the EHT PPDU. For example, the U-SIG may be configured based on two symbols (e.g., two contiguous OFDM symbols). Each symbol (e.g., OFDM symbol) for the U-SIG may have a duration of 4 us. Each symbol of the U-SIG may be used to transmit the 26-bit information. For example, each symbol of the U-SIG may be transmitted/received based on 52 data tomes and 4 pilot tones.

Through the U-SIG (or U-SIG field), for example, A-bit information (e.g., 52 un-coded bits) may be transmitted. A first symbol of the U-SIG may transmit first X-bit information (e.g., 26 un-coded bits) of the A-bit information, and a second symbol of the U-SIB may transmit the remaining Y-bit information (e.g., 26 un-coded bits) of the A-bit information. For example, the transmitting STA may obtain 26 un-coded bits included in each U-SIG symbol. The transmitting STA may perform convolutional encoding (i.e., BCC encoding) based on a rate of R=½ to generate 52-coded bits, and may perform interleaving on the 52-coded bits. The transmitting STA may perform BPSK modulation on the interleaved 52-coded bits to generate 52 BPSK symbols to be allocated to each U-SIG symbol. One U-SIG symbol may be transmitted based on 65 tones (subcarriers) from a subcarrier index −28 to a subcarrier index +28, except for a DC index 0. The 52 BPSK symbols generated by the transmitting STA may be transmitted based on the remaining tones (subcarriers) except for pilot tones, i.e., tones −21, −7, +7, +21.

For example, the A-bit information (e.g., 52 un-coded bits) generated by the U-SIG may include a CRC field (e.g., a field having a length of 4 bits) and a tail field (e.g., a field having a length of 6 bits). The CRC field and the tail field may be transmitted through the second symbol of the U-SIG. The CRC field may be generated based on 26 bits allocated to the first symbol of the U-SIG and the remaining 16 bits except for the CRC/tail fields in the second symbol, and may be generated based on the conventional CRC calculation algorithm. In addition, the tail field may be used to terminate trellis of a convolutional decoder, and may be set to, for example, "000000".

The A-bit information (e.g., 52 un-coded bits) transmitted by the U-SIG (or U-SIG field) may be divided into version-independent bits and version-dependent bits. For example, the version-independent bits may have a fixed or variable size. For example, the version-independent bits may be allocated only to the first symbol of the U-SIG, or the version-independent bits may be allocated to both of the first and second symbols of the U-SIG. For example, the version-independent bits and the version-dependent bits may be called in various terms such as a first control bit, a second control bit, or the like.

For example, the version-independent bits of the U-SIG may include a PHY version identifier of 3 bits. For example, the PHY version identifier of 3 bits may include information related to a PHY version of a TX/RX PPDU. For example, a first value of the PHY version identifier of 3 bits may indicate that the TX/RX PPDU is an EHT PPDU. In other words, when the transmitting STA transmits the EHT PPDU, the PHY version identifier of 3 bits may be set to a first value. In other words, the receiving STA may determine that the RX PPDU is the EHT PPDU, based on the PHY version identifier having the first value.

For example, the version-independent bits of the U-SIG may include a UL/DL flag field of 1-bit. A first value of the UL/DL flag field of 1-bit relates to UL communication, and a second value of the UL/DL flag field relates to DL communication.

For example, the version-independent bits of the U-SIG may include information related to a TXOP length and information related to a BSS color ID.

For example, when the EHT PPDU is divided into various types (e.g., various types such as an EHT PPDU related to an SU mode, an EHT PPDU related to a MU mode, an EHT PPDU related to a TB mode, an EHT PPDU related to extended range transmission, or the like), information related to the type of the EHT PPDU may be included in the version-dependent bits of the U-SIG.

For example, the U-SIG may include: 1) a bandwidth field including information related to a bandwidth; 2) a field including information related to an MCS scheme applied to EHT-SIG; 3) an indication field including information regarding whether a dual subcarrier modulation (DCM) scheme is applied to EHT-SIG; 4) a field including information related to the number of symbol used for EHT-SIG; 5) a field including information regarding whether the EHT-SIG is generated across a full band; 6) a field including information related to a type of EHT-LTF/STF; and 7) information related to a field indicating an EHT-LTF length and a CP length.

Preamble puncturing may be applied to the PPDU of FIG. 18. The preamble puncturing implies that puncturing is applied to part (e.g., a secondary 20 MHz band) of the full band. For example, when an 80 MHz PPDU is transmitted, a STA may apply puncturing to the secondary 20 MHz band out of the 80 MHz band, and may transmit a PPDU only through a primary 20 MHz band and a secondary 40 MHz band.

For example, a pattern of the preamble puncturing may be configured in advance. For example, when a first puncturing pattern is applied, puncturing may be applied only to the secondary 20 MHz band within the 80 MHz band. For example, when a second puncturing pattern is applied, puncturing may be applied to only any one of two secondary 20 MHz bands included in the secondary 40 MHz band within the 80 MHz band. For example, when a third puncturing pattern is applied, puncturing may be applied to only the secondary 20 MHz band included in the primary 80 MHz band within the 160 MHz band (or 80+80 MHz band). For example, when a fourth puncturing is applied, puncturing may be applied to at least one 20 MHz channel not belonging to a primary 40 MHz band in the presence of the primary 40 MHz band included in the 80 MHaz band within the 160 MHz band (or 80+80 MHz band).

Information related to the preamble puncturing applied to the PPDU may be included in U-SIG and/or EHT-SIG. For example, a first field of the U-SIG may include information related to a contiguous bandwidth, and second field of the U-SIG may include information related to the preamble puncturing applied to the PPDU.

For example, the U-SIG and the EHT-SIG may include the information related to the preamble puncturing, based on the following method. When a bandwidth of the PPDU exceeds 80 MHz, the U-SIG may be configured individually in unit of 80 MHz. For example, when the bandwidth of the PPDU is 160 MHz, the PPDU may include a first U-SIG for a first 80 MHz band and a second U-SIG for a second 80 MHz band. In this case, a first field of the first U-SIG may include information related to a 160 MHz bandwidth, and a second field of the first U-SIG may include information related to a preamble puncturing (i.e., information related to a preamble puncturing pattern) applied to the first 80 MHz band. In addition, a first field of the second U-SIG may include information related to a 160 MHz bandwidth, and a second field of the second U-SIG may include information related to a preamble puncturing (i.e., information related to a preamble puncturing pattern) applied to the second 80 MHz band. Meanwhile, an EHT-SIG contiguous to the first U-SIG may include information related to a preamble puncturing applied to the second 80 MHz band (i.e., information related to a preamble puncturing pattern), and an EHT-SIG contiguous to the second U-SIG may include information related to a preamble puncturing (i.e., information related to a preamble puncturing pattern) applied to the first 80 MHz band.

Additionally or alternatively, the U-SIG and the EHT-SIG may include the information related to the preamble puncturing, based on the following method. The U-SIG may include information related to a preamble puncturing (i.e., information related to a preamble puncturing pattern) for all bands. That is, the EHT-SIG may not include the information related to the preamble puncturing, and only the U-SIG may include the information related to the preamble puncturing (i.e., the information related to the preamble puncturing pattern).

The U-SIG may be configured in unit of 20 MHz. For example, when an 80 MHz PPDU is configured, the U-SIG may be duplicated. That is, four identical U-SIGs may be included in the 80 MHz PPDU. PPDUs exceeding an 80 MHz bandwidth may include different U-SIGs.

The EHT-SIG of FIG. 18 may include control information for the receiving STA. The EHT-SIG may be transmitted through at least one symbol, and one symbol may have a length of 4 us. Information related to the number of symbols used for the EHT-SIG may be included in the U-SIG.

The EHT-SIG may include a technical feature of the HE-SIG-B described with reference to FIG. 8 and FIG. 9. For example, the EHT-SIG may include a common field and a user-specific field as in the example of FIG. 8. The common field of the EHT-SIG may be omitted, and the number of user-specific fields may be determined based on the number of users.

As in the example of FIG. 8, the common field of the EHT-SIG and the user-specific field of the EHT-SIG may be individually coded. One user block field included in the user-specific field may include information for two users, but a last user block field included in the user-specific field may include information for one user. That is, one user block field of the EHT-SIG may include up to two user fields. As in the example of FIG. 9, each user field may be related to MU-MIMO allocation, or may be related to non-MU-MIMO allocation.

As in the example of FIG. 8, the common field of the EHT-SIG may include a CRC bit and a tail bit. A length of the CRC bit may be determined as 4 bits. A length of the tail bit may be determined as 6 bits, and may be set to '000000'.

As in the example of FIG. 8, the common field of the EHT-SIG may include RU allocation information. The RU allocation information may imply information related to a location of an RU to which a plurality of users (i.e., a plurality of receiving STAs) are allocated. The RU allocation information may be configured in unit of 8 bits (or N bits), as in Table 1.

The example of Table 5 to Table 7 is an example of 8-bit (or N-bit) information for various RU allocations. An index shown in each table may be modified, and some entries in Table 5 to Table 7 may be omitted, and entries (not shown) may be added.

The example of Table 5 to Table 7 relates to information related to a location of an RU allocated to a 20 MHz band. For example, 'an index 0' of Table 5 may be used in a situation where nine 26-RUs are individually allocated (e.g., in a situation where nine 26-RUs shown in FIG. 5 are individually allocated).

Meanwhile, a plurality or RUs may be allocated to one STA in the EHT system. For example, regarding 'an index 60' of Table 6, one 26-RU may be allocated for one user (i.e., receiving STA) to the leftmost side of the 20 MHz band, one 26-RU and one 52-RU may be allocated to the right side thereof, and five 26-RUs may be individually allocated to the right side thereof.

TABLE 5

| Indices | #1 | #2 | #3 | #4 | #5 | #6 | #7 | #8 | #9 | Number of entries |
|---|---|---|---|---|---|---|---|---|---|---|
| 0 | 26 | 26 | 26 | 26 | 26 | 26 | 26 | 26 | 26 | 1 |
| 1 | 26 | 26 | 26 | 26 | 26 | 26 | 26 | 52 | | 1 |
| 2 | 26 | 26 | 26 | 26 | 26 | 52 | | 26 | 26 | 1 |
| 3 | 26 | 26 | 26 | 26 | 26 | 52 | | 52 | | 1 |
| 4 | 26 | 26 | | 52 | 26 | 26 | 26 | 26 | 26 | 1 |
| 5 | 26 | 26 | | 52 | 26 | 26 | 26 | 52 | | 1 |
| 6 | 26 | 26 | | 52 | 26 | 52 | | 26 | 26 | 1 |
| 7 | 26 | 26 | | 52 | 26 | 52 | | 52 | | 1 |
| 8 | 52 | | 26 | 26 | 26 | 26 | 26 | 26 | 26 | 1 |
| 9 | 52 | | 26 | 26 | 26 | 26 | 26 | 52 | | 1 |
| 10 | 52 | | 26 | 26 | 26 | 52 | | 26 | 26 | 1 |
| 11 | 52 | | 26 | 26 | 26 | 52 | | 52 | | 1 |
| 12 | 52 | | | 52 | 26 | 26 | 26 | 26 | 26 | 1 |
| 13 | 52 | | | 52 | 26 | 26 | 26 | 52 | | 1 |
| 14 | 52 | | | 52 | 26 | 52 | | 26 | 26 | 1 |
| 15 | 52 | | | 52 | 26 | 52 | | 52 | | 1 |
| 16 | 26 | 26 | 26 | 26 | 26 | | 106 | | | 1 |
| 17 | 26 | 26 | | 52 | 26 | | 106 | | | 1 |
| 18 | 52 | | 26 | 26 | 26 | | 106 | | | 1 |
| 19 | 52 | | | 52 | 26 | | 106 | | | 1 |

TABLE 6

| Indices | #1 | #2 | #3 | #4 | #5 | #6 | #7 | #8 | #9 | Number of entries |
|---|---|---|---|---|---|---|---|---|---|---|
| 20 | | 106 | | | 26 | 26 | 26 | 26 | 26 | 1 |
| 21 | | 106 | | | 26 | 26 | 26 | 52 | | 1 |
| 22 | | 106 | | | 26 | 52 | | 26 | 26 | 1 |
| 23 | | 106 | | | 26 | 52 | | 52 | | 1 |
| 24 | 52 | | 52 | | — | | 52 | | 52 | 1 |
| 25 | 242-tone RU empty (with zero users) | | | | | | | | | 1 |
| 26 | | 106 | | | 26 | | 106 | | | 1 |
| 27-34 | | | | 242 | | | | | | 8 |
| 35-42 | | | | 484 | | | | | | 8 |
| 43-50 | | | | 996 | | | | | | 8 |
| 51-58 | | | | 2*996 | | | | | | 8 |
| 59 | 26 | 26 | 26 | 26 | 26 | | 52 + 26 | | 26 | 1 |
| 60 | 26 | | 26 + 52 | | 26 | 26 | 26 | 26 | 26 | 1 |
| 61 | 26 | | 26 + 52 | | 26 | 26 | 26 | 52 | | 1 |
| 62 | 26 | | 26 + 52 | | 26 | 52 | | 26 | 26 | 1 |
| 63 | 26 | 26 | | 52 | 26 | | 52 + 26 | | 26 | 1 |

TABLE 6-continued

| Indices | #1 | #2 | #3 | #4 | #5 | #6 | #7 | #8 | #9 | Number of entries |
|---|---|---|---|---|---|---|---|---|---|---|
| 64 | 26 | | 26 + 52 | | 26 | | 52 + 26 | | 26 | 1 |
| 65 | 26 | | 26 + 52 | | 26 | | 52 | | 52 | 1 |

TABLE 7

| | | | | | | | | | | |
|---|---|---|---|---|---|---|---|---|---|---|
| 66 | 52 | | 26 | 26 | 26 | | 52 + 26 | | 26 | 1 |
| 67 | 52 | | 52 | | 26 | | 52 + 26 | | 26 | 1 |
| 68 | 52 | | 52 + 26 | | | | 52 | | 52 | 1 |
| 69 | 26 | 26 | 26 | 26 | | | 26 + 106 | | | 1 |
| 70 | 26 | | 26 + 52 | | 26 | | 106 | | | 1 |
| 71 | 26 | 26 | 52 | | | | 26 + 106 | | | 1 |
| 72 | 26 | | 26 + 52 | | | | 26 + 106 | | | 1 |
| 73 | 52 | | 26 | 26 | | | 26 + 106 | | | 1 |
| 74 | 52 | | 52 | | | | 26 + 106 | | | 1 |
| 75 | | | 106 + 26 | | | 26 | 26 | 26 | 26 | 1 |
| 76 | | | 106 + 26 | | | 26 | 26 | | 52 | 1 |
| 77 | | | 106 + 26 | | | | 52 | 26 | 26 | 1 |
| 78 | | | 106 | | 26 | | 52 + 26 | | 26 | 1 |
| 79 | | | 106 + 26 | | | | 52 + 26 | | 26 | 1 |
| 80 | | | 106 + 26 | | | | 52 | | 52 | 1 |
| 81 | | | 106 + 26 | | | | 106 | | | 1 |
| 82 | | | 106 | | | | 26 + 106 | | | 1 |

A mode in which the common field of the EHT-SIG is omitted may be supported. The mode in which the common field of the EHT-SIG is omitted may be called a compressed mode. When the compressed mode is used, a plurality of users (i.e., a plurality of receiving STAs) may decode the PPDU (e.g., the data field of the PPDU), based on non-OFDMA. That is, the plurality of users of the EHT PPDU may decode the PPDU (e.g., the data field of the PPDU) received through the same frequency band. Meanwhile, when a non-compressed mode is used, the plurality of users of the EHT PPDU may decode the PPDU (e.g., the data field of the PPDU), based on OFDMA. That is, the plurality of users of the EHT PPDU may receive the PPDU (e.g., the data field of the PPDU) through different frequency bands.

The EHT-SIG may be configured based on various MCS schemes. As described above, information related to an MCS scheme applied to the EHT-SIG may be included in U-SIG. The EHT-SIG may be configured based on a DCM scheme. For example, among N data tones (e.g., 52 data tones) allocated for the EHT-SIG, a first modulation scheme may be applied to half of contiguous tones, and a second modulation scheme may be applied to the remaining half of the contiguous tones. That is, a transmitting STA may use the first modulation scheme to modulate specific control information through a first symbol and allocate it to half of the contiguous tones, and may use the second modulation scheme to modulate the same control information by using a second symbol and allocate it to the remaining half of the contiguous tones. As described above, information (e.g., a 1-bit field) regarding whether the DCM scheme is applied to the EHT-SIG may be included in the U-SIG.

An HE-STF of FIG. 18 may be used for improving automatic gain control estimation in a multiple input multiple output (MIMO) environment or an OFDMA environment. An HE-LTF of FIG. 18 may be used for estimating a channel in the MIMO environment or the OFDMA environment.

The EHT-STF of FIG. 18 may be set in various types. For example, a first type of STF (e.g., 1×STF) may be generated based on a first type STF sequence in which a non-zero coefficient is arranged with an interval of 16 subcarriers. An STF signal generated based on the first type STF sequence may have a period of 0.8 μs, and a periodicity signal of 0.8 μs may be repeated 5 times to become a first type STF having a length of 4 μs. For example, a second type of STF (e.g., 2×STF) may be generated based on a second type STF sequence in which a non-zero coefficient is arranged with an interval of 8 subcarriers. An STF signal generated based on the second type STF sequence may have a period of 1.6 μs, and a periodicity signal of 1.6 μs may be repeated 5 times to become a second type STF having a length of 8 μs. Hereinafter, an example of a sequence for configuring an EHT-STF (i.e., an EHT-STF sequence) is proposed. The following sequence may be modified in various ways.

The EHT-STF may be configured based on the following sequence M.

$$M = \{-1,-1,-1,1,1,1,-1,1,1,1,-1,1,1,-1,1\} \qquad \text{<Equation 1>}$$

The EHT-STF for the 20 MHz PPDU may be configured based on the following equation. The following example may be a first type (i.e., 1×STF) sequence. For example, the first type sequence may be included in not a trigger-based (TB) PPDU but an EHT-PPDU. In the following equation, (a:b:c) may imply a duration defined as b tone intervals (i.e., a subcarrier interval) from a tone index (i.e., subcarrier index) 'a' to a tone index 'c'. For example, the equation 2 below may represent a sequence defined as 16 tone intervals from a tone index −112 to a tone index 112. Since a subcarrier spacing of 78.125 kHz is applied to the EHT-STR, the 16 tone intervals may imply that an EHT-STF coefficient (or element) is arranged with an interval of 78.125*16=1250 kHz. In addition, * implies multiplication, and sqrt( ) implies a square root. In addition, j implies an imaginary number.

$$EHT\text{-}STF(-112:16:112) = \{M\}*(1+j)/\text{sqrt}(2)$$

$$EHT\text{-}STF(0) = 0 \qquad \text{<Equation 2>}$$

The EHT-STF for the 40 MHz PPDU may be configured based on the following equation. The following example may be the first type (i.e., 1×STF) sequence.

$$EHT\text{-}STF(-240:16:240) = \{M,0,-M\}*(1+j)/\text{sqrt}(2) \qquad \text{<Equation 3>}$$

The EHT-STF for the 80 MHz PPDU may be configured based on the following equation. The following example may be the first type (i.e., 1×STF) sequence.

$$EHT\text{-}STF(-496:16:496) = \{M,1,-M,0,-M,1,-M\}*(1+j)/\text{sqrt}(2) \qquad \text{<Equation 4>}$$

The EHT-STF for the 160 MHz PPDU may be configured based on the following equation. The following example may be the first type (i.e., 1×STF) sequence.

$$EHT\text{-}STF(-1008:16:1008) = \{M,1,-M,0,-M,1,-M,0,-M,-1,M,0,-M,1,-M\}*(1+j)/\text{sqrt}(2) \qquad \text{<Equation 5>}$$

In the EHT-STF for the 80+80 MHz PPDU, a sequence for lower 80 MHz may be identical to Equation 4. In the EHT-STF for the 80+80 MHz PPDU, a sequence for upper 80 MHz may be configured based on the following equation.

$$EHT\text{-}STF(-496:16:496) = \{-M,-1,M,0,-M,1,-M\}*(1+j)/\text{sqrt}(2) \qquad \text{<Equation 6>}$$

Equation 7 to Equation 11 below relate to an example of a second type (i.e., 2×STF) sequence.

$$EHT\text{-}STF(-120:8:120) = \{M,0,-M\}*(1+j)/\text{sqrt}(2) \qquad \text{<Equation 7>}$$

The EHT-STF for the 40 MHz PPDU may be configured based on the following equation.

$$EHT\text{-}STF(-248:8:248)=\{M,-1,-M,0,M,-1,M\}*(1+j)/\text{sqrt}(2)$$

$$EHT\text{-}STF(-248)=0$$

$$EHT\text{-}STF(248)=0 \quad \text{<Equation 8>}$$

The EHT-STF for the 80 MHz PPDU may be configured based on the following equation.

$$EHT\text{-}STF(-504:8:504)=\{M,-1,M,-1,-M,-1,M,0,-M,1,M,1,-M,1,-M\}*(1+j)/\text{sqrt}(2) \quad \text{<Equation 9>}$$

The EHT-STF for the 160 MHz PPDU may be configured based on the following equation.

$$EHT\text{-}STF(-1016:16:1016)=\{M,-1,M,-1,-M,-1,M,0,-M,1,M,1,-M,1,-M,0,-M,1,-M,1,M,1,-M,0,-M,1,M,1,-M,1,-M\}*(1+j)/\text{sqrt}(2)$$

$$EHT\text{-}STF(-8)=0, EHT\text{-}STF(8)=0,$$

$$EHT\text{-}STF(-1016)=0, EHT\text{-}STF(1016)=0 \quad \text{<Equation 10>}$$

In the EHT-STF for the 80+80 MHz PPDU, a sequence for lower 80 MHz may be identical to Equation 9. In the EHT-STF for the 80+80 MHz PPDU, a sequence for upper 80 MHz may be configured based on the following equation.

$$EHT\text{-}STF(-504:8:504)=\{-M,1,-M,1,M,1,-M,0,-M,1,M,1,-M,1,-M\}*(1+j)/\text{sqrt}(2)$$

$$EHT\text{-}STF(-504)=0,$$

$$EHT\text{-}STF(504)=0 \quad \text{<Equation 11>}$$

The EHT-LTF may have first, second, and third types (i.e., 1×, 2×, 4×LTF). For example, the first/second/third type LTF may be generated based on an LTF sequence in which a non-zero coefficient is arranged with an interval of 4/2/1 subcarriers. The first/second/third type LTF may have a time length of 3.2/6.4/12.8 µs. In addition, a GI (e.g., 0.8/1/6/3.2 µs) having various lengths may be applied to the first/second/third type LTF.

Information related to a type of STF and/or LTF (information related to a GI applied to LTF is also included) may be included in a SIG-A field and/or SIG-B field or the like of FIG. 18.

A PPDU (e.g., EHT-PPDU) of FIG. 18 may be configured based on the example of FIG. 5 and FIG. 6.

For example, an EHT PPDU transmitted on a 20 MHz band, i.e., a 20 MHz EHT PPDU, may be configured based on the RU of FIG. 5. That is, a location of an RU of EHT-STF, EHT-LTF, and data fields included in the EHT PPDU may be determined as shown in FIG. 5.

An EHT PPDU transmitted on a 40 MHz band, i.e., a 40 MHz EHT PPDU, may be configured based on the RU of FIG. 6. That is, a location of an RU of EHT-STF, EHT-LTF, and data fields included in the EHT PPDU may be determined as shown in FIG. 6.

Since the RU location of FIG. 6 corresponds to 40 MHz, a tone-plan for 80 MHz may be determined when the pattern of FIG. 6 is repeated twice. That is, an 80 MHz EHT PPDU may be transmitted based on a new tone-plan in which not the RU of FIG. 7 but the RU of FIG. 6 is repeated twice.

When the pattern of FIG. 6 is repeated twice, 23 tones (i.e., 11 guard tones+12 guard tones) may be configured in a DC region. That is, a tone-plan for an 80 MHz EHT PPDU allocated based on OFDMA may have 23 DC tones. Unlike this, an 80 MHz EHT PPDU allocated based on non-OFDMA (i.e., a non-OFDMA full bandwidth 80 MHz PPDU) may be configured based on a 996-RU, and may include 5 DC tones, 12 left guard tones, and 11 right guard tones.

A tone-plan for 160/240/320 MHz may be configured in such a manner that the pattern of FIG. 6 is repeated several times.

The PPDU of FIG. 18 may be determined (or identified) as an EHT PPDU based on the following method.

A receiving STA may determine a type of an RX PPDU as the EHT PPDU, based on the following aspect. For example, the RX PPDU may be determined as the EHT PPDU: 1) when a first symbol after an L-LTF signal of the RX PPDU is a BPSK symbol; 2) when RL-SIG in which the L-SIG of the RX PPDU is repeated is detected; and 3) when a result of applying "modulo 3" to a value of a length field of the L-SIG of the RX PPDU is detected as "0". When the RX PPDU is determined as the EHT PPDU, the receiving STA may detect a type of the EHT PPDU (e.g., an SU/MU/Trigger-based/Extended Range type), based on bit information included in a symbol after the RL-SIG of FIG. 18. In other words, the receiving STA may determine the RX PPDU as the EHT PPDU, based on: 1) a first symbol after an L-LTF signal, which is a BPSK symbol; 2) RL-SIG contiguous to the L-SIG field and identical to L-SIG; 3) L-SIG including a length field in which a result of applying "modulo 3" is set to "0"; and 4) a 3-bit PHY version identifier of the aforementioned U-SIG (e.g., a PHY version identifier having a first value).

For example, the receiving STA may determine the type of the RX PPDU as the EHT PPDU, based on the following aspect. For example, the RX PPDU may be determined as the HE PPDU: 1) when a first symbol after an L-LTF signal is a BPSK symbol; 2) when RL-SIG in which the L-SIG is repeated is detected; and 3) when a result of applying "modulo 3" to a value of a length field of the L-SIG is detected as "1" or "2".

For example, the receiving STA may determine the type of the RX PPDU as a non-HT, HT, and VHT PPDU, based on the following aspect. For example, the RX PPDU may be determined as the non-HT, HT, and VHT PPDU: 1) when a first symbol after an L-LTF signal is a BPSK symbol; and 2) when RL-SIG in which L-SIG is repeated is not detected. In addition, even if the receiving STA detects that the RL-SIG is repeated, when a result of applying "modulo 3" to the length value of the L-SIG is detected as "0", the RX PPDU may be determined as the non-HT, HT, and VHT PPDU.

In the following example, a signal represented as a (TX/RX/UL/DL) signal, a (TX/RX/UL/DL) frame, a (TX/RX/UL/DL) packet, a (TX/RX/UL/DL) data unit, (TX/RX/UL/DL) data, or the like may be a signal transmitted/received based on the PPDU of FIG. 18. The PPDU of FIG. 18 may be used to transmit/receive frames of various types. For example, the PPDU of FIG. 18 may be used for a control frame. An example of the control frame may include a request to send (RTS), a clear to send (CTS), a power save-poll (PS-poll), BlockACKReq, BlockAck, a null data packet (NDP) announcement, and a trigger frame. For example, the PPDU of FIG. 18 may be used for a management frame. An example of the management frame may include a beacon frame, a (re-)association request frame, a (re-)association response frame, a probe request frame, and a probe response frame. For example, the PPDU of FIG. 18 may be used for a data frame. For example, the PPDU of FIG. 18 may be used to simultaneously transmit at least two or more of the control frame, the management frame, and the data frame.

Figure 19:
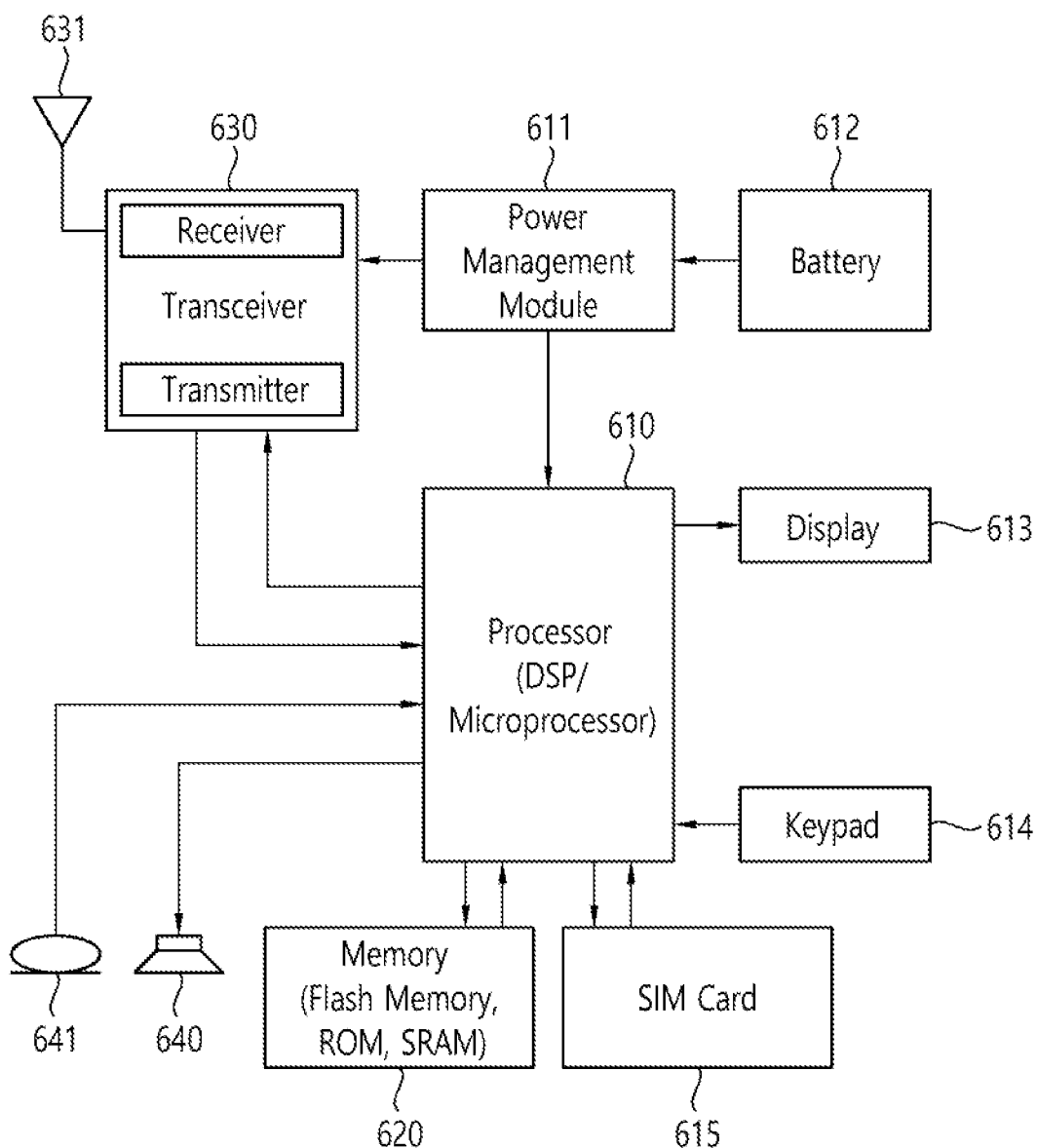
FIG. 19 illustrates an example of a modified transmission device and/or receiving device of the present specification.

FIG. 19 illustrates an example of a modified transmission device and/or receiving device of the present specification.

Each device/STA of the sub-figure (a)/(b) of FIG. 1 may be modified as shown in FIG. 19. A transceiver 630 of FIG. 19 may be identical to the transceivers 113 and 123 of FIG. 1. The transceiver 630 of FIG. 19 may include a receiver and a transmitter.

A processor 610 of FIG. 19 may be identical to the processors 111 and 121 of FIG. 1. Alternatively, the processor 610 of FIG. 19 may be identical to the processing chips 114 and 124 of FIG. 1.

A memory 620 of FIG. 19 may be identical to the memories 112 and 122 of FIG. 1. Alternatively, the memory 620 of FIG. 19 may be a separate external memory different from the memories 112 and 122 of FIG. 1.

Referring to FIG. 19, a power management module 611 manages power for the processor 610 and/or the transceiver 630. A battery 612 supplies power to the power management module 611. A display 613 outputs a result processed by the processor 610. A keypad 614 receives inputs to be used by the processor 610. The keypad 614 may be displayed on the display 613. A SIM card 615 may be an integrated circuit which is used to securely store an international mobile subscriber identity (IMSI) and its related key, which are used to identify and authenticate subscribers on mobile telephony devices such as mobile phones and computers.

Referring to FIG. 19, a speaker 640 may output a result related to a sound processed by the processor 610. A microphone 641 may receive an input related to a sound to be used by the processor 610.

Figure 20:
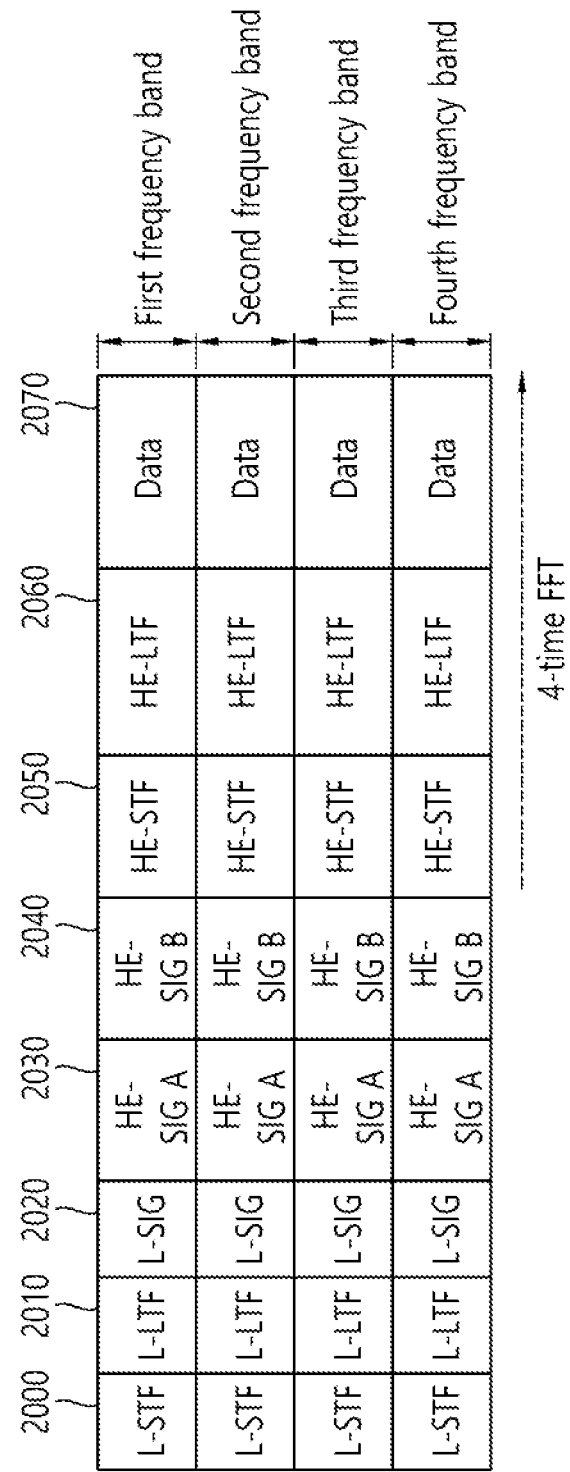
FIG. 20 shows an example of a HE-PPDU.

FIG. 20 shows an example of a HE-PPDU.

The illustrated L-STF 2000 may include a short training orthogonal frequency division multiplexing symbol (OFDM). The L-STF 2000 may be used for frame detection, automatic gain control (AGC), diversity detection, and coarse frequency/time synchronization.

The L-LTF 2010 may include a long training orthogonal frequency division multiplexing symbol (OFDM). The L-LTF 2010 may be used for fine frequency/time synchronization and channel estimation.

The L-SIG 2020 may be used to transmit control information. The L-SIG 2020 may include information related to a data transmission rate and a data length. Also, the L-SIG 2020 may be repeatedly transmitted. That is, the L-SIG 2020 may be configured in a repeated format (e.g., may be referred to as R-LSIG).

The HE-SIG-A 2030 may include control information common to the receiving station(s).

Specifically, the HE-SIG-A 2030 may include information related to: 1) a DL/UL indicator; 2) a BSS color field that is an identifier of the BSS; 3) a field indicating the remaining time of the current TXOP duration/period; 4) a Bandwidth field indicating whether 20, 40, 80, 160, 80+80 MHz; 5) a field indicating MCS scheme applied to the HE-SIG-B; 6) an indication field indicating whether modulation dual subcarrier modulation (DCM) is applied to the HE-SIG-B for MCS; 7) a field indicating the number of symbols used for HE-SIG-B; 8) a field indicating whether the HE-SIG-B is generated over the full/entire band; 9) a field indicating the number of symbols of the HE-LTF; 10) a field indicating a length of the HE-LTF and a CP length; 11) a field indicating whether additional OFDM symbols exist for LDPC coding; 12) a field indicating control information on Packet Extension (PE); and/or 13) a field indicating information related to a CRC field of the HE-SIG-A, and the like. At least one field of the HE-SIG-A may be omitted or changed. In addition, some fields may be added or omitted in other environments where the HE-SIG-A is not a multi-user (MU) environment.

Also, the HE-SIG-A 2030 may be composed of two parts: HE-SIG-A1 and HE-SIG-A2. The HE-SIG-A1 and HE-SIG-A2 included in the HE-SIG-A may be defined in the following format structure (field) according to a corresponding PPDU. First, the HE-SIG-A field of the HE SU PPDU may be defined as follows.

TABLE 8

| Two Parts of HE-SIG-A | Bit | Field | Number of bits | Description |
|---|---|---|---|---|
| HE-SIG-A1 | B0 | Format | 1 | Differentiate an HE SU PPDU and HE ER SU PPDU from an HE TB PPDU: Set to 1 for an HE SU PPDU and HE ER SU PPDU |
| | B1 | Beam Change | 1 | Set to 1 to indicate that the pre-HE modulated fields of the PPDU are spatially mapped differently from the first symbol of the HE-LTF. Equation (28-6), Equation (28-9), Equation (28-12), Equation (28-14), Equation (28-16) and Equation (28-18) apply if the Beam Change field is set to 1. Set to 0 to indicate that the pre-HE modulated fields of the PPDU are spatially mapped the same way as the first symbol of the HE-LTF on each tone. Equation (28-8), Equation (28-10), Equation (28-13), Equation (28-15), Equation (28-17) and Equation (28-19) apply if the Beam Change field is set to 0. |
| | B2 | UL/DL | 1 | Indicates whether the PPDU is sent UL or DL. Set to the value indicated by the TXVECTOR parameter UPLINK_FLAG. |
| | B3-B6 | MCS | 4 | For an HE SU PPDU: Set to n for MCSn, where n = 0, 1, 2, . . . , 11 Values 12-15 are reserved For HE ER SU PPDU with Bandwidth field set to 0 (242-tone RU): Set to n for MCSn, where n = 0, 1, 2 Values 3-15 are reserved For HE ER SU PPDU with Bandwidth field set to 1 (upper frequency 106-tone RU): Set to 0 for MCS 0 Values 1-15 are reserved |

TABLE 9

| | Bit | Field | Number of bits | Description |
|---|---|---|---|---|
| Two Parts of HE-SIG-A | B7 | DCM | 1 | Indicates whether or not DCM is applied to the Data field for the MCS indicated.<br>If the STBC field is 0, then set to 1 to indicate that DCM is applied to the Data field. Neither DCM nor STBC shall be applied if both the DCM and STBC are set to 1.<br>Set to 0 to indicate that DCM is not applied to the Data field.<br>NOTE-DCM is applied only to HE-MCSs 0, 1, 3 and 4. DCM is applied only to 1 and 2 spatial streams. DCM is not applied in combination with STBC |
| | B8-B13 | BSS Color | 6 | The BSS Color field is an identifier of the BSS.<br>Set to the value of the TXVECTOR parameter BSS_COLOR. |
| | B14 | Reserved | 1 | Reserved and set to 1 |
| | B15-B18 | Spatial Reuse | 4 | Indicates whether or not spatial reuse is allowed during the transmission of this PPDU<br>Set to a value from Table 28-21 (Spatial Reuse field encoding for an HE SU PPDU, HE ER SU PPDU, and HE MU PPDU), see 27.11.6 (SPATIAL_REUSE).<br>Set to SRP_DISALLOW to prohibit SRP-based spatial reuse during this PPDU. Set to SRP_AND_NON_SRG_OBSS_PD_PROHIBITED to prohibit both SRP-based spatial reuse and non-SRG OBSS PD-based spatial reuse during this PPDU. For the interpretation of other values see 27.11.6 (SPATIAL_REUSE) and 27.9 (Spatial reuse operation). |
| | B19-B20 | Bandwidth | 2 | For an HE SU PPDU:<br>Set to 0 for 20 MHz<br>Set to 1 for 40 MHz<br>Set to 2 for 80 MHz<br>Set to 3 for 160 MHz and 80 + 80 MHz<br>For an HE ER SU PPDU:<br>Set to 0 for 242-tone RU<br>Set to 1 for upper frequency 106-tone RU within the primary 20 MHz<br>Values 2 and 3 are reserved |

TABLE 10

| | Bit | Field | Number of bits | Description |
|---|---|---|---|---|
| Two Parts of HE-SIG-A | B21-B22 | GI + LTF Size | 2 | Indicates the GI duration and HE-LTF size.<br>Set to 0 to indicate a 1x HE-LTF and 0.8 μs GI<br>Set to 1 to indicate a 2x HE-LTF and 0.8 μs GI<br>Set to 2 to indicate a 2x HE-LTF and 1.6 μs GI<br>Set to 3 to indicate:<br>a 4x HE-LTF and 0.8 μs GI if both the DCM and STBC fields are 1. Neither DCM nor STBC shall be applied if both the DCM and STBC fields are set to 1.<br>a 4x HE-LTF and 3.2 μs GI, otherwise |
| | B23-B25 | NSTS And Midamble Periodicity | 3 | If the Doppler field is 0, indicates the number of space-time streams.<br>Set to the number of space-time streams minus 1<br>For an HE ER SU PPDU, values 2 to 7 are reserved<br>If the Doppler field is 1, then B23-B24 indicates the number of space time streams, up to 4, and B25 indicates the midamble periodicity.<br>B23-B24 is set to the number of space time streams minus 1.<br>For an HE ER SU PPDU, values 2 and 3 are reserved<br>B25 is set to 0 if TXVECTOR parameter MIDAMBLE_PERIODICITY is 10 and set to 1 if TXVECTOR parameter MIDAMBLE_PERIODICITY is 20. |

TABLE 10-continued

| Two Parts of HE-SIG-A | Bit | Field | Number of bits | Description |
|---|---|---|---|---|
| HE-SIG-A2 (HE SU PPDU) or HE-SIG-A3 (HE ER SU PPDU) | B0-B6 | TXOP | 7 | Set to 127 to indicate no duration information if TXVECTOR parameter TXOP_DURATION is set to UNSPECIFIED. Set to a value less than 127 to indicate duration information for NAV setting and protection of the TXOP as follows: If TXVECTOR parameter TXOP_DURATION is less than 512, then B0 is set to 0 and B1-B6 is set to floor(TXOP_DURATION/8) Otherwise, B0 is set to 1 and B1-B6 is set to floor ((TXOP_DURATION − 512)/128) where B0 indicates the TXOP length granularity. Set to 0 for 8 μs; otherwise set to 1 for 128 μs. B1-B6 indicates the scaled value of the TXOP_DURATION |
| | B7 | Coding | 1 | Indicates whether BCC or LDPC is used: Set to 0 to indicate BCC Set to 1 to indicate LDPC |

TABLE 11

| | Bit | Field | Number of bits | Description |
|---|---|---|---|---|
| Two Parts of HE-SIG-A | B8 | LDPC Extra Symbol Segment | 1 | Indicates the presence of the extra OFDM symbol segment for LDPC: Set to 1 if an extra OFDM symbol segment for LDPC is present Set to 0 if an extra OFDM symbol segment for LDPC is not present Reserved and set to 1 if the Coding field is set to 0 |
| | B9 | STBC | 1 | If the DCM field is set to 0, then set to 1 if space time block coding is used. Neither DCM nor STBC shall be applied if both the DCM field and STBC field are set to 1. Set to 0 otherwise. |
| | B10 | Beam-formed | 1 | Set to 1 if a beamforming steering matrix is applied to the waveform in an SU transmission. Set to 0 otherwise. |
| | B11-B12 | Pre-FEC Padding Factor | 2 | Indicates the pre-FEC padding factor. Set to 0 to indicate a pre-FEC padding factor of 4 Set to 1 to indicate a pre-FEC padding factor of 1 Set to 2 to indicate a pre-FEC padding factor of 2 Set to 3 to indicate a pre-FEC padding factor of 3 |
| | B13 | PE Disambiguity | 1 | Indicates PE disambiguity as defined in 28.3.12 (Packet extension). |
| | B14 | Reserved | 1 | Reserved and set to 1 |
| | B15 | Doppler | 1 | Set to 1 if one of the following applies: The number of OFDM symbols in the Data field is larger than the signaled midamble periodicity plus 1 and the midamble is present The number of OFDM symbols in the Data field is less than or equal to the signaled midamble periodicity plus 1 (see 28.3.11.16 Midamble), the midamble is not present, but the channel is fast varying. It recommends that midamble may be used for the PPDUs of the reverse link. Set to 0 otherwise. |
| | B16-B19 | CRC | 4 | CRC for bits 0-41 of the HE-SIG-A field (see 28.3.10.7.3 (CRC computation)). Bits 0-41 of the HE-SIG-A field correspond to bits 0-25 of HE-SIG-A1 followed by bits 0-15 of HE-SIG-A2). |
| | B20-B25 | Tail | 6 | Used to terminate the trellis of the convolutional decoder. Set to 0. |

In addition, the HE-SIG-A field of the HE MU PPDU may be defined as follows.

TABLE 12

| Two Parts of HE-SIG-A | Bit | Field | Number of bits | Description |
|---|---|---|---|---|
| HE-SIG-A1 | B0 | UL/DL | 1 | Indicates whether the PPDU is sent UL or DL. Set to the value indicated by the TXVECTOR parameter UPLINK_FLAG.<br>NOTE-The TDLS peer can identify the TDLS frame by To DS and From DS fields in the MAC header of the MPDU. |
| | B1-B3 | SIGB MCS | 3 | Indicates the MCS of the HE-SIG-B field:<br>Set to 0 for MCS 0<br>Set to 1 for MCS 1<br>Set to 2 for MCS 2<br>Set to 3 for MCS 3<br>Set to 4 for MCS 4<br>Set to 5 for MCS 5<br>The values 6 and 7 are reserved |
| | B4 | SIGB DCM | 1 | Set to 1 indicates that the HE-SIG-B is modulated with DCM for the MCS.<br>Set to 0 indicates that the HE-SIG-B is not modulated with DCM for the MCS.<br>NOTE-DCM is only applicable to MCS 0, MCS 1, MCS 3, and MCS 4. |
| | B5-B10 | BSS Color | 6 | The BSS Color field is an identifier of the BSS.<br>Set to the value of the TXVECTOR parameter BSS_COLOR. |
| | B11-B14 | Spatial Reuse | 4 | Indicates whether or not spatial reuse is allowed during the transmission of this PPDU<br>Set to the value of the SPATIAL_REUSE parameter of the TXVECTOR, which contains a value from Table 28-21 (Spatial Reuse field encoding for an HE SU PPDU, HE ER SU PPDU, and HE MU PPDU) (see 27.11.6 (SPATIAL_REUSE)).<br>Set to SRP_DISALLOW to prohibit SRP-based spatial reuse during this PPDU. Set to SRP_AND_NON_SRG_OBSS_PD_PROHIBITED to prohibit both SRP-based spatial reuse and non-SRG OBSS PD-based spatial reuse during this PPDU. For the interpretation of other values see 27.11.6 (SPATIAL_REUSE) and 27.9 (Spatial reuse operation). |

TABLE 13

| | Bit | Field | Number of bits | Description |
|---|---|---|---|---|
| Two Parts of HE-SIG-A | B15-B17 | Bandwidth | 3 | Set to 0 for 20 MHz.<br>Set to 1 for 40 MHz.<br>Set to 2 for 80 MHz non-preamble puncturing mode.<br>Set to 3 for 160 MHz and 80 + 80 MHz non-preamble puncturing mode.<br>If the SIGB Compression field is 0:<br>Set to 4 for preamble puncturing in 80 MHz, where in the preamble only the secondary 20 MHz is punctured.<br>Set to 5 for preamble puncturing in 80 MHz, where in the preamble only one of the two 20 MHz sub-channels in secondary 40 MHz is punctured.<br>Set to 6 for preamble puncturing in 160 MHz or 80 + 80 MHz, where in the primary 80 MHz of the preamble only the secondary 20 MHz is punctured.<br>Set to 7 for preamble puncturing in 160 MHz or 80 + 80 MHz, where in the primary 80 MHz of the preamble the primary 40 MHz is present.<br>If the SIGB Compression field is 1 then values 4-7 are reserved. |
| | B18-B21 | Number Of HE-SIG-B Symbols Or MU-MIMO Users | 4 | If the HE-SIG-B Compression field is set to 0, indicates the number of OFDM symbols in the HE-SIG-B field:<br>Set to the number of OFDM symbols in the HE-SIG-B field minus 1 if the number of OFDM symbols in the HE-SIG-B field is less than 16; |

TABLE 13-continued

| Bit | Field | Number of bits | Description |
|---|---|---|---|
|  |  |  | Set to 15 to indicate that the number of OFDM symbols in the HE-SIG-B field is equal to 16 if Longer Than 16 HE SIG-B OFDM Symbols Support subfield of the HE Capabilities element transmitted by at least one recipient STA is 0; Set to 15 to indicate that the number of OFDM symbols in the HE-SIG-B field is greater than or equal to 16 if the Longer Than 16 HE SIG-B OFDM Symbols Support subfield of the HE Capabilities element transmitted by all the recipient STAs are 1 and if the HE-SIG-B data rate is less than MCS 4 without DCM. The exact number of OFDM symbols in the HE-SIG-B field is calculated based on the number of User fields in the HE-SIG-B content channel which is indicated by HE-SIG-B common field in this case. If the HE-SIG-B Compression field is set to 1, indicates the number of MU-MIMO users and is set to the number of NU-MIMO users minus 1 |
| B22 | SIGB Compression | 1 | Set to 0 if the Common field in HE-SIG-B is present. Set to 1 if the Common field in HE-SIG-B is not present. |

TABLE 14

| Two Parts of HE-SIG-A | Bit | Field | Number of bits | Description |
|---|---|---|---|---|
|  | B23-B24 | GI + LTF Size | 2 | Indicates the GI duration and HE-LTF size: Set to 0 to indicate a 4x HE-LTF and 0.8 μs GI Set to 1 to indicate a 2x HE-LTF and 0.8 μs GI Set to 2 to indicate a 2x HE-LTF and 1.6 μs GI Set to 3 to indicate a 4x HE-LTF and 3.2 μs GI |
|  | B25 | Doppler | 1 | Set to 1 if one of the following applies: The number of OFDM symbols in the Data field is larger than the signaled midamble periodicity plus 1 and the midamble is present The number of OFDM symbols in the Data field is less than or equal to the signaled midamble periodicity plus 1 (see 28.3.11.16 Midamble), the midamble is not present, but the channel is fast varying. It recommends that midamble may be used for the PPDUs of the reverse link. Set to 0 otherwise. |
| HE-SIG-A2 | B0-B6 | TXOP | 7 | Set to 127 to indicate no duration information if TXVECTOR parameter TXOP_DURATION is set to UNSPECIFIED. Set to a value less than 127 to indicate duration information for NAV setting and protection of the TXOP as follows: If TXVECTOR parameter TXOP_DURATION is less than 512, then B0 is set to 0 and B1-B6 is set to floor(TXOP_DURATION/8) Otherwise, B0 is set to 1 and B1-B6 is set to floor ((TXOP_DURATION − 512)/128) where B0 indicates the TXOP length granularity. Set to 0 for 8 μs; otherwise set to 1 for 128 μs. B1-B6 indicates the scaled value of the TXOP_DURATION |
|  | B7 | Reserved | 1 | Reserved and set to 1 |

TABLE 15

| | Bit | Field | Number of bits | Description |
|---|---|---|---|---|
| Two Parts of HE-SIG-A | B8-B10 | Number of HE-LTF Symbols And Midamble Periodicity | 3 | If the Doppler field is set to 0, indicates the number of HE-LTF symbols:<br>Set to 0 for 1 HE-LTF symbol<br>Set to 1 for 2 HE-LTF symbols<br>Set to 2 for 4 HE-LTF symbols<br>Set to 3 for 6 HE-LTF symbols<br>Set to 4 for 8 HE-LTF symbols<br>Other values are reserved.<br>If the Doppler field is set to 1 B8-B9 indicates the number of HE-LTF symbols and B10 indicates midamble periodicity:<br>B8-B9 is encoded as follows:<br>0 indicates 1 HE-LTF symbol<br>1 indicates 2 HE-LTF symbols<br>2 indicates 4 HE-LTF symbols<br>3 is reserved<br>B10 is set to 0 if the TXVECTOR parameter MIDAMBLE_PERIODICITY is 10 and set to 1 if the TXVECTOR parameter PREAMBLE_PERIODICITY is 20. |
| | B11 | LDPC Extra Symbol Segment | 1 | Indication of the presence of the extra OFDM symbol segment for LDPC.<br>Set to 1 if an extra OFDM symbol segment for LDPC is present.<br>Set to 0 otherwise. |
| | B12 | STBC | 1 | In an HE MU PPDU where each RU includes no more than 1 user, set to 1 to indicate all RUs are STBC encoded in the payload, set to 0 to indicate all RUs are not STBC encoded in the payload.<br>STBC does not apply to HE-SIG-B.<br>STBC is not applied if one or more RUs are used for MU-MIMO allocation. |
| | B13-B14 | Pre-FEC Padding Factor | 2 | Indicates the pre-FEC padding factor.<br>Set to 0 to indicate a pre-FEC padding factor of 4<br>Set to 1 to indicate a pre-FEC padding factor of 1<br>Set to 2 to indicate a pre-FEC padding factor of 2<br>Set to 3 to indicate a pre-FEC padding factor of 3 |
| | B15 | PE Disambiguity | 1 | Indicates PE disambiguity as defined in 28.3.12 (Packet extension). |
| | B16-B19 | CRC | 4 | CRC for bits 0-41 of the HE-SIG-A field (see 28.3.10.7.3 (CRC computation)). Bits 0-41 of the HE-SIG-A field correspond to bits 0-25 of HE-SIG-A1 followed by bits 0-15 of HE-SIG-A2). |
| | B20-B25 | Tail | 6 | Used to terminate the trellis of the convolutional decoder.<br>Set to 0. |

In addition, the HE-SIG-A field of the HE TB PPDU may be defined as follows.

TABLE 16

| Two Parts of HE-SIG-A | Bit | Field | Number of bits | Description |
|---|---|---|---|---|
| HE-SIG-A1 | B0 | Format | 1 | Differentiate an HE SU PPDU and HE ER SU PPDU from an HE TB PPDU:<br>Set to 0 for an HE TB PPDU |
| | B1-B6 | BSS Color | 6 | The BSS Color field is an identifier of the BSS.<br>Set to the value of the TXVECTOR parameter BSS_COLOR. |
| | B7-B10 | Spatial Reuse 1 | 4 | Indicates whether or not spatial reuse is allowed in a subband of the PPDU during the transmission of this PPDU, and if allowed, indicates a value that is used to determine a limit on the transmit power of a spatial reuse transmission.<br>If the Bandwidth field indicates 20 MHz, 40 MHz, or 80 MHz then this Spatial Reuse field applies to the first 20 MHz subband.<br>If the Bandwidth field indicates 160/80 + 80 MHz then this Spatial Reuse field applies to the first 40 MHz subband of the 160 MHz operating band.<br>Set to the value of the SPATIAL_REUSE(1) parameter of the TXVECTOR, which contains a value from Table 28-22 (Spatial Reuse field encoding for an HE TB PPDU) for an HE TB PPDU (see 27.11.6 (SPATIAL_REUSE)). |

TABLE 16-continued

| Two Parts of HE-SIG-A | Bit | Field | Number of bits | Description |
|---|---|---|---|---|
| | | | | Set to SRP_DISALLOW to prohibit SRP-based spatial reuse during this PPDU. Set to SRP_AND_NON_SRG_OBSS_PD_PROHIBITED to prohibit both SRP-based spatial reuse and non-SRG OBSS PD-based spatial reuse during this PPDU. For the interpretation of other values see 27.11.6 (SPATIAL_REUSE) and 27.9 (Spatial reuse operation). |

TABLE 17

| | Bit | Field | Number of bits | Description |
|---|---|---|---|---|
| Two Parts of HE-SIG-A | B11-B14 | Spatial Reuse 2 | 4 | Indicates whether or not spatial reuse is allowed in a subband of the PPDU during the transmission of this PPDU, and if allowed, indicates a value that is used to determine a limit on the transmit power of a spatial reuse transmission. If the Bandwidth field indicates 20 MHz, 40 MHz, or 80 MHz: This Spatial Reuse field applies to the second 20 MHz subband. If the STA operating channel width is 20 MHz, then this field is set to the same value as Spatial Reuse 1 field. If the STA operating channel width is 40 MHz in the 2.4 GHz band, this field is set to the same value as Spatial Reuse 1 field. If the Bandwidth field indicates 160/80 + 80 MHz the this Spatial Reuse field applies to the second 40 MHz subband of the 160 MHz operating band. Set to the value of the SPATIAL_REUSE(2) parameter of the TXVECTOR, which contains a value from Table 28-22 (Spatial Reuse field encoding for an HE TB PPDU) for an HE TB PPDU (see 27.11.6 (SPATIAL_REUSE)). Set to SRP_DISALLOW to prohibit SRP-based spatial reuse during this PPDU. Set to SRP_AND_NON_SRG_OBSS_PD_PROHIBITED to prohibit both SRP-based spatial reuse and non-SRG OBSS PD-based spatial reuse during this PPDU. For the interpretation of other values see 27.11.6 (SPATIAL_REUSE) and 27.9 (Spatial reuse operation). |

45

TABLE 18

| | Bit | Field | Number of bits | Description |
|---|---|---|---|---|
| Two Parts of HE-SIG-A | B15-B18 | Spatial Reuse 3 | 4 | Indicates whether or not spatial reuse is allowed in a subband of the PPDU during the transmission of this PPDU, and if allowed, indicates a value that is used to determine a limit on the transmit power of a spatial reuse transmission. If the Bandwidth field indicates 20 MHz, 40 MHz or 80 MHz: This Spatial Reuse field applies to the third 20 MHz subband. If the STA operating channel width is 20 MHz or 40 MHz, this field is set to the same value as Spatial Reuse 1 field. If the Bandwidth field indicates 160/80 + 80 MHz: This Spatial Reuse field applies to the third 40 MHz subband of the 160 MHz operating band. If the STA operating channel width is 80 + 80 MHz, this field is set to the same value as Spatial Reuse 1 field. |

TABLE 18-continued

| Bit | Field | Number of bits | Description |
|---|---|---|---|
| | | | Set to the value of the SPATIAL_REUSE(3) parameter of the TXVECTOR, which contains a value from Table 28-22 (Spatial Reuse field encoding for an HE TB PPDU) for an HE TB PPDU (see 27.11.6 (SPATIAL_REUSE)). Set to SRP_DISALLOW to prohibit SRP-based spatial reuse during this PPDU. Set to SRP_AND_NON_SRG_OBSS_PD_PROHIBITED to prohibit both SRP-based spatial reuse and non-SRG OBSS PD-based spatial reuse during this PPDU. For the interpretation of other values see 27.11.6 (SPATIAL_REUSE) and 27.9 (Spatial reuse operation). |

TABLE 19

| | Bit | Field | Number of bits | Description |
|---|---|---|---|---|
| Two Parts of HE-SIG-A | B19-B22 | Spatial Reuse 4 | 4 | Indicates whether or not spatial reuse is allowed in a subband of the PPDU during the transmission of this PPDU, and if allowed, indicates a value that is used to determine a limit on the transmit power of a spatial reuse transmission. If the Bandwidth field indicates 20 MHz, 40 MHz or 80 MHz: This Spatial Reuse field applies to the fourth 20 MHz subband. If the STA operating channel width is 20 MHz, then this field is set to the same value as Spatial Reuse 1 field. If the STA operating channel width is 40 MHz, then this field is set to the same value as Spatial Reuse 2 field. If the Bandwidth field indicates 160/80 + 80 MHz: This Spatial Reuse field applies to the fourth 40 MHz subband of the 160 MHz operating band. If the STA operating channel width is 80 + 80 MHz, then this field is set to same value as Spatial Reuse 2 field. Set to the value of the SPATIAL_REUSE(4) parameter of the TXVECTOR, which contains a value from Table 28-22 (Spatial Reuse field encoding for an HE TB PPDU) for an HE TB PPDU (see 27.11.6 (SPATIAL_REUSE)). Set to SRP_DISALLOW to prohibit SRP-based spatial reuse during this PPDU. Set to SRP_AND_NON_SRG_OBSS_PD_PROHIBITED to prohibit both SRP-based spatial reuse and non-SRG OBSS PD-based spatial reuse during this PPDU. For the interpretation of other values see 27.11.6 (SPATIAL_REUSE) and 27.9 (Spatial reuse operation). |
| | B23 | Reserved | 1 | Reserved and set to 1. NOTE-Unlike other Reserved fields in HE-SIG-A of the HE TB PPDU, B23 does not have a corresponding bit in the Trigger frame. |
| | B24-B25 | Bandwidth | 2 | Set to 0 for 20 MHz Set to 1 for 40 MHz Set to 2 for 80 MHz Set to 3 for 160 MHz and 80 + 80 MHz |

TABLE 20

| Two Parts of HE-SIG-A | Bit | Field | Number of bits | Description |
|---|---|---|---|---|
| HE-SIG-A2 | B0-B6 | TXOP | 7 | Set to 127 to indicate no duration information if TXVECTOR parameter TXOP_DURATION is set to UNSPECIFIED. |

TABLE 20-continued

| Two Parts of HE-SIG-A | Bit | Field | Number of bits | Description |
|---|---|---|---|---|
| | | | | Set to a value less than 127 to indicate duration information for NAV setting and protection of the TXOP as follows: If TXVECTOR parameter TXOP_DURATION is less than 512, then B0 is set to 0 and B1-B6 is set to floor(TXOP_DURATION/8) Otherwise, B0 is set to 1 and B1-B6 is set to floor ((TXOP_DURATION − 512)/128) where B0 indicates the TXOP length granularity. Set to 0 for 8 µs; otherwise set to 1 for 128 µs. B1-B6 indicates the scaled value of the TXOP_DURATION |
| | B7-B15 | Reserved | 9 | Reserved and set to value indicated in the UL HE-SIG-A2 Reserved subfield in the Trigger frame. |
| | B16-B19 | CRC | 4 | CRC of bits 0-41 of the HE-SIG-A field. See 28.3.10.7.3 (CRC computation). Bits 0-41 of the HE-SIG-A field correspond to bits 0-25 of HE-SIG-A1 followed by bits 0-15 of HE-SIG-A2). |
| | B20-B25 | Tail | 6 | Used to terminate the trellis of the convolutional decoder. Set to 0. |

The HE-SIG-B 2040 may be included only for a multiple-user (MU) PPDU as described above. Basically, the HE-SIG-A 2050 or the HE-SIG-B 2060 may include resource allocation information (or virtual resource allocation information) for at least one receiving STA.

In the 802.11be (that is, EHT) standard, in order to improve throughput and increase spectrum efficiency, multiple RUs may be allocated to transmit a signal. However, only the whole bandwidth was used in the SU PPDU of the 802.11ax standard. Therefore, through the RU allocation of the 802.11ax standard, an indication for multiple RU allocation cannot be performed.

Therefore, in order to efficiently use multiple RUs in OFDMA transmission, an indication for multiple RUs allocated in the EHT standard may be required. In the following specification, a technical feature regarding multiple RU indication for efficiently transmitting a signal using multiple RU allocation for an OFDMA STA may be proposed.

Configuration of EHT PPDU

In order to provide a higher data rate than the 802.11ax standard, the EHT standard may be proposed. The EHT standard may support a wide bandwidth (e.g., a bandwidth of 320 MHz or more), 16 streams, and/or multi-link (or multi-band) operation. Accordingly, to support a transmission method based on the EHT standard, a new frame format may be used. When transmitting a signal through the 2.4/5/6 GHz band using the new frame format, conventional Wi-Fi receivers/STAs (e.g., receivers of 802.11n/ac/ax standards), as well as receivers supported by the EHT standard may also receive the EHT signal transmitted through the 2.4/5/6 GHz band.

The preamble of the PPDU based on the EHT standard may be set in various ways. Hereinafter, an embodiment in which a preamble of a PPDU based on the EHT standard is configured may be described. Hereinafter, a PPDU based on the EHT standard may be described as an EHT PPDU. However, the EHT PPDU is not limited to the EHT standard. The EHT PPDU may be configured based new standard that is an improvement/evolution/extension of the 802.11be standard as well as the 802.11be standard (i.e., the EHT standard).

In the EHT standard, a format for a single user (SU) and a format for a multi user (MU) may be identically configured. Accordingly, the EHT PPDU for the SU and the MU may be referred to as an EHT MU PPDU. Hereinafter, for the convenience of description, an EHT MU PPDU may be described as an EHT PPDU.

Figure 21:
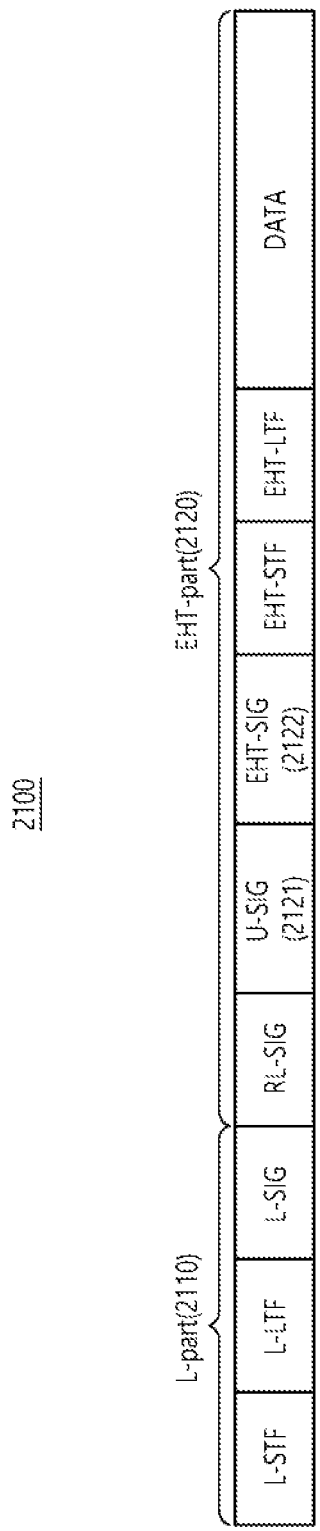
FIG. 21 shows an example of an EHT PPDU.

FIG. 21 shows an example of an EHT PPDU.

Referring to FIG. 21, the EHT PPDU 2100 may include an L-part 2110 and an EHT-part 2120. The EHT PPDU 2100 may be configured in a format to support backward compatibility. In addition, the EHT PPDU 2100 may be transmitted to a single STA and/or multiple STAs.

The EHT PPDU 2100 may be configured in a structure in which the L-part 2110 is transmitted first before the EHT-part 2120 for coexistence with the legacy STA (e.g., STAs in compliance with the 802.11n/ac/ax standard). For example, the L-part 2110 may include the L-STF, L-LTF, and L-SIG.

According to an embodiment, the EHT part 2120 may include the RL-SIG, U-SIG 2121, EHT-SIG 2122, EHT-STF, EHT-LTF, and EHT-data fields. For example, the U-SIG 2121 may include a version-independent field and a version-dependent field. An example of the U-SIG 2121 may be described with reference to FIG. 22.

FIG. 22 shows an example of the U-SIG.

Referring to FIG. 22, the U-SIG 2200 may correspond to the U-SIG 2121 of FIG. 21. The U-SIG 2200 may include a Version-independent field 2210 and a Version-dependent field 2220.

According to an embodiment, the version-independent field 2210 may include a version identifier of 3 bits indicating the EHT standard and the Wi-Fi version to be defined after the EHT standard. In other words, the version-independent field 2210 may include 3 bits of information related to the EHT standard and the Wi-Fi version to be defined after the EHT standard.

According to an embodiment, the version-independent field 2210 may further include a 1-bit DL/UL field, a field related to BSS color, and/or a field related to TXOP duration. In other words, the version-independent field 2210 may further include information related to: 1-bit information for DL/UL, information related to a BSS color, and/or information related to a TXOP duration.

According to an embodiment, the version-dependent field 2220 may include a field/information related to a PPDU format type, a field/information related to a bandwidth, and/or a field/information related to an MCS.

According to an embodiment, the U-SIG 2200 may consist of two symbols. The two symbols may be jointly encoded. According to an embodiment, the U-SIG 2200 may be configured with 52 data tones and 4 pilot tones for each 20 MHz. In addition, it may be modulated in the same manner as the HE-SIG-A of the HE standard. For example, the U-SIG 2200 may be modulated with BPSK and a code rate of ½.

Referring back to FIG. 21, the EHT-SIG 2122 may include a version-dependent field that is not included in the U-SIG 2121. In other words, the EHT-SIG 2122 may include overflow information which is overflowed from the U-SIG 2121. For example, the EHT-SIG 2122 may include information dependent on the version of the PPDU. For another example, the EHT-SIG 2122 may include at least some of fields included in HE-SIG-A of the HE standard/specification.

According to an embodiment, the EHT-SIG 2122 may consist of a plurality of OFDM symbols. According to an embodiment, the EHT-SIG 2122 may be modulated with various MCSs. For example, the EHT-SIG 2122 may be modulated based on MCS0 to MCS5.

According to an embodiment, the EHT-SIG 2122 may include a common field and a user-specific field. For example, the common field may include information on spatial stream information and RU allocation information. For example, the user-specific field may include at least one user block field including information about the user. The user-specific field may include/indicate information about ID, MCS, and coding used for a specific user or STA. As an example, the user-specific field may include at least one user block field.

Combination of Multiple RUs

A combination of multiple RUs considered/used in EHT OFDMA transmission may be configured as follows.

1. Small size RU combination

1-A. For example, the small size RU combination consists of a combination of RUs smaller than RU242 and can be used only for 80 MHz or less. In the following, that is, an example of multiple RUs may be indicated by a shade (or hatched) in the FIGS.

1-B. Composed of a combination of RU26+RU52

1-B-i. A combination of multiple RUs within 20 MHz may be configured as shown in FIG. 23.

Figure 23:
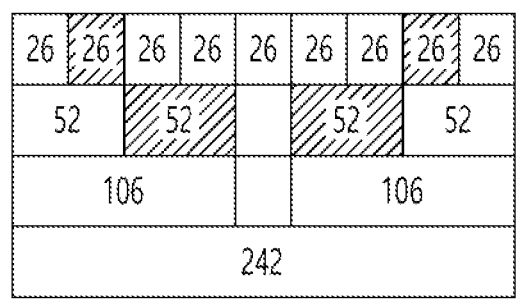
FIG. 23 shows an example of a multiple RU combination within 20 MHz.

FIG. 23 shows an example of a multiple RU combination within 20 MHz.

Referring to FIG. 23, the combination of RU26 and RU52 within 20 MHz may consist of two cases. For example, multiple RUs may be configured as the second RU26 and the second RU52 in the first case. In the second case, multiple RUs may be configured as the third RU52 and the eighth RU26.

1-B-ii. A combination of multiple RUs within 40 MHz may be configured as shown in FIG. 24.

Figure 24:
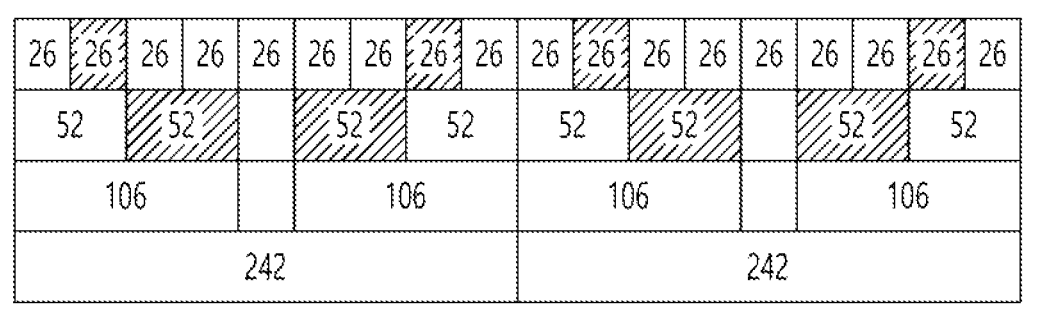

FIG. 24 shows an example of a multiple RU combinations within 40 MHz.

Referring to FIG. 24, the combination of RU26 and RU52 within 40 MHz may consist of four cases. The above-described multiple RU combination within 20 MHz may be configured in units of 20 MHz. That is, in the first 20 MHz, a combination of multiple RUs within 20 MHz (two types) may be used. In addition, in the second 20 MHz, a combination of multiple RUs within 20 MHz (two types) may be used. Therefore, the combination of RU26 and RU52 within 40 MHz may consist of four cases.

1-B-iii. A combination of multiple RUs within 80 MHz may be configured as shown in FIG. 25.

Figure 25:
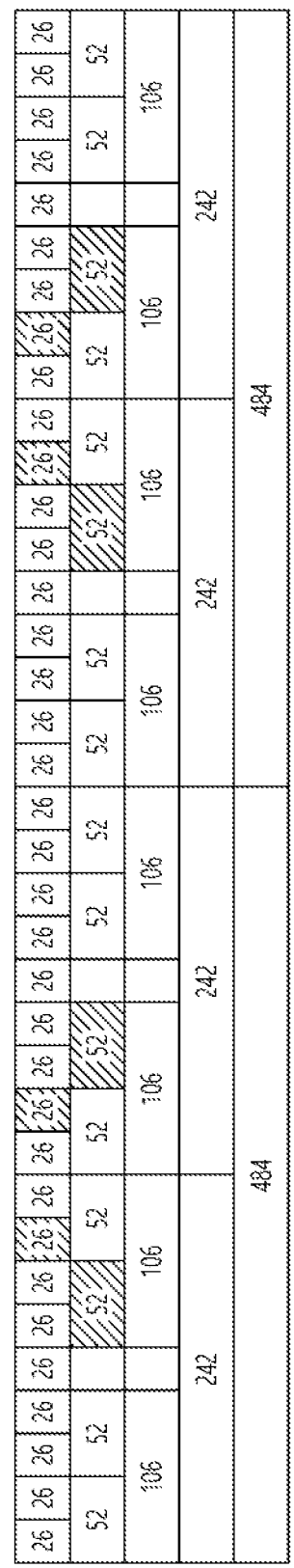
FIG. 25 shows an example of a multiple RU combination within 80 MHz.

FIG. 25 shows an example of a multiple RU combination within 80 MHz.

Referring to FIG. 25, a combination of RU26 and RU52 within 80 MHz may consist of a total of four cases in consideration of preamble puncturing. For example, in the 1st and 3rd 20 MHz within 80 MHz, multiple RUs may be configured as 52RU (3rd)+26RU (8th). In the 2nd and 4th 20 MHz, multiple RUs may be configured as 26RU (2nd)+52RU (2nd).

1-C. Composed of a combination of RU26+RU106.

Figure 26:
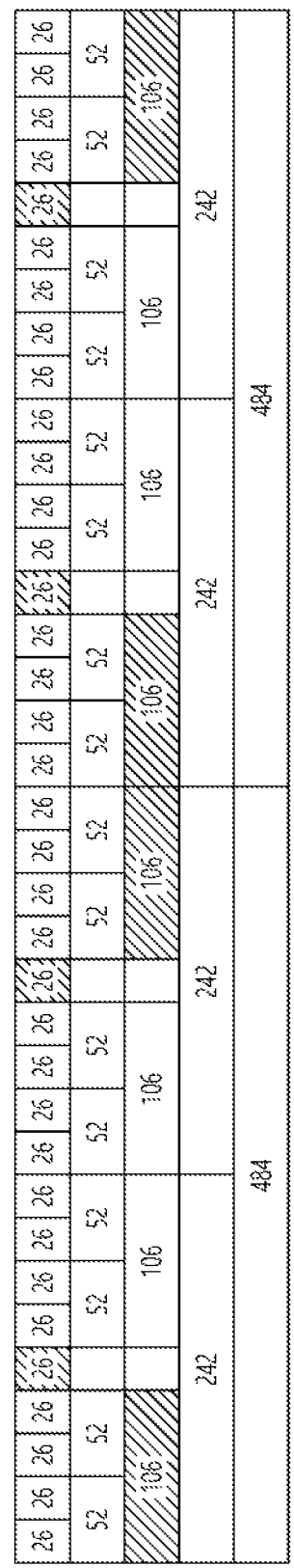
FIG. 26 shows an example of a multiple RU combination within 80 MHz.

FIG. 26 shows an example of a multiple RU combination within 80 MHz.

Referring to FIG. 26, a combination of RU26 and RU106 within 80 MHz may consist of a total of four cases in consideration of preamble puncturing. For example, in the 1st, 3rd 20 MHz within 80 MHz, multiple RUs may be configured as 106RU (1st)+26RU (5th). In the 2nd and 4th 20 MHz, multiple RUs may be configured as 26RU (5th)+106RU (2nd).

Although 1-B and 1-C described above have proposed only some RU combinations in consideration of preamble puncturing and signaling overhead, these are examples, and multiple RUs may be configured in various ways. In addition to the above-described example, multiple RUs may be variously configured as 26+52, 26+106, or 52+106.

2. Large size RU combination

2-A. Large size RU combination can be configured using RU242, RU484, RU996, etc. Large size RU combination can be used only for BW greater than 80 MHz.

2-B. Consists of a combination of RU242+RU484 within 80 MHz

2-B-i. In large size RU combination, multiple RUs may be configured to necessarily include RU242 included in P20 (primary 20 MHz). Hereinafter, RU242(1), RU484(1), and RU996(1) may mean primary channels.

2-B-ii. For example, when RU242 included in the above-described P20 is configured as the first RU242, the RU combination may be configured as shown in FIGS. 27 to 29.

Figure 27:
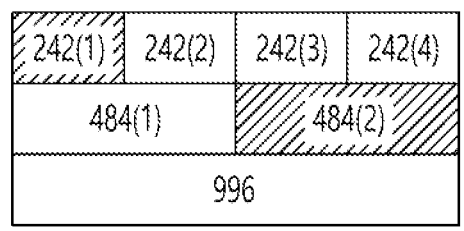
FIGS. 27 to 29 show examples of a multiple RU combinations within 80 MHz.
Figure 28:
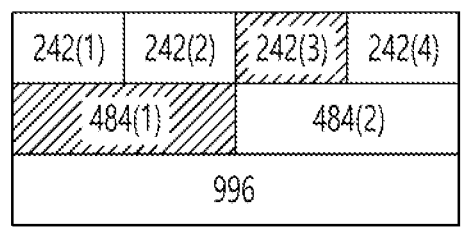
Figure 29:
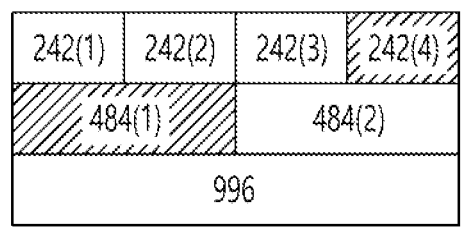

FIGS. 27 to 29 show examples of a multiple RU combinations within 80 MHz.

Referring to FIGS. 27 to 29, multiple RUs may be shaded.

2-C. For BW greater than 80 MHz, cross 80 MHz to form RU combination

2-C-i. A combination of multiple RUs may be configured to include RU242, RU484, and RU996 included in P20 (primary 20 MHz), P40 (primary 40 MHz), and P80 (primary 80 MHz).

2-C-ii. RU484+RU996

When multiple RUs are configured with RU484+RU996, the RU combination (or multiple RU combination) may be composed of three types. For example, the RU combination may be configured in FIGS. 30 to 32.

FIGS. 30 to 32 show examples of combinations of RU484 and RU996.

Referring to FIG. 30, multiple RUs may be configured with 484(1)+996(2).

Referring to FIG. 31, multiple RUs may be configured as 996(1)+484(1).

Referring to FIG. 32, multiple RUs may be configured as 996(1)+484(2).

2-C-iii. (RU242+RU484)+(RU242+RU484)

2-C-iii-1. The RU combination may be configured as follows (A to L) so that RU242 or RU484 included in P20 or P40 is included. In the following, [ ] may mean 80 MHz, and ( ) may indicate an index of an RU within 80 MHz.

2-C-iii-1-A.[242(1)+484(2)]+[242(1)+484(2)]
2-C-iii-1-B.[242(1)+484(2)]+[242(2)+484(2)]
2-C-iii-1-C.[242(1)+484(2)]+[484(1)+242(1)]
2-C-iii-1-D.[242(1)+484(2)]+[484(1)+242(2)]
2-C-iii-1-E.[484(1)+242(3)]+[242(1)+484(2)]
2-C-iii-1-F.[484(1)+242(3)]+[242(2)+484(2)]
2-C-iii-1-G.[484(1)+242(3)]+[484(1)+242(3)]
2-C-iii-1-H.[484(1)+242(3)]+[484(1)+242(4)]
2-C-iii-1-I.[484(1)+242(4)]+[242(1)+484(2)]
2-C-iii-1-J.[484(1)+242(4)]+[242(2)+484(2)]
2-C-iii-1-K.[484(1)+242(4)]+[484 (1)+242(3)]
2-C-iii-1-L.[484(1)+242(4)]+[484(1)+242(4)]
2-C-iv. (RU242+RU484)+RU996
2-C-iv-1. The RU combination may be configured as follows (A to G) so that RU242, RU484, and RU996 included in P20, P40 or P80 are included. In the following, [ ] may mean 80 MHz, and ( ) may indicate the index of RU within 80 MHz.
2-C-iv-1-A.[242(1)+484(2)]+[996(2)]
2-C-iv-1-B.[484 (1)+242(3)]+[996(2)]
2-C-iv-1-C.[484 (1)+242(4)]+[996(2)]
2-C-iv-1-D.[996(1)]+[242(1)+484(2)]
2-C-iv-1-E.[996(1)]+[242(2)+484(2)]
2-C-iv-1-F.[996(1)]+[484(1)+242 (3)]
2-C-iv-1-G.[996(1)]+[484(1)+242 (4)]
2-C-v. RU484+(RU484+RU242)
2-C-v-1. The RU combination may be configured as follows (A to F) so that RU242 or RU484 included in P20 or P40 is included.
2-C-v-1-A.[484(1)]+[242(1)+484(2)]
2-C-v-1-B.[484(1)]+[242(2)+484(2)]
2-C-v-1-C.[484(1)]+[484(1)+242(3)]
2-C-v-1-D.[484(1)]+[484(1)+242(4)]
2-C-v-1-E.[242(1)+484(2)]+[484(1)]
2-C-v-1-F.[242(1)+484(2)]+[484(2)]

According to an embodiment, as in the above example, when transmitting multiple RUs by allocating multiple RUs to STAs during OFDMA transmission, signals may be transmitted using various RU combinations. In order to transmit allocation information for various RU combinations as described above, the following technical features may be proposed.

1. During OFDMA transmission, bit information indicating multiple RU transmission may be included in the version-dependent field of U-SIG, EHT-SIGA field, or common field of EHT-SIGB. The multiple RU indication bit may consist of 1-bit.

1-A. When the multiple RU indication bit is configured to 1, the STA receiving it may decode its user field, and then decode all the received user fields in order to use the multiple-allocated RU allocation even if an ID for itself appears.

2. The combination of multiple RUs allocated to the STA may be indicated using an allocation bit table included in the common field of EHT-SIGB. In this case, the bit table may be configured in the same way as the 11ax standard. When the allocation bit in the HE-SIGB common field is used, various technical features may be proposed as an indication for the RU allocated to the STA. Hereinafter, various technical features for the indication for the RU may be described.

The First Embodiment

According to the first embodiment, in order to indicate to the STA the multiple RUs allocated to the STA during OFDMA transmission, the AP/STA may use the existing 8-bit allocation table. In this case, user fields for a plurality of allocated RUs may be identically configured. That is, the user field for multiple RUs allocated to the STA may include the same information. For example, the user field may consist of the same STA ID, MCS, NSTS, DCM, and the like.

1. For example, only the STA ID may be configured identically and other information may be configured differently.

1-A. Depending on the RU, different MCS or NSTS may be applied to transmit the user field.

2. When the size of Multiple RUs is 242 or more, RU combination can be configured using 242/484/996. The value of the RU allocation subfield for the corresponding RU may be set as follows.

2-A. A value corresponding to ($11000y_2y_1y_0$) may be used in the allocation subfield of 242 RU. In this case, "$y_2y_1y_0$" may be configured to "0 0 0". Hereinafter, "$y_2y_1y_0$" may be expressed as "$y_2y_1y_0$".

2-B. A value corresponding to ($11001y_2y_1y_0$) may be used in the allocation subfield of 484 RU. In this case, "$y_2y_1y_0$" may be configured to "0 0 0".

2-C. A value corresponding to ($11001y_2y_1y_0$) may be used in the allocation subfield of 996 RU. In this case, "$y_2y_1y_0$" may be set to "0 0 0".

2-D. The receiving STA may confirm that the received signal (or PPDU) is transmitted by allocating multiple RUs through the multiple RU indication bit in the U-SIG/EHT-SIGA/EHT-SIGB common field. The receiving STA can confirm that the RU is used as a Multi-RU through the above-mentioned indication. That is, when the multiple RU indication bit is configured to 1, multi-RU allocation may be indicated through the allocation field used for MU-MIMO.

3. The receiving STA may recognize/confirm that the transmission is multiple RU allocation through the multiple RU indication in the U-SIG/EHT-SIGA/EHT-SIGB common field. The receiving STA may recognize/confirm that a plurality of user fields for itself in the user field of the EHT-SIGB exist. The receiving STA may check the user field for itself and decode the user field for itself.

3-A. According to the above-described example, since existing signaling is used without additional signaling, there is an effect that signaling overhead does not increase.

3-B. When the assigned RU is non-continuous, the receiving STA should perform decoding on another user field until it finds a user field for the last RU assigned to it. Therefore, complexity and power consumption may slightly increase.

The Second Embodiment

According to the second embodiment, unlike the above-described embodiment, the EHT STA (or the transmitting STA) may use a reserved bit to indicate the RU combination when transmitting multiple RUs. In other words, a reserved bit may be used to transmit information on a combination of RUs when transmitting multiple RUs.

1. According to an embodiment, an indication for a combination (26+52, 26+106) using a small RU size within 80 MHz may be configured as follows.

1-A. 116-119($011101x_1x_0$) of the RU allocation subfield may be used for an indication of the RU combination. That is, the RU combination may be indicated through $x_1x_0$. An example of an RU combination according to the RU allocation subfield may be configured as shown in Table 21.

TABLE 21

| RU allocation subfield | RU combination |
|---|---|
| 01110100 | 26(2) + 52(2) |
| 01110101 | 52(3) + 26(8) |
| 01110110 | 106(1) + 26(5) |
| 01110111 | 26(5) + 106(2) |

1-B. Since a limited bit is used for the RU combination signaling, the RU allocation used may be limited.

1-C. The RU allocation bit may be transmitted using EHT-SIGB channel 1 and channel 2. The RU allocation bit may be transmitted using 8 bits per 20 MHz.

1-D. Unlike the above example, other reserved bits in the Ru allocation subfield may be used as an indication for a combination of small RU sizes.

1-D-i. According to an embodiment, 120-127 (01111$y_2y_1y_0$) and 216-223 (11011 $y_2y_1y_0$) may be used as an indication for a combination of a small RU size. Therefore, there is an effect that a combination of RUs in various cases is supported rather than using only the limited case in 1-A. The indication for the combination of the small RU size of the above-described embodiment may be configured as shown in Tables 22 and 23.

TABLE 22

| RU allocation subfield | RU combination | RU allocation |
|---|---|---|
| 01111000 | 26(2) + 52(2) | 26 + [26 + 52] + 26 + 26 + 26 + 26 + 26 |
| 01111001 | 26(2) + 52(2) | 26 + [26 + 52] + 26 + 26 + 26 + 52 |
| 01111010 | 26(2) + 52(2) | 26 + [26 + 52] + 26 + 52 + 26 + 26 |
| 01111011 | 26(2) + 52(2) | 26 + [26 + 52] + 26 + 52 + 52 |
| 01111100 | 26(2) + 52(2) | 26 + [26 + 52] + 26 + 106 |
| 01111101~ 01111111 | Reserved | |

TABLE 23

| RU allocation subfield | RU combination | RU allocation |
|---|---|---|
| 11011000 | 53(3) + 26(8) | 26 + 26 + 26 + 26 + 26 + [52 + 26] + 26 |
| 11011001 | 53(3) + 26(8) | 26 + 26 + 52 + 26 + [52 + 26] + 26 |
| 11011010 | 53(3) + 26(8) | 52 + 26 + 26 + 26 + [52 + 26] + 26 |
| 11011011 | 53(3) + 26(8) | 52 + 52 + 26 + [52 + 26] + 26 |
| 11011100 | 53(3) + 26(8) | 106 + 26 + [52 + 26] + 26 |
| 11011$y_2y_1y_0$ | Reserved | |

1-D-ii. According to an embodiment, the EHT STA may indicate the 26+52 RU combination as follows by using only one of the reserved 120-127 (01111$y_2y_1y_0$) and 216-223 (11011$y_2y_1y_0$) among the existing allocation bits. The indication for the combination of the small RU size of the above-described embodiment may be configured as shown in Table 24.

TABLE 24

| RU allocation subfield | RU combination | RU allocation |
|---|---|---|
| $a_1a_2a_3a_4a_5$000 | 26(2) + 52(2) | 26 + [26 + 52] + 26 + 26 + 26 + 26 |
| $a_1a_2a_3a_4a_5$001 | 26(2) + 52(2) | 26 + [26 + 52] + 26 + 26 + 26 + 52 |
| $a_1a_2a_3a_4a_5$010 | 26(2) + 52(2) | 26 + [26 + 52] + 26 + 52 + 26 + 26 |
| $a_1a_2a_3a_4a_5$011 | 26(2) + 52(2) | 26 + [26 + 52] + 26 + 52 + 52 |
| $a_1a_2a_3a_4a_5$100 | 52(3) + 26(8) | 26 + 26 + 26 + 26 + 26 + [52 + 26] + 26 |
| $a_1a_2a_3a_4a_5$101 | 52(3) + 26(8) | 26 + 26 + 52 + 26 + [52 + 26] + 26 |
| $a_1a_2a_3a_4a_5$110 | 52(3) + 26(8) | 52 + 26 + 26 + 26 + [52 + 26] + 26 |
| $a_1a_2a_3a_4a_5$111 | 52(3) + 26(8) | 52 + 52 + 26 + [52 + 26] + 26 |

Referring to Table 24, $a_1a_2a_3a_4a_5$ may be configured to 01111 or 11011.

1-D-iii. According to an embodiment, the existing indication for 106 RU may be reused as an indication for a combination of 106 RUs.

1-D-iii-1. For example, the multiple RU indication bit may be set to 1. The EHT STA may indicate that multiple RUs are used for the allocated RUs based on the multiple RU indication bit.

1-D-iii-1-A. When the multiple RU indication bit is set to 1, $y_2y_1y_0$ (or y2y1y0) of the bit field for MU-MIMO allocation may be set to 0 0 0. The bit field for the MU-MIMO allocation may be used for M-RU allocation. When the multiple RU indication bit is set to 1, an example of the RU allocation configuration according to the RU allocation subfield may be configured as shown in Table 25.

TABLE 25

| RU allocation subfield | RU combination | RU allocation |
|---|---|---|
| 01000y2y1y0 | 106(1) + 26(5) | [106 + 26] + 26 + 26 + 26 + 26 |
| (01001y2y1y0) | 106(1) + 26(5) | [106 + 26] + 26 + 26 + 52 |
| (01010y2y1y0) | 106(1) + 26(5) | [106 + 26] + 52 + 26 + 26 |
| (01011y2y1y0) | 106(1) + 26(5) | [106 + 26] + 52 + 52 |
| (00100y2y1y0) | 26(5) + 106(2) | 26 + 26 + 26 + 26 + [26 + 106] |
| (00101y2y1y0) | 26(5) + 106(2) | 26 + 26 + 52 + [26 + 106] |
| (00110y2y1y0) | 26(5) + 106(2) | 52 + 26 + 26 + [26 + 106] |
| (00111y2y1y0) | 26(5) + 106(2) | 52 + 52 + [26 + 106] |

1-E. The indication of a small RU combination may be used/performed without setting a multiple RU indication field.

1-F. Unlike the above example, reserved bits of the allocation table may be used to use the 26+106 RU combination. In this case, a 26+106 RU combination may be indicated using one of reserved 120-127 (01111$y_2y_1y_0$) and 216-223 (11011 $y_2y_1y_0$).

The indication for the 26+106 RU combination of the embodiment may be configured as shown in Table 26.

TABLE 26

| RU allocations subfield | RU combination | RU allocation |
|---|---|---|
| $a_1a_2a_3a_4a_5$000 | 106(1) + 26(5) | [106 + 26] + 26 + 26 + 26 + 26 |
| $a_1a_2a_3a_4a_5$001 | 106(1) + 26(5) | [106 + 26] + 26 + 26 + 52 |
| $a_1a_2a_3a_4a_5$010 | 106(1) + 26(5) | [106 + 26] + 52 + 26 + 26 |
| $a_1a_2a_3a_4a_5$011 | 106(1) + 26(5) | [106 + 26] + 52 + 52 |
| $a_1a_2a_3a_4a_5$100 | 26(5) + 106(2) | 26 + 26 + 26 + 26 + [26 + 106] |
| $a_1a_2a_3a_4a_5$101 | 26(5) + 106(2) | 26 + 26 + 52 + [26 + 106] |
| $a_1a_2a_3a_4a_5$110 | 26(5) + 106(2) | 52 + 26 + 26 + [26 + 106] |
| $a_1a_2a_3a_4a_5$111 | 26(5) + 106(2) | 52 + 52 + [26 + 106] |

Referring to Table 26, $a_1a_2a_3a_4a_5$ may be set to 01111 or 11011.

2. According to an embodiment, similar to the above-described embodiment 1, a reserved bit of the RU allocation subfield may be used to indicate a combination of RU242 and RU 484 used for multiple RU allocation within 80 MHz. For example, 120-127 (01111$y_2y_1y_0$) may be used. The allocation subfield may be configured as shown in Table 27.

TABLE 27

| RU allocation subfield | RU combination | RU allocation |
|---|---|---|
| 01111000 | 242(1) + 242(3) | 242 + 242 + 242 + 242 |
| 01111001 | 242(1) + 242(4) | 242 + 242 + 242 + 242 |
| 01111010 | 242(1) + 484(2) | 242 + 242 + 484 |
| 01111011 | 484(1) + 242(1) | 484 + 242 + 242 |
| 01111100 | 484(1) + 242(2) | 484 + 242 + 242 |
| 01111101~01111111 | Reserved | |

2-A. When allocation information is configured as shown in Table 27, allocation for an RU may be indicated using a reserved bit. Accordingly, there is an effect of reducing signaling overhead for additional signaling.

2-B. In the above example, the M-RU combination was configured to include 242 RUs included in the primary 20 MHz. Unlike the above-described example, an M-RU combination may be configured including only secondary 20 MHz. The allocation subfield according to the above-described example may be configured as shown in table 28.

TABLE 28

| RU allocation subfield | RU combination | RU allocation |
|---|---|---|
| 01111000 | 242(1) + 242(3) | 242 + 242 + 242 + 242 |
| 01111001 | 242(1) + 242(4) | 242 + 242 + 242 + 242 |
| 01111010 | 242(1) + 484(2) | 242 + 242 + 484 |
| 01111011 | 242(2) + 242(3) | 242 + 242 + 242 + 242 |
| 01111100 | 242(2) + 242(4) | 242 + 242 + 242 + 242 |
| 01111101 | 242(2) + 484(2) | 242 + 242 + 484 |
| 01111110 | 484(1) + 242(1) | 484 + 242 + 242 |
| 01111111 | 484(1) + 242(2) | 484 + 242 + 242 |

2-C. According to an embodiment, an allocation subfield may be configured as shown in table 29 to reduce the number of combinations of RU combinations and facilitate implementation.

TABLE 29

| RU allocation subfield | RU combination | RU allocation |
|---|---|---|
| $a_1a_2a_3a_4a_5$000 | 242(1) + 484(2) | 242 + 242 + 484 |
| $a_1a_2a_3a_4a_5$001 | 242(2) + 484(2) | 242 + 242 + 484 |
| $a_1a_2a_3a_4a_5$010 | 484(1) + 242(3) | 484 + 242 + 242 |
| $a_1a_2a_3a_4a_5$011 | 484(1) + 242(4) | 484 + 242 + 242 |

Referring to Table 29, as an example, $a_1a_2a_3a_4a_5$ may be set to 01111 or 11011 using a reserved bit of the RU allocation table. Another example. $a_1a_2a_3a_4a_5$ may be configured using reserved bits for index 224-255 (111$x_4x_3x_2x_1x_0$).

3. According to an embodiment, RU indication for a combination of 242,484,996 RUs in BW greater than 80 MHz may be performed through RU allocation of EHT-SIGB. The RU allocation of the EHT-SIGB may be configured in units of 20 MHz channels as in the 802.11ax standard. Therefore, the allocation indication for the combination may be performed through the following method.

3-A. How to recycle the RU indication for 242,484,996 in the 8-bit allocation subfield 3-A-i. For example, at 80 MHz, EHT-SIGB may be configured as a content channel of 1/2/1/2. SIGB1 (or content channel 1) may include allocation information for the first and third 20 MHz. And SIGB2 (or content channel 2) may include allocation information for 2 and 4.

Therefore, when transmitting multiple RU allocation, EHT-SIB CH1 may be configured with 8 bits including allocation for the first 20 MHz and the third 20 MHz, and CH2 for the second 20 MHz and the fourth 20 MHz. In this case, when the size of the allocated RU is greater than 242, the EHT-SIGB field including the allocated RU may be set to the same subfield. In this case, as described above, "$y_2y_1y_0$" of the allocation subfield may be set to "0 0 0" to indicate that there is one STA allocated to the RU. In addition, the STA ID in the user field for the allocated RU may be set to one STA ID.

3-A-ii. In order to indicate that it is not allocated for the RU that is not allocated, the indication bits for 242 empty, 484 empty, and 996 empty defined in the allocation subfield may be used.

3-A-ii-1. As an example, when a signal is transmitted using Multiple RU [484(1)]+[484(1)+242(3)], RU allocation may be configured as follows in EHT-SIGB CH1 and EHT-SIGB CH2.

3-A-ii-1-A. EHT-SIGB1 may be configured as [1][3][5][7]. That is, EHT-SIGB1=[3] [5] [7]. The [1] [3][5][7] may be configured as follows.

3-A-ii-1-A-i.[1]=[484 RU allocation bit], 11001000
3-A-ii-1-A-ii.[3]=[484 empty], 01110010
3-A-ii-1-A-iii.[5]=[484 RU allocation bit], 11001000
3-A-ii-1-A-iv.[7]=3-A-ii-1-A.-[242 RU allocation bit], 11000000

3-A-ii-1-B. EHT-SIGB2 may be configured as [2][4][6][8]. That is, EHT-SIGB2=[4] [6] [8]. The [2] [4][6][8] may be configured as follows.

3-A-ii-1-B-i.[2]=same with [1], 11001000
3-A-ii-1-B-ii.[4]=same with [3], [484 empty], 01110010
3-A-ii-1-B-iii.[6]=same with [5], 11001000
3-A-ii-1-B-iv.[8]=242-tone RU empty, 01110001

3-A-ii-2. In the above example, [x] may indicate an allocation bit for the x-th 20 MHz.

3-B. According to an embodiment, the RU combination may be indicated using bits for index 224-255 (111 $x_4x_3x_2x_1x_0$) reserved among the RU allocation subfields of HE-SIGB.

3-B-i. The subfield (RU allocation subfield of HE-SIGB) may support 32 entries. Accordingly, the RU combination using the above-described 242, 484, and 996 may be supported through the subfield. Accordingly, the EHT STA may configure the fields in the RU combination as follows. That is, the EHT STA may indicate the RU combination based on the field set as shown in Table 30.

TABLE 30

| RU allocation subfield | RU combination |
|---|---|
| 11100000 | [242 (1)] + [242(1) + 242(2)] |
| 11100001 | [484 (1)] + [242(2) + 484(2)] |
| 11100010 | [484 (1)] + [484(1) + 242(3)] |
| 11100011 | [484 (1)] + [484(1) + 242(4)] |

TABLE 30-continued

| RU allocation subfield | RU combination |
| --- | --- |
| 11100100 | [242(1) + 484(2)] + [484(1)] |
| 11100101 | [242(1) + 484(2)] + [484(2)] |
| 11100110 | [242(1) + 484(2)] + [242(1) + 484(2)] |
| 11100111 | [242(1) + 484(2)] + [242(2) + 484(2)] |
| 11101000 | [242(1) + 484(2)] + [484(1) + 242(1)] |
| 11101001 | [242(1) + 484(2)] + [484(1) + 242(2)] |
| 11101010 | [484 (1)] + 242(3)] + [242(1) + 484(2)] |
| 11101011 | [484 (1)] + 242(3)] + [242(2) + 484(2)] |
| 11101100 | [484 (1)] + 242 (3)] + [484(1) + 242(3)] |
| 11101101 | [484 (1)] + 242 (3)] + [484(1) + 242(4)] |
| 11101110 | [484 (1)] + 242(4)] + [242(1) + 484(2)] |
| 11101111 | [484 (1)] + 242(4)] + [242(2) + 484(2)] |
| 11110000 | [484 (1)] + 242(4)] + [484 (1) + 242 (3)] |
| 11110001 | [484 (1)] + 242 (4)] + [484(1) + 242(4)] |
| 11110010 | 484(1) + 996(1) |
| 11110011 | 996(1) + 484(1) |
| 11110100 | 996(1) + 484(2) |
| 11110101 | [242(1) + 484(2)] + 996(1) |
| 11110110 | [484(1) + 242(3)] + 996(1) |
| 11110111 | [484(1) + 242(4)] + 996(1) |
| 11111000 | 996(1) + [242(1) + 484(2)] |
| 11111001 | 996(1) + [242(2) + 484(2)] |
| 11111010 | 996(1) + [484(1) + 242(3)] |
| 11111011 | 996(1) + [484(1) + 242(4)] |
| 11111100~11111111 | Reserved |

3-B-ii. Through Table 30, an example in which M-RUs are allocated including 242 included in primary 20 has been described. This is an example, and the order of the subfields may be set differently from Table 30.

3-B-iii. Unlike the above-described example, the subfield may be configured with only a partial combination. RU combination and RU allocation according to the subfield may be configured as shown in Table 31.

TABLE 31

| RU allocation subfield | RU combination | RU allocation |
| --- | --- | --- |
| $a_1a_2a_3a_4a_5$000 | 484(1) + 996(2) | 484 + 484 + 996 |
| $a_1a_2a_3a_4a_5$001 | 484(2) + 996(2) | 484 + 484 + 996 |
| $a_1a_2a_3a_4a_5$010 | 996(1) + 484(1) | 996 + 484 + 484 |
| $a_1a_2a_3a_4a_5$011 | 996(1) + 484(2) | 996 + 484 + 484 |

Referring to table 31, $a_1a_2a_3a_4a_5$ may be set to 01111 or 11011 using a reserved bit of the RU allocation table. Another example. $a_1a_2a_3a_4a_5$ may be configured using reserved bits for index 224-255 ($111x_4x_3x_2x_1x_0$).

4. According to an embodiment, a combination for a large RU size may be configured with only some combinations of the combinations of the above-described examples. The combination for the large RU size may be configured as shown in table 32 by using the reserved bit of the RU allocation bit table.

TABLE 32

| RU allocation subfield | RU combination | RU allocation |
| --- | --- | --- |
| $a_1a_2a_3a_4a_5a_6a_7a_8$ | 242(1) + 484(2) | 242 + 242 + 484 |
| $a_1a_2a_3a_4a_5a_6a_7a_8$ | 242(2) + 484(2) | 242 + 242 + 484 |
| $a_1a_2a_3a_4a_5a_6a_7a_8$ | 484(1) + 242(3) | 484 + 242 + 242 |
| $a_1a_2a_3a_4a_5a_6a_7a_8$ | 484(1) + 242(4) | 484 + 242 + 242 |
| $a_1a_2a_3a_4a_5a_6a_7a_8$ | 484(1) + 996(2) | 484 + 484 + 996 |
| $a_1a_2a_3a_4a_5a_6a_7a_8$ | 484(2) + 996(2) | 484 + 484 + 996 |

TABLE 32-continued

| RU allocation subfield | RU combination | RU allocation |
| --- | --- | --- |
| $a_1a_2a_3a_4a_5a_6a_7a_8$ | 996(1) + 484(1) | 996 + 484 + 484 |
| $a_1a_2a_3a_4a_5a_6a_7a_8$ | 996(1) + 484(2) | 996 + 484 + 484 |

Referring to table 32, for example, $a_1a_2a_3a_4a_5a_6a_7a_8$ may be configured as 120-127 ($01111y_2y_1y_0$) and/or 216-223 ($11011y_2y_1y_0$) using reserved bits of the RU allocation table. As another example, $a_1a_2a_3a_4a_5a_6a_7a_8$ may be configured using bits for index 224-255 ($111x_4x_3x_2x_1x_0$).

The Third Embodiment

According to the third embodiment, the multiple RU combination may be configured as follows according to the RU size.

1. An RU combination may be configured in the configuration of 26+52, 26+106 RU within 20 MHz, and two or more RU combinations may exist.

2. In 80 MHz and 160 MHz, the RU combination may be configured as follows.

2-A. 80 MHz-484+242 (4 case)

2-B. 160 MHz-484+996 (4 case)

3. The number of cases for the RU combination considering the examples 1 and 2 above may be configured as follows.

3-A. Small RU combination

3-A-i. A 26+52 RU combination can be configured as shown in FIG. 33.

FIG. 33 shows an example of a 26+52 RU combination.

3-A-ii. A 26+106 RU combination can be configured as shown in FIG. 34.

FIG. 34 shows an example of a 26+106 RU combination.

3-A-iii. A 26+52 and 26+106 RU combination can be configured as shown in FIG. 35.

Figure 35:
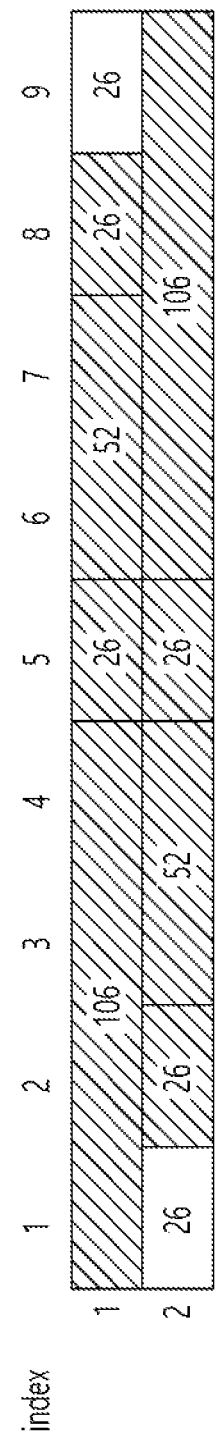
FIG. 35 shows an example of 26+52 and 26+106 RU combinations.

FIG. 35 shows an example of 26+52 and 26+106 RU combinations.

3-B. Large RU combination

3-B-i. A Large RU combination at 80 MHz may be configured as shown in FIG. 36.

FIG. 36 shows an example of a Large RU combination at 80 MHz.

3-B-ii. A Large RU combination at 160 MHz can be configured as shown in FIG. 37.

Figure 37:
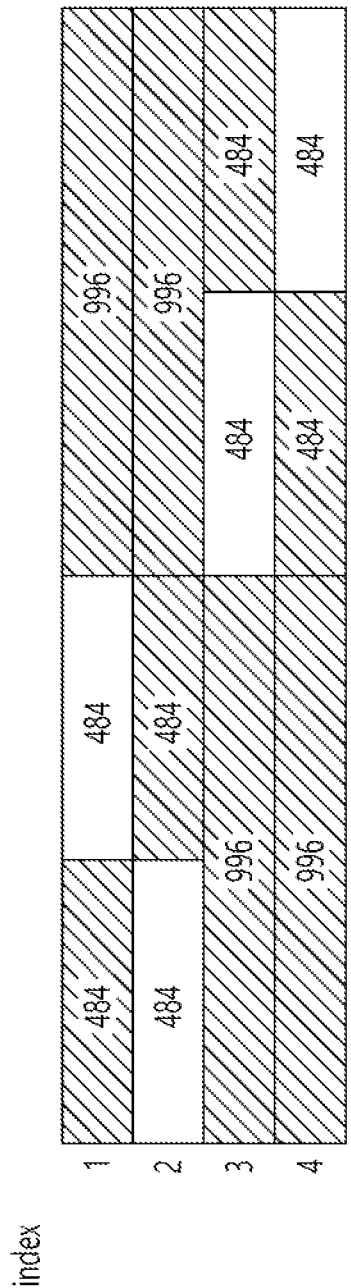
FIG. 37 shows an example of a Large RU combination at 160 MHz.

FIG. 37 shows an example of a Large RU combination at 160 MHz.

4. In the example 3, the number of all combinations listed is 31. Accordingly, the indication of the combination for the combination may be configured as follows using bits for reserved index 224-255 (111x4x3x2x1x0) of the RU allocation field. The EHT STA may indicate allocation information for the combined RU during OFDMA transmission through bits for reserved index 224-255 (111x4x3x2x1x0).

Examples of RU combinations according to the value of the RU allocation subfield may be configured as shown in tables 33 to 34.

TABLE 33

| RU allocation subfield | RU combination |
| --- | --- |
| 11100000 | 26 + [26 + 52] + 26 + 26 + 26 + 26 |
| 11100001 | 26 + [26 + 52] + 26 + 26 + 26 + 52 |
| 11100010 | 26 + [26 + 52] + 26 + 52 + 26 + 26 |

TABLE 33-continued

| RU allocation subfield | RU combination |
| --- | --- |
| 11100011 | 26 + [26 + 52] + 26 + 52 + 52 |
| 11100100 | 26 + [26 + 52] + 26 + 106 |
| 11100101 | 26 + 26 + 26 + 26 + 26 + [52 + 26] + 26 |
| 11100110 | 26 + 26 + 52 + 26 + [52 + 26] + 26 |
| 11100111 | 52 + 26 + 26 + 26 + [52 + 26] + 26 |
| 11101000 | 52 + 52 + 26 + [52 + 26] + 26 |
| 11101001 | 106 + 26 + [52 + 26] + 26 |
| 11101010 | 26 + [26 + 52] + 26 + [52 + 26] + 26 |
| 11101011 | [106 + 26] + 26 + 26 + 26 + 26 |
| 11101100 | [106 + 26] + 26 + 26 + 52 |
| 11101101 | [106 + 26] + 52 + 26 + 26 |
| 11101110 | [106 + 26] + 52 + 52 |

TABLE 34

| 11101111 | [106 + 26] + 106 |
| --- | --- |
| 11110000 | 26 + 26 + 26 + 26 + [26 + 106] |
| 11110001 | 26 + 26 + 52 + [26 + 106] |
| 11110010 | 52 + 26 + 26 + [26 + 106] |
| 11110011 | 52 + 52 + [26 + 106] |
| 11110100 | 106 + [26 + 106] |
| 11110101 | [106 + 26] + [52 + 26] + 26 |
| 11110110 | 26 + [26 + 52] + [26 + 106] |
| 11110111 | [242] + 242 + [484] |
| 11111000 | 242 + [242 + 484] |
| 11111001 | [484 + 242] + [242] |
| 11111010 | [484] + 242 + [242] |
| 11111011 | [484] + 484 + [996] |
| 11111100 | 484 + [484 + 996] |
| 11111101 | [996 + 484] + 484 |
| 11111110 | [996] + 484 + [484] |
| 11111111 | Reserved |

Referring to Tables 33 and 34, [ ] may mean RU combination. The above-described RU combinations are examples, and the order of the indication bit for each combination may be configured differently.

5. As described above, when an RU combination is indicated using the Ru allocation field, the user field in the user-specific field may be configured as one user field for the RU aggregation combination, and transmitted.

Figure 38:
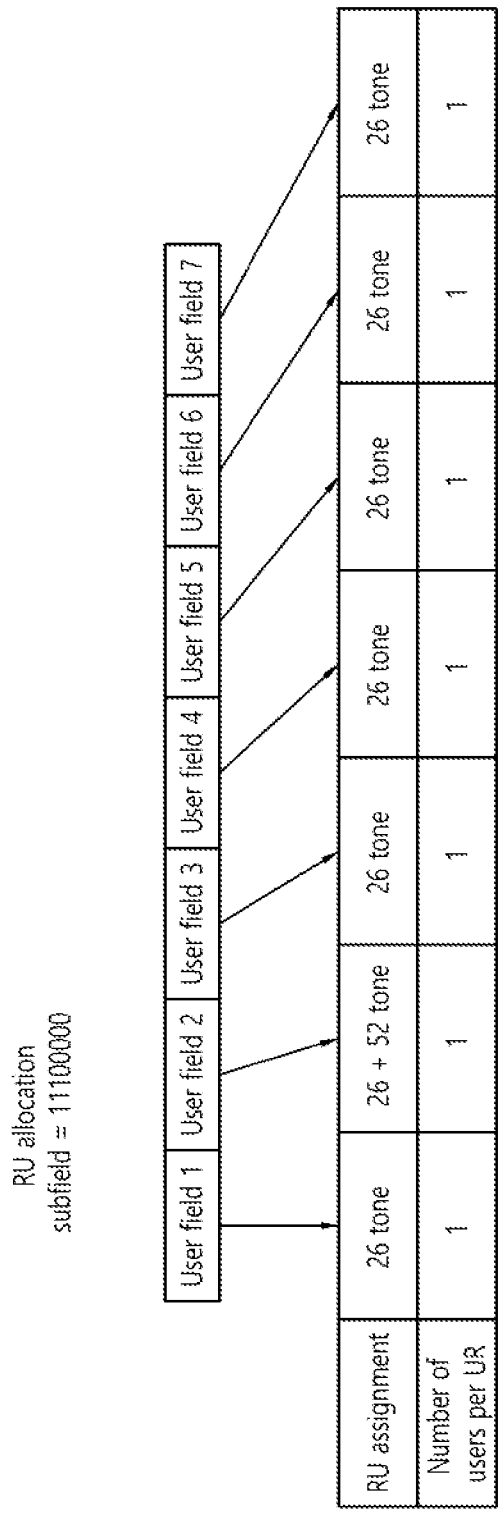
FIG. 38 shows an example of a user field.

5-A. FIG. 38 shows an example of a user field.

Referring to FIG. 38, the RU combination may be configured as 26+52 RUs within 20 MHz. For example, the RU allocation subfield may be set to 11100000. In this case, the RU combination may be configured as 26126+521+26+26+26+26+26. For this, 7 user fields may be configured, and each user field may correspond to one RU or multiple RUs.

Figure 39:
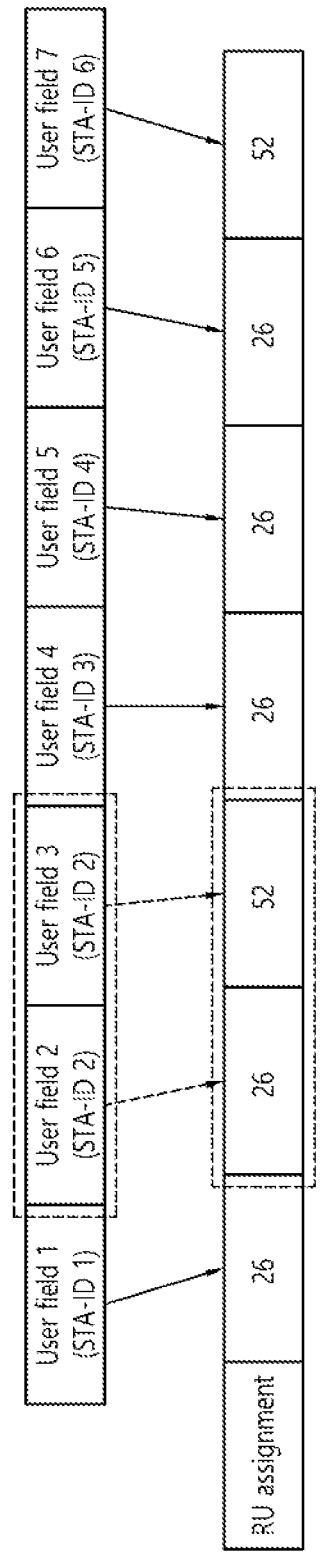
FIG. 39 shows another example of a user field.

5-B. FIG. 39 shows another example of a user field.

Referring to FIG. 39, the same STA-ID may be allocated and transmitted to M-RUs to which RU aggregation is applied. That is, when M-RU aggregation is applied to RU26+RU52, STA-IDs existing in the user field corresponding to RU26 and RU52 may be set identically to each other.

5-B-i. As shown in FIG. 39, the same STA-ID may be assigned to the user field. In this case, since the STA does not know information on multiple RUs allocated to itself, all user fields may be unnecessarily decoded during OFDMA transmission. Accordingly, in order to prevent such unnecessary operation, the following information may be transmitted through the U-SIG/EHT-SIG or user field.

5-B-i-1. M-RU aggregation (or information about M-RU aggregation)

5-B-i-1-a. Information on M-RU aggregation may be transmitted through U-SIG/EHT-SIG. Information on M-RU aggregation may be used to indicate whether Multiple RU aggregation is applied.

5-B-i-1-b. Information on M-RU aggregation may be included in version-dependent information. Information on M-RU aggregation may be composed of 1-bit information. For example, the 1-bit information may be configured to 1 to indicate multiple RU aggregation.

5-B-i-2. indication of M-RU aggregation (or information about the indication of M-RU aggregation)

5-B-i-2-a. Information about the indication of M-RU aggregation may be included in the user field. The information on the indication of M-RU aggregation may indicate whether the RU allocated to the STA is an RU applied to the M-RU aggregation.

5-B-i-2-b. The information about the indication of M-RU aggregation may be set to 1-bit information. For example, the 1-bit information may be set to 1 to indicate that the M-RU RU is an RU included in aggregation.

5-B-i-3. End of allocated RU (or information about End of allocated RU)

5-B-i-3-a. Information on the End of allocated RU may be used to indicate that it is the last RU allocated to the STA. Information on the end of allocated RU may be set to 1 or 2 bits.

5-B-i-3-b. Information on the end of allocated RU may be transmitted while being included in the user field.

5-B-i-3-c. For example, information on the End of allocated RU may be allocated as 1-bit. Information on the End of allocated RU may be configured as follows.

5-B-i-3-c-i. When the RU is an RU corresponding to M-RU aggregation

For example, when the allocated RU is not the last RU during M-RU aggregation, information on the End of allocated RU may be set to 0. The EHT STA may indicate that there are more allocated other RUs based on the information on the End of allocated RU set to 0.

As another example, when the allocated RU is the last RU during M-RU aggregation, information on the End of allocated RU may be set to 1. The EHT STA may indicate that the allocated RU is the last allocated RU based on information on the End of allocated RU set to 1.

5-B-i-3-c-ii. If the RU is an RU that does not fall under M-RU aggregation

As an example, information on the End of allocated RU may be set to 1. The EHT STA may indicate to the STA that the RU is the last RU based on information about the End of allocated RU configured to 1.

5-C. As in the above embodiment, non-MU-MIMO may be supported/applied for a small RU combination.

5-D. For a large RU combination, non-MU-MIMO may be supported/applied in the same way as for small RU combination.

The 4th Embodiment

According to the fourth embodiment, unlike the above-described embodiment, two allocation fields in the common field of EHT-SIGB may be configured. For example, the first allocation field may include information on the configuration of an RU used for OFDMA. The second allocation field may be used for an indication for multiple RU combinations. In other words, the second allocation field may include information on multiple RU combinations.

1. The receiving STA may check the presence or absence of the second allocation by the multiple RU allocation indication bit transmitted through U-SIG/EHT-SIGA. In other words, information on the presence or absence of the second allocation may be included in the multiple RU allocation indication bit transmitted through U-SIG/EHT-SIGA.

2. The STA (for example, EHT STA) that has recognized multiple RU transmission by the multiple RU allocation bit transmitted through U-SIG/EHT-SIGA may recognize/confirm that there are two RU allocation tables. Accordingly, the STA may decode up to the second RU allocation field.

2-A. The second allocation field used for M-RU allocation may consist of 2 or 3 bits. For example, the second allocation field may be added to an existing allocation table to indicate M-RU allocation.

2-B. Unlike the above example, the second allocation field may be configured as a bit table used for multiple RU allocation. For example, the second allocation field may consist of a 7 to 9 bit table. The 7 to 9 bit table may be configured as follows, including a combination of all RUs described in the present description.

2-B-i. For example, a 7-bit table for multiple RU combination may be formed/configured as shown in tables 35 and 36.

TABLE 35

| Index | RU combination | RU allocation |
|---|---|---|
| 1 | 26(2) + 52(2) | 26 + 26 + 52 + 26 + 26 + 26 + 26 + 26 |
| 2 | 26(2) + 52(2) | 26 + 26 + 52 + 26 + 26 + 26 + 52 |
| 3 | 26(2) + 52(2) | 26 + 26 + 52 + 26 + 52 + 26 + 26 |

TABLE 35-continued

| Index | RU combination | RU allocation |
|---|---|---|
| 4 | 26(2) + 52(2) | 26 + 26 + 52 + 26 + 52 + 52 |
| 5 | 26(2) + 52(2) | 26 + 26 + 52 + 26 + 106 |
| 6 | 52(3) + 26(8) | 26 + 26 + 26 + 26 + 26 + 52 + 26 + 26 |
| 7 | 52(3) + 26(8) | 26 + 26 + 52 + 26 + 52 + 26 + 26 |
| 8 | 52(3) + 26(8) | 52 + 26 + 26 + 26 + 52 + 26 + 26 |
| 9 | 52(3) + 26(8) | 52 + 52 + 26 + 52 + 26 + 26 |
| 10 | 52(3) + 26(8) | 106 + 25 + 52 + 26 + 26 |
| 11 | 106(1) + 26(5) | 106 + 26 + 26 + 26 + 26 + 26 |
| 12 | 106(1) + 26(5) | 106 + 26 + 26 + 26 + 52 |
| 13 | 106(1) + 26(5) | 106 + 26 + 52 + 26 + 26 |
| 14 | 106(1) + 26(5) | 106 + 26 + 52 + 52 |
| 15 | 26(5) + 106(2) | 26 + 26 + 26 + 26 + 26 + 106 |
| 16 | 26(5) + 106(2) | 26 + 26 + 52 + 26 + 106 |
| 17 | 26(5) + 106(2) | 52 + 26 + 26 + 26 + 106 |
| 18 | 26(5) + 106(2) | 52 + 52 + 26 + 106 |
| 19 | 242(1) + 242(3) | 242 + 242 + 242 + 242 |
| 20 | 242(1) + 242(4) | 242 + 242 + 242 + 242 |
| 21 | 242(1) + 484(2) | 242 + 242 + 484 |
| 22 | 242(2) + 242(3) | 242 + 242 + 242 + 242 |
| 23 | 242(2) + 242(4) | 242 + 242 + 242 + 242 |
| 24 | 242(2) + 484(2) | 242 + 242 + 484 |
| 25 | 484(1) + 242(1) | 484 + 242 + 242 |
| 26 | 484(1) + 242(2) | 484 + 242 + 242 |
| 27 | [484 (1)] + [242(1) + 484(2)] | [484 + 242 + 242] + [242 + 242 + 484] |
| 28 | [484 (1)] + [242(1) + 484(2)] | [484 + 484] + [242 + 242 + 484] |
| 29 | [484 (1)] + [242(2) + 484(2)] | [484 + 242 + 242] + [242 + 242 + 484] |

TABLE 36

| 30 | [484 (1)] + [242(2) + 484(2)] | [484 + 484] + [242 + 242 + 484] |
|---|---|---|
| 31 | [484 (1)] + [484(1) + 242(3)] | [484 + 242 + 242] + [484 + 242 + 242] |
| 32 | [484 (1)] + [484(1) + 242(3)] | [484 + 484] + [484 + 242 + 242] |
| 33 | [484 (1)] + [484(1) + 242(4)] | [484 + 242 + 242] + [484 + 242 + 242] |
| 34 | [484 (1)] + [484(1) + 242(4)] | [484 + 484] + [484 + 242 + 242] |
| 35 | [484 (2)] + [242(1) + 484(2)] | [484 + 242 + 242] + [242 + 242 + 484] |
| 36 | [484 (2)] + [242(1) + 484(2)] | [484 + 484] + [242 + 242 + 484] |
| 37 | [484 (2)] + [242(2) + 484(2)] | [484 + 242 + 242] + [242 + 242 + 484] |
| 38 | [484 (2)] + [242(2) + 484(2)] | [484 + 484] + [242 + 242 + 484] |
| 39 | [484 (2)] + [484(1) + 242(3)] | [484 + 242 + 242] + [484 + 242 + 242] |
| 40 | [484 (2)] + [484(1) + 242(3)] | [484 + 484] + [484 + 242 + 242] |
| 41 | [484 (2)] + [484(1) + 242(4)] | [484 + 242 + 242] + [484 + 242 + 242] |
| 42 | [484 (2)] + [484(1) + 242(4)] | [484 + 484] + [484 + 242 + 242] |
| 43 | [242(1) + 484(2)] + [242(2) + 484(2)] | [242 + 242 + 484] + [242 + 242 + 484] |
| 44 | [242(1) + 484(2)] + [484(1) + 242(1)] | [242 + 242 + 484] + [484 + 242 + 242] |
| 45 | [242(1) + 484(2)] + [484(1) + 242(2)] | [242 + 242 + 484] + [484 + 242 + 242] |
| 46 | [242(2) + 484(2)] + [242(2) + 484(2)] | [242 + 242 + 484] + [242 + 242 + 484] |
| 47 | [242(2) + 484(2)] + [484(1) + 242(1)] | [242 + 242 + 484] + [484 + 242 + 242] |
| 48 | [242(2) + 484(2)] + [484(1) + 242(2)] | [242 + 242 + 484] + [484 + 242 + 242] |
| 49 | [484(1) + 242(3)] + [242(2) + 484(2)] | [484 + 242 + 242] + [242 + 242 + 484] |
| 50 | [484(1) + 242(3)] + [484(1) + 242(3)] | [484 + 242 + 242] + [484 + 242 + 242] |
| 51 | [484(1) + 242(3)] + [484(1) + 242(4)] | [484 + 242 + 242] + [484 + 242 + 242] |
| 52 | [484(1) + 242(4)] + [242(1) + 484(2)] | [484 + 242 + 242] + [242 + 242 + 484] |
| 53 | [484(1) + 242(4)] + [242(2) + 484(2)] | [484 + 242 + 242] + [242 + 242 + 484] |
| 54 | [484(1) + 242(4)] + [484(1) + 242 (3)] | [484 + 242 + 242] + [484 + 242 + 242] |
| 55 | [484(1) + 242(4)] + [484(1) + 242(4)] | [484 + 242 + 242] + [484 + 242 + 242] |
| 56 | 996(1) + 484(2) | [996] + [242 + 242 + 484] |
| 57 | 996(1) + 484(2) | [996] + [484 + 484] |
| 58 | [242(1) + 484(2)] + 996(1) | [242 + 242 + 484] + [996] |
| 59 | [242(2) + 484(2)] + 996(1) | [242 + 242 + 484] + [996] |
| 60 | [484(1) + 242(3)] + 996(1) | [484 + 242 + 242] + [996] |
| 61 | [484(1) + 242(4)] + 996(1) | [484 + 242 + 242] + [996] |
| 62 | 996(1) + [242(1) + 484(2)] | [996] + [242 + 242 + 484] |
| 63 | 996(1) + [242(2) + 484(2)] | [996] + [242 + 242 + 484] |
| 64 | 996(1) + [484(1) + 242(3)] | [996] + [484 + 242 + 242] |
| 65 | 996(1) + [484(1) + 242(4)] | [996] + [484 + 242 + 242] |

2-B-ii. According to an embodiment, the tables of Tables 35 and 36 may be configured with 8/9 bits in consideration of MU-MIMO transmission.

2-C. The multiple RU allocation subfield may be transmitted by being duplicated in units of 20 MHz. Therefore, when multiple RU allocation is used, the multiple RU allocation subfield may be equally included in EHT-SIGB1 and EHT-SIGB2, and may be transmitted through EHT-SIGB1 and EHT-SIGB2.

2-D. In the first RU allocation field for an RU used for multiple RU allocation, the corresponding RU may be indicated as an empty RU in order to avoid redundant allocation.

The 5th Embodiment

According to the fifth embodiment, a new RU allocation table may be configured including all indications for RU allocation and M-RU combination and MU-MIMO transmission. The size of the RU allocation table may consist of 9 or 10 bits.

1. For example, the RU allocation fields of the 9/10 bit size may be configured as follows.

1-A. The newly configured RU allocation table may be configured to include both the indication for the M-RU combination and the existing RU allocation bit, and may be newly indexed.

1-A-i. For example, an RU allocation table composed of 9, 10, or 11-bits may be configured. The RU allocation table may be transmitted through EHT-SIG. As an example, each of the RU allocation fields may consist of 512/1024 cases.

1-A-ii. By allocating an index based on a method similar to the existing allocation, allocation can be configured. For example, by allocating an index based on the RU size or the number of MU-MOMO supported users, allocation may be configured.

1-B. Unlike the above-described embodiment, the RU allocation field may be configured in the following way.

1-B-i. According to an embodiment, allocation information for M-RU aggregation may be added after conventional allocation to configure an allocation field.

1-B-i-1. For example, an allocation field may be configured by additionally adding 1 to 2 bits of information after the existing allocation bit. The EHT STA may indicate allocation for the M-RU based on the allocation field.

1-B-i-2. For example, when 1 or 2 bits are used for allocation information for M-RU aggregation, a 1 or 2 bit field may be added after the existing allocation field. Accordingly, the allocation field may be configured as follows.

1-B-i-2-A. RU Allocation field(8 bit)+RU Allocation field2 (½ bit)

The RU Allocation field (8 bits) may refer to an existing allocation field. RU Allocation field2 (½ bit) may mean a field added for allocation information for M-RU aggregation.

1-B-i-2-B. Unlike the above example, an additional field may be added before the existing allocation field. Accordingly, the allocation field may be configured as follows.

1-B-i-2-B-i. RU allocation field2 (½ bit)+RU Allocation field (8 bit)

1-B-ii. Unlike the above example, 1 or 2 bits among 9 or 10 bits may be used as a field/bit for distinguishing the allocation for M-RU aggregation and the existing OFDMA allocation. For example, the leading MSB ½ bit may be used as a parsing bit. Therefore, the RU allocation subfield may consist of 1 or 2 bits for parsing the allocation table and 8 or 9 bits for the allocation indication.

1-B-ii-1. For example, the 9-bit allocation may be configured as follows.

1-B-ii-1-A. 0xxxxxxxx: In this case, RU allocation for conventional OFDMA transmission that does not include M-RU allocation may be indicated. That is, when the RU allocation subfield is set to 0xxxxxxxx, the RU allocation subfield may include information on RU allocation for legacy OFDMA transmission. The x may be set to 0 or 1.

1-B-ii-1-B. 1xxxxxxxx: In this case, RU allocation for indicating M-RU allocation may be indicated. That is, when the RU allocation subfield is set to 1xxxxxxxx, the RU allocation subfield may include information about RU allocation for indicating M-RU allocation. The x may be set to 0 or 1.

1-B-ii-2. The RU allocation subfield described in 1-B-ii-1 is only one example, and the RU allocation subfield may be configured in various ways. For example, the RU allocation subfield may consist of 10 bits. 2 bits of the 10-bit table may be used as parsing bits. As an example, in this case, 00 may be used to indicate an existing allocation. 01, 10, and 11 may be used to indicate M-RU allocation and MU-MIMO indication.

1-B-ii-3. As another example, the first 1-bit among 2 bits may be used to indicate whether M-RU allocation is performed. The remaining 1-bit may be used to indicate an entry according to allocation, the number of MU-MIMO users, and/or 16 streams. Hereinafter, an example of information configured according to the 2 bits may be described.

1-B-ii-3-A. 00: Existing RU allocation

1-B-ii-3-B. 01: entry indication according to 16 stream support

1-B-ii-3-C. 10~11: entry indication according to the number of MU-MIMO users and M-RU allocation 1-B-iii. 1-bit used as a parsing bit for indicating the M-RU aggregation may not be included in the RU allocation subfield. The 1-bit may be included in the U-SIG/EHT-SIG field and transmitted separately.

1-B-iii-1. For example, information indicating M-RU aggregation may consist of 1-bit. In other words, an 1-bit M-RU aggregation indication may be configured and transmitted. In this case, the RU allocation subfield consists of 8 bits as before, but may be configured differently according to the 1-bit information. For example, when the 1-bit is set to 0, the RU allocation subfield defined in the existing 11ax may be used. When the 1-bit is set to 1, the RU allocation subfield may be configured as RU allocation to support M-RU aggregation.

Figure 40:
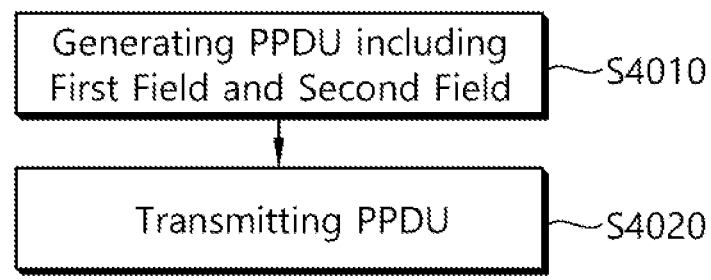
FIG. 40 is a flowchart illustrating an operation of a transmitting STA.

FIG. 40 is a flowchart illustrating an operation of a transmitting STA.

Referring to FIG. 40, in step S4010, the transmitting STA may generate a PPDU. The transmitting STA may generate a PPDU including the first field and the second field.

According to an embodiment, the transmitting STA may generate a PPDU including the first signal field and the second signal field. For example, the first field and the second field may be included in the second signal field. As an example, the first signal field may include a U-SIG. As an example, the second signal field may include an EHT-SIG. As an example, the first field may include a common field. As an example, the second field may include a user-specific field.

For example, the first signal field and the second signal field may be encoded, respectively. As an example, in the first signal field, two symbols may be jointly encoded. In addition, the first signal field and the second signal field may be modulated, respectively.

According to an embodiment, the PPDU may further include an L-SIG field and an RL-SIG field. For example, the RL-SIG field may be continuous to the L-SIG field. For example, the first signal field may be contiguous to the RL-SIG field. For example, the second signal field may be contiguous to the first signal field.

For example, the transmitting STA may configure the value of the length field of the L-SIG field based on the transmission time of the PPDU. As an example, the result of the "modulo 3 operation" on the value of the length field of the L-SIG field may be configured to 0.

For example, the RL-SIG field may be configured such that the L-SIG field is repeated. As an example, the RL-SIG field may include the same information field as the L-SIG field and may be modulated in the same manner. The L-SIG field and the RL-SIG field may be modulated through BPSK, respectively.

According to an embodiment, the first signal field may include information about a version of the PPDU. Information about the version of the PPDU may be determined based on whether the PPDU is an EHT PPDU.

For example, the information about the version of the PPDU may be composed of 3-bit information. The information about the version of the PPDU may include information indicating that the PPDU is a PPDU based on the EHT standard (that is, an EHT PPDU). In addition, the information on the version of the PPDU may include information for classifying the PPDU according to the 802.11be standard (that is, the EHT standard) or later. In other words, the information about the version of the PPDU may include information for classifying the EHT standard and the PPDU according to the standard determined/generated/established after the EHT standard. That is, the information about the version of the PPDU may include information indicating that the PPDU is an EHT standard or a PPDU after the EHT standard.

According to an embodiment, the type of the PPDU and the version of the PPDU may be used separately. The type of PPDU may be used to distinguish the PPDU according to the EHT standard and the standard before the EHT standard (for example, 802.11n/ac/ax). On the other hand, the version of the PPDU may be used to distinguish the PPDU according to the EHT standard and the standard after the EHT standard. For example, the version of the PPDU may be called variously. For example, the version of the PPDU may be referred to as a PHY version, a Packet version, a Packet identifier, and a Wi-Fi version.

According to an embodiment, the first signal field may further include information on basic service set (BSS) color and information on transmission opportunity (TXOP). For example, the information about the BSS color may be set as various bit information. As an example, the information on the BSS color may be set as 6-bit information. For example, the information about the TXOP may be set to various bit information. As an example, information on TXOP may be set as 7-bit information.

According to an embodiment, the first field may include information about the configuration of a plurality of RUs. For example, information about the configuration of a plurality of RUs may be set as 9-bit information. Information on the configuration of a plurality of RUs may be configured in a 9-bit table. For example, based on a value constituting 9 bits, a configuration of a plurality of RUs may be set. As an example, the configuration of the plurality of RUs may be configured to include multiple RUs (M-RUs) in which two or more RUs are combined.

According to an embodiment, the second field may include a plurality of user fields for allocating a plurality of RUs to a plurality of users.

For example, the number of the plurality of user fields may be set based on the configuration of the plurality of RUs.

As an example, the number of the plurality of user fields may be set equal to the number of the plurality of RUs. According to a specific example, a plurality of RU configurations may be set to 26+[26+52]+26+26+26+26+26 RUs.[ ] may mean M-RU. That is, the plurality of RU configurations may be composed of seven. Accordingly, the number of the plurality of user fields may be composed of seven. The plurality of user fields may include first to seventh user fields. Accordingly, one user field may be allocated to the M-RU.

As another example, the number of a plurality of user fields may be set based on a single RU constituting the M-RU. According to a specific example, a plurality of RU configurations may be set to 26+[26+52]+26+26+26+52 RUs.[ ] may mean M-RU. That is, a plurality of RU configurations may be composed of six. A user field may be set in each single RU (that is, 26 RU and 52 RU) constituting the M-RU. Accordingly, the number of the plurality of user fields may be set to seven. The plurality of user fields may include first to seventh user fields. Accordingly, each user field may be assigned to a single RU constituting the M-RU.

For example, the first user field among the plurality of user fields may be related to the first RU among the plurality of RUs. As an example, the configuration of the plurality of RUs may be set to 26°[26+52]+26+26+26+52 RUs. Among the plurality of RU configurations, 26 RU, which is the first RU, may be related to the first user field among the plurality of user fields. The 26 RUs may be allocated to STAs related to STA-ID information included in the first user field.

In other words, a plurality of user fields may be configured to correspond to or relate to a plurality of RU configurations. That is, the first user field among the plurality of user fields may be related to a first RU among the plurality of RUs (for example, the first RU in RU allocation). The first user field may include STA ID information of an STA for allocating the first RU.

According to an embodiment, at least one user field among the plurality of user fields may include the same STA ID information. The at least one user field may be used to allocate an M-RU.

For example, the transmitting STA may allocate an M-RU to the receiving STA. At least one user field among the plurality of user fields may include the same STA ID information regarding the receiving STA. The transmitting STA may allocate the M-RU to the receiving STA based on at least one user field.

As an example, the configuration of the plurality of RUs may be set to 26+[26+52]+26+26+26+26 RUs. The transmitting STA may allocate a second RU (that is, [26+52]) configured as an M-RU to the receiving STA. In this case, the transmitting STA may allocate one user field to the M-RU. Accordingly, in order to allocate the second RU to the receiving STA, the transmitting STA may set STA ID information included in the second user field among the plurality of user fields as STA ID information regarding the receiving STA.

As another example, the configuration of the plurality of RUs may be set to 26+[26+52]+26+26+26+52 RUs. The transmitting STA may allocate an M-RU in which 26 RUs and 52 RUs are combined to the receiving STA. In this case, the transmitting STA may allocate a user field to each single RU constituting the M-RU. Accordingly, in order to allocate 26 RU and 52 RU to the receiving STA, the transmitting STA may set STA ID information included in the second and third user fields among the plurality of user fields as STA ID information regarding the receiving STA.

For example, the at least one user field may include information indicating that the RU constituting the M-RU is the last RU allocated to the receiving STA. In other words, each of the at least one user field may include information indicating that the RU associated with the at least one user field is the last RU allocated to the receiving STA.

Information (hereinafter, first information) indicating that the RU constituting the M-RU is the last RU allocated to the receiving STA may consist of 1 or 2 bits. As an example, if the RU constituting the M-RU is not the last RU allocated to the receiving STA, the first information may be set as the first value. When the RU constituting the M-RU is the last RU allocated to the receiving STA, the first information may be set to the second value.

As an example, the configuration of the plurality of RUs may be set to 26+[26+52]+26+26+26+52 RUs. The transmitting STA may allocate an M-RU in which 26 RUs and 52 RUs are combined to the receiving STA. In this case, the transmitting STA may allocate a user field to each single RU constituting the M-RU. Accordingly, in order to allocate 26 RU and 52 RU to the receiving STA, the transmitting STA may set the STA-ID included in the second and third user fields among the plurality of user fields as the STA-ID for the receiving STA. Also, the transmitting STA may set the first information included in the second user field as the first value. The transmitting STA may set the first information included in the third user field as the second value. Accordingly, the receiving STA may confirm/identify that the RU for the third user field (that is, 52 RUs) is the last RU constituting the M-RU.

According to an embodiment, at least one user field may be configured as one first user field. Accordingly, the receiving STA may identify one first user field including STA ID information about the receiving STA among the plurality of user fields. The one first user field may include information about the M-RU allocated to the receiving STA. In other words, information about the M-RU allocated to the receiving STA may be transmitted through one first user field. In other words, one first user field may be allocated to the M-RU.

According to an embodiment, the above-described first signal field may include information on whether the M-RU is applied. For example, the first signal field may include information on whether an M-RU is included in the configuration of the plurality of RUs. For another example, the first signal field may include information on whether an M-RU is allocated to the receiving STA.

In step S4020, the transmitting STA may transmit a PPDU. That is, the transmitting STA may transmit the generated PPDU.

According to an embodiment, each field included in the PPDU may be transmitted through a symbol. For example, the L-SIG field may be transmitted through the first symbol. The RL-SIG field may be transmitted through a second symbol contiguous to the first symbol. The first signal field may be transmitted through a third symbol contiguous to the second symbol. The second signal field may be transmitted through a fourth symbol contiguous to the third symbol.

As an example, the first symbol may consist of one symbol. The second symbol may consist of one symbol. The third symbol may consist of two symbols. Accordingly, the first signal field may be transmitted through two symbols. For example, the fourth symbol may be composed of at least one or at least one or more symbols. Accordingly, the second signal field may be transmitted through at least one or more symbols contiguous to two symbols through which the first signal field is transmitted.

Figure 41:
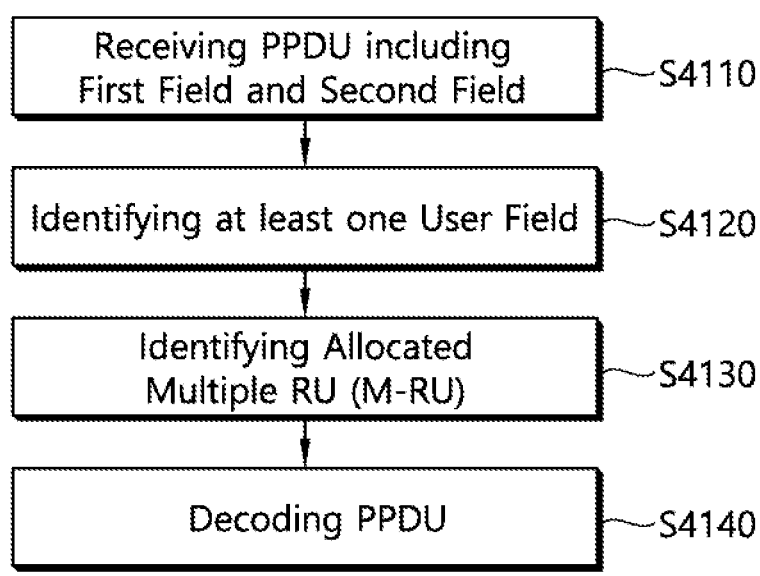
FIG. 41 is a flowchart illustrating an operation of a receiving STA.

FIG. 41 is a flowchart illustrating an operation of a receiving STA.

Referring to FIG. 41, in step S4110, a receiving STA may receive a PPDU. The receiving STA may receive a PPDU including the first field and the second field.

According to an embodiment, the PPDU may include a first signal field and a second signal field. For example, the first field and the second field may be included in the second signal field. As an example, the first signal field may include a U-SIG. As an example, the second signal field may include an EHT-SIG. As an example, the first field may include a common field. As an example, the second field may include a user-specific field.

For example, the first signal field and the second signal field may be encoded, respectively. As an example, in the first signal field, two symbols may be jointly encoded. In addition, the first signal field and the second signal field may be modulated, respectively.

According to an embodiment, the PPDU may further include an L-SIG field and an RL-SIG field. For example, the RL-SIG field may be continuous to the L-SIG field. For example, the first signal field may be contiguous to the RL-SIG field. For example, the second signal field may be contiguous to the first signal field.

For example, the value of the length field of the L-SIG field may be set based on the transmission time of the PPDU. As an example, the result of the "modulo 3 operation" on the value of the length field of the L-SIG field may be set to 0.

For example, the RL-SIG field may be configured such that the L-SIG field is repeated. As an example, the RL-SIG field may include the same information field as the L-SIG field and may be modulated in the same manner. The L-SIG field and the RL-SIG field may be modulated through BPSK, respectively.

According to an embodiment, the first signal field may include information about a version of the PPDU. Information about the version of the PPDU may be determined based on whether the PPDU is an EHT PPDU.

For example, the information about the version of the PPDU may be composed of 3-bit information. The information about the version of the PPDU may include information indicating that the PPDU is a PPDU based on the EHT standard (that is, an EHT PPDU). In addition, the information on the version of the PPDU may include information for classifying the PPDU according to the 802.11be standard (that is, the EHT standard) or later. In other words, the information about the version of the PPDU may include information for classifying the EHT standard and the PPDU according to the standard determined/generated/established after the EHT standard. That is, the information about the version of the PPDU may include information indicating that the PPDU is an EHT standard or a PPDU after the EHT standard.

According to an embodiment, the type of the PPDU and the version of the PPDU may be used separately. The type of PPDU may be used to distinguish the PPDU according to the EHT standard and the standard before the EHT standard (for example, 802.11n/ac/ax). On the other hand, the version of the PPDU may be used to distinguish the PPDU according to the EHT standard and the standard after the EHT standard. For example, the version of the PPDU may be called variously. For example, the version of the PPDU may be referred to as a PHY version, a Packet version, a Packet identifier, and a Wi-Fi version.

According to an embodiment, the first signal field may further include information on basic service set (BSS) color and information on transmission opportunity (TXOP). For example, the information about the BSS color may be set as various bit information. As an example, the information on the BSS color may be set as 6-bit information. For example, the information about the TXOP may be set to various bit information. As an example, information on TXOP may be set as 7-bit information.

According to an embodiment, each field included in the PPDU may be received through a symbol. For example, the L-SIG field may be received through the first symbol. The RL-SIG field may be received through a second symbol contiguous to the first symbol. The first signal field may be received through a third symbol contiguous to the second symbol. The second signal field may be received through a fourth symbol contiguous to the third symbol.

As an example, the first symbol may consist of one symbol. The second symbol may consist of one symbol. The third symbol may consist of two symbols. Accordingly, the first signal field may be received through two symbols. For example, the fourth symbol may be composed of at least one or at least one or more symbols. Accordingly, the second signal field may be received through at least one or more contiguous symbols from two symbols in which the first signal field is received.

According to an embodiment, the first field may include information about the configuration of a plurality of RUs. For example, information about the configuration of a plurality of RUs may be set as 9-bit information. Information on the configuration of a plurality of RUs may be configured in a 9-bit table. For example, based on a value constituting 9 bits, a configuration of a plurality of RUs may be set. As an example, the configuration of the plurality of RUs may be configured to include multiple RUs (M-RUs) in which two or more RUs are combined.

According to an embodiment, the second field may include a plurality of user fields for allocating a plurality of RUs to a plurality of users.

For example, the number of the plurality of user fields may be set based on the configuration of the plurality of RUs.

As an example, the number of the plurality of user fields may be set equal to the number of the plurality of RUs. According to a specific example, a plurality of RU configurations may be set to 26+[26+52]+26+26+26+26+26 RUs.[ ] may mean M-RU. That is, the plurality of RU configurations may be composed of seven. Accordingly, the number of the plurality of user fields may be composed of seven. The plurality of user fields may include first to seventh user fields. Accordingly, one user field may be allocated to the M-RU.

As another example, the number of a plurality of user fields may be set based on a single RU constituting the M-RU. According to a specific example, a plurality of RU configurations may be set to 26+[26+52]+26+26+26+52 RUs.[ ] may mean M-RU. That is, a plurality of RU configurations may be composed of six. A user field may be set in each single RU (that is, 26 RU and 52 RU) constituting the M-RU. Accordingly, the number of the plurality of user fields may be set to seven. The plurality of user fields may include first to seventh user fields. Accordingly, each user field may be assigned to a single RU constituting the M-RU.

For example, the first user field among the plurality of user fields may be related to the first RU among the plurality of RUs. As an example, the configuration of the plurality of RUs may be set to 26+[26+52]+26+26+26+52 RUs. 26 RU, which is the first RU, may be related to the first user field among the plurality of user fields. The 26 RUs may be allocated to STAs related to STA-ID information included in the first user field.

In other words, a plurality of user fields may be configured to correspond to or relate to a plurality of RU configurations. That is, the first user field among the plurality of user fields may be related to a first RU among the plurality of RUs (for example, the first RU in RU allocation). The first user field may include STA ID information of an STA for allocating the first RU.

In operation S4120, the receiving STA may identify at least one user field including STA ID information about the receiving STA among a plurality of user fields.

According to an embodiment, at least one user field among the plurality of user fields may include the same STA ID information. At least one user field may be used to allocate an M-RU. For example, at least one user field among the plurality of user fields may include the same STA ID information regarding the receiving STA.

In step S4130, the receiving STA may identify an M-RU allocated to the receiving STA. According to an embodiment, the receiving STA may identify the M-RU allocated to the receiving STA based on at least one user field.

For example, an M-RU may be allocated to a receiving STA. The receiving STA may identify/confirm the M-RU allocated to the receiving STA based on at least one user field.

As an example, the configuration of the plurality of RUs may be set to 26+[26+52]+26+26+26+26 RUs. A second RU configured as an M-RU may be allocated to the receiving STA. In addition, one user field may be allocated to the M-RU. Accordingly, STA ID information included in the second user field among the plurality of user fields may be set as STA ID information about the receiving STA.

As another example, the configuration of the plurality of RUs may be set to 26+[26+52]+26+26+26+52 RUs. A combined M-RU of 26 RU and 52 RU may be allocated to a receiving STA. In addition, a user field may be allocated to each single RU constituting the M-RU. Accordingly, STA ID information included in the second user field and the third user field among the plurality of user fields may be set as STA ID information regarding the receiving STA.

For example, the at least one user field may include information indicating that the RU constituting the M-RU is the last RU allocated to the receiving STA. In other words, each of the at least one user field may include information indicating that the RU associated with the at least one user field is the last RU allocated to the receiving STA.

For example, information (hereinafter, first information) indicating that the RU constituting the M-RU is the last RU allocated to the receiving STA may consist of 1 or 2 bits. As an example, if the RU constituting the M-RU is not the last RU allocated to the receiving STA, the first information may be set as the first value. When the RU constituting the M-RU is the last RU allocated to the receiving STA, the first information may be set to the second value.

As an example, the configuration of the plurality of RUs may be set to 26+[26+52]+26+26+26+52 RUs. A combined M-RU of 26 RU and 52 RU may be allocated to the receiving STA. Accordingly, STA ID information included in the second user field and the third user field among the plurality of user fields may be set as STA ID information regarding the receiving STA.

Also, the receiving STA may confirm/identify that the first information included in the second user field is set to the first value. The receiving STA may confirm/identify that the RU for the second user field is not the last RU allocated to the receiving STA.

The receiving STA may confirm/identify that the first information included in the third user field is set to the second value. The receiving STA may confirm/identify that the RU related to the third user field is the last RU allocated to the receiving STA.

According to an embodiment, at least one user field may be configured as one first user field. Accordingly, the receiving STA may identify one first user field including STA ID information about the receiving STA among the plurality of user fields. The one first user field may include information about the M-RU allocated to the receiving STA. In other words, information about the M-RU allocated to the receiving STA may be transmitted through one first user field. In other words, one first user field may be allocated to the M-RU.

According to an embodiment, the above-described first signal field may include information on whether the M-RU is applied. For example, the first signal field may include information on whether an M-RU is included in the configuration of the plurality of RUs. For another example, the first signal field may include information on whether an M-RU is allocated to the receiving STA.

In step S4140, the receiving STA may decode the PPDU. According to an embodiment, the receiving STA may decode the PPDU based on the M-RU (or the allocated M-RU).

The technical features of the present specification described above may be applied to various devices and methods. For example, the above-described technical features of the present specification may be performed/supported through the apparatus of FIGS. 1 and/or 19. For example, the above-described technical features of the present specification may be applied only to a part of FIGS. 1 and/or 19. For example, the technical features of the present specification described above are implemented based on the processing chip 114/124 of FIG. 1, or implemented based on the processor 111/121 and the memory 112/122 of FIG. 1, or may be implemented based on the processor 610 and the memory 620 of FIG. 19. For example, an apparatus of the present disclosure may comprise a processor; and a memory coupled to the processor, wherein the processor is configured to: acquire, from a transmitting STA, a physical layer protocol data unit (PPDU) including a first field and a second field, wherein the first field includes information about a configuration of a plurality of resource units (RUs), and wherein the second field includes a plurality of user fields for allocating the plurality of RUs to a plurality of users; identify at least one user field, among the plurality of user fields, including a STA identifier (ID) information on the receiving STA; identify a multiple RU (M-RU) allocated to the receiving STA, based on the at least one user field; and decode the PPDU, based on the M-RU.

The technical features of the present specification may be implemented based on a computer readable medium (CRM). The CRM proposed by the present disclosure may store instructions that perform operations comprising: receiving, from a transmitting STA, a physical layer protocol data unit (PPDU) including a first field and a second field, wherein the first field includes information about a configuration of a plurality of resource units (RUs), and wherein the second field includes a plurality of user fields for allocating the plurality of RUs to a plurality of users; identifying at least one user field, among the plurality of user fields, including a STA identifier (ID) information on the receiving STA; identifying a multiple RU (M-RU) allocated to the receiving STA, based on the at least one user field; and decoding the PPDU, based on the M-RU. The instructions stored in the CRM of the present specification may be executed by at least one processor. At least one processor related to CRM in the present specification may be the processor 111/121 or the processing chip 114/124 of FIG. 1, or the processor 610 of FIG. 19. Meanwhile, the CRM of the present specification may be the memory 112/122 of FIG. 1, the memory 620 of FIG. 19, or a separate external memory/storage medium/disk.

The foregoing technical features of this specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyper-parameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

The claims recited in the present specification may be combined in a variety of ways. For example, the technical features of the method claims of the present specification may be combined to be implemented as a device, and the technical features of the device claims of the present specification may be combined to be implemented by a method. In addition, the technical characteristics of the method claim of the present specification and the technical characteristics of the device claim may be combined to be implemented as a device, and the technical characteristics of the method claim of the present specification and the technical characteristics of the device claim may be combined to be implemented by a method.

What is claimed is:

1. A method performed by a receiving station (STA) in a wireless local area network (WLAN) system, the method comprising:
   receiving, from a transmitting STA, an extremely high throughput (EHT) Physical layer Protocol Data Unit (PPDU) including a universal signal (U-SIG) field and an EHT signal (EHT-SIG) field; and
   decoding the EHT PPDU,
   wherein the EHT-SIG field includes a common field including a resource unit (RU) allocation subfield and a user specific field related to a station (STA) identifier,
   wherein a first value of the RU allocation subfield means a first allocation pattern in which one 26-tone RU, one 52+26-tone multiple resource unit (MRU), and five contiguous 26-tone RUs being contiguous to the one 52+26-tone MRU are sequentially allocated,
   wherein a second value of the RU allocation subfield means a second allocation pattern in which one 26-tone RU, one 52+26-tone MRU, three contiguous 26-tone RUs being contiguous to the one 52+26-tone MRU, and one 52-tone RU being contiguous to the three contiguous 26-tone RUs are sequentially allocated,
   wherein a third value of the RU allocation subfield means a third allocation pattern in which one first 26-tone RU, one 52+26-tone MRU being contiguous to the one first 26-tone RU, one second 26-tone RU being contiguous to the one 52+26-tone MRU, one 52-tone RU being contiguous to the one second 26-tone RU, and two contiguous 26-tone RUs being contiguous to the one 52-tone RU are sequentially allocated, and
   wherein a fourth value of the RU allocation subfield identifies a fourth allocation pattern in which one first 26-tone RU, one 52+26-tone MRU being contiguous to the one first 26-tone RU, one second 26-tone RU being contiguous to the one 52+26-tone MRU, and two contiguous 52-tone RUs being contiguous to the one second 26-tone RU are sequentially allocated.

2. The method of claim 1,
   wherein the EHT PPDU further includes a legacy signal (L-SIG) field, a repeated legacy signal (RL-SIG) field being contiguous to the L-SIG field,
   wherein the U-SIG field is contiguous to the RL-SIG,
   wherein the EHT-SIG field is contiguous to the U-SIG field,
   wherein the RL-SIG field includes same control information as the L-SIG field,
   wherein the U-SIG field includes two contiguous symbols,
   wherein the U-SIG field includes version independent bits and version dependent bits being contiguous to the version independent bits,
   wherein the version independent bits include 3 bit information related to a physical version of the EHT PPDU, 1 bit information related to an uplink/downlink (UL/DL) direction, a transmission opportunity (TXOP) information related to a TXOP duration, and a basic service set BSS) color information related to a BSS identifier,
   wherein the RU allocation subfield is configured as 9-bits information.

3. The method of claim 1,
   wherein the user specific field includes at least one user field,
   wherein a number of the at least one user field is configured based on the RU allocation subfield.

4. The method of claim 3,
   wherein the at least one user field includes the same STA ID information on the receiving STA.

5. The method of claim 4, wherein the method further comprising:
   identifying one first user field including STA identifier (ID) information on the receiving STA among a plurality of user fields,
   wherein the one first user field includes information on the MRU allocated to the receiving STA.

6. The method of claim 3,
   wherein the at least one user field includes information indicating that a RU constituting the MRU is a last RU allocated to the receiving STA.

7. A method performed by a transmitting station (STA) in a wireless local area network (WLAN) system, the method comprising:
- generating an extremely high throughput (EHT) Physical layer Protocol Data Unit PPDU) including a universal signal (U-SIG) field and an EHT signal (EHT-SIG) field; and
- transmitting, to a receiving STA, the EHT PPDU,
- wherein the EHT-SIG field includes a common field including a resource unit (RU) allocation subfield and a user specific field related to a station (STA) identifier,
- wherein a first value of the RU allocation subfield means a first allocation pattern in which one 26-tone RU, one 52+26-tone multiple resource unit (MRU), and five contiguous 26-tone RUs being contiguous to the one 52+26-tone MRU are sequentially allocated,
- wherein a second value of the RU allocation subfield means a second allocation pattern in which one 26-tone RU, one 52+26-tone MRU, three contiguous 26-tone RUs being contiguous to the one 52+26-tone MRU, and one 52-tone RU being contiguous to the three contiguous 26-tone RUs are sequentially allocated,
- wherein a third value of the RU allocation subfield means a third allocation pattern in which one first 26-tone RU, one 52+26-tone MRU being contiguous to the one first 26-tone RU, one second 26-tone RU being contiguous to the one 52+26-tone MRU, one 52-tone RU being contiguous to the one second 26-tone RU, and two contiguous 26-tone RUs being contiguous to the one 52-tone RU are sequentially allocated, and
- wherein a fourth value of the RU allocation subfield identifies a fourth allocation pattern in which one first 26-tone RU, one 52+26-tone MRU being contiguous to the one first 26-tone RU, one second 26-tone RU being contiguous to the one 52+26-tone MRU, and two contiguous 52-tone RUs being contiguous to the one second 26-tone RU are sequentially allocated.

8. The method of claim 7,
- wherein the EHT PPDU further includes a legacy signal (L-SIG) field, a repeated legacy signal (RL-SIG) field being contiguous to the L-SIG field,
- wherein the U-SIG field is contiguous to the RL-SIG,
- wherein the EHT-SIG field is contiguous to the U-SIG field,
- wherein the RL-SIG field includes same control information as the L-SIG field,
- wherein the U-SIG field includes two contiguous symbols,
- wherein the U-SIG field includes version independent bits and version dependent bits being contiguous to the version independent bits,
- wherein the version independent bits include 3 bit information related to a physical version of the EHT PPDU, 1 bit information related to an uplink/downlink (UL/DL) direction, a transmission opportunity (TXOP) information related to a TXOP duration, and a basic service set BSS) color information related to a BSS identifier,
- wherein the RU allocation subfield is configured as 9-bits information.

9. The method of claim 7,
- wherein the user specific field includes at least one user field,
- wherein a number of the at least one user field is configured based on the RU allocation subfield.

10. The method of claim 9,
- wherein the at least one user field includes the same STA ID information on the receiving STA.

11. The method of claim 9,
- wherein the at least one user field includes information indicating that a RU constituting the MRU is a last RU allocated to the receiving STA.

12. A receiving station (STA) in a wireless local area network (WLAN) system, the receiving STA comprising:
- a transceiver configured to transmit and/or receive a wireless signal; and
- a processor coupled to the transceiver, wherein the processor is configured to:
- receive an extremely high throughput (EHT) Physical layer Protocol Data Unit (PPDU) including a universal signal (U-SIG) field and an EHT signal (EHT-SIG) field; and
- decode the EHT PPDU,
- wherein the EHT-SIG field includes a common field including a resource unit (RU) allocation subfield and a user specific field related to a station (STA) identifier,
- wherein a first value of the RU allocation subfield means a first allocation pattern in which one 26-tone RU, one 52+26-tone multiple resource unit (MRU), and five contiguous 26-tone RUs being contiguous to the one 52+26-tone MRU are sequentially allocated,
- wherein a second value of the RU allocation subfield means a second allocation pattern in which one 26-tone RU, one 52+26-tone MRU, three contiguous 26-tone RUs being contiguous to the one 52+26-tone MRU, and one 52-tone RU being contiguous to the three contiguous 26-tone RUs are sequentially allocated,
- wherein a third value of the RU allocation subfield means a third allocation pattern in which one first 26-tone RU, one 52+26-tone MRU being contiguous to the one first 26-tone RU, one second 26-tone RU being contiguous to the one 52+26-tone MRU, one 52-tone RU being contiguous to the one second 26-tone RU, and two contiguous 26-tone RUs being contiguous to the one 52-tone RU are sequentially allocated, and
- wherein a fourth value of the RU allocation subfield identifies a fourth allocation pattern in which one first 26-tone RU, one 52+26-tone MRU being contiguous to the one first 26-tone RU, one second 26-tone RU being contiguous to the one 52+26-tone MRU, and two contiguous 52-tone RUs being contiguous to the one second 26-tone RU are sequentially allocated.

* * * * *